(12) United States Patent
Kasahara et al.

(10) Patent No.: US 8,488,248 B2
(45) Date of Patent: Jul. 16, 2013

(54) IMMERSION MICROSCOPE OBJECTIVE

(75) Inventors: Takashi Kasahara, Tokyo (JP);
Katsuyuki Abe, Tokyo (JP); Kenichi Kusaka, Tokyo (JP)

(73) Assignee: Olympus Corporation, Tokyo (JP)

( * ) Notice: Subject to any disclaimer, the term of this patent is extended or adjusted under 35 U.S.C. 154(b) by 14 days.

(21) Appl. No.: 13/289,182

(22) Filed: Nov. 4, 2011

(65) Prior Publication Data
US 2012/0113524 A1   May 10, 2012

(30) Foreign Application Priority Data

Nov. 10, 2010 (JP) ............................. 2010-252318
Sep. 30, 2011 (JP) ............................. 2011-217461

(51) Int. Cl.
*G02B 21/02* (2006.01)

(52) U.S. Cl.
USPC ................................ 359/658; 359/656

(58) Field of Classification Search
USPC ................. 359/656, 657, 658, 659, 660, 661
See application file for complete search history.

(56) References Cited

U.S. PATENT DOCUMENTS

| 5,978,147 | A | 11/1999 | Kudo |
| 7,869,132 | B2 | 1/2011 | Saito et al. |
| 8,358,469 | B2 * | 1/2013 | Kasahara ................... 359/658 |
| 2006/0007558 | A1 | 1/2006 | Hirata |
| 2006/0018030 | A1 | 1/2006 | Wartmann et al. |
| 2007/0165198 | A1 | 7/2007 | Kneer et al. |
| 2008/0304033 | A1 | 12/2008 | Kneer et al. |
| 2010/0265574 | A1 | 10/2010 | Kasahara |
| 2011/0043906 | A1 | 2/2011 | Saito et al. |
| 2011/0043924 | A1 | 2/2011 | Saito et al. |
| 2011/0228246 | A1 | 9/2011 | Kneer et al. |

FOREIGN PATENT DOCUMENTS

| EP | 2 017 663 A2 | 1/2009 |
| EP | 2453286 A1 * | 5/2012 |
| JP | 10-333044 A | 12/1998 |
| JP | 2003-015046 A | 1/2003 |
| JP | 2005-189732 A | 7/2005 |
| JP | 2011-075982 A | 4/2011 |
| WO | WO 2005/081067 A1 | 9/2005 |

OTHER PUBLICATIONS

Extended European Search Report (EESR) dated Feb. 9, 2012 (in English) in counterpart European Application No. 11008831.7.

* cited by examiner

*Primary Examiner* — David N Spector
(74) *Attorney, Agent, or Firm* — Holtz, Holtz, Goodman & Chick, PC

(57) ABSTRACT

An immersion microscope objective includes, in order from the object side, a first lens group having positive refractive power for converting the luminous flux from an object into convergent luminous flux, a second lens group having the refractive power lower than that of the first lens group, and a third lens group, and satisfies the following conditional expression where NA indicates the numerical aperture on the object side, and d0 indicates a working distance:

$$3 \text{ mm} < NA \times d0 < 8 \text{ mm}.$$

13 Claims, 44 Drawing Sheets

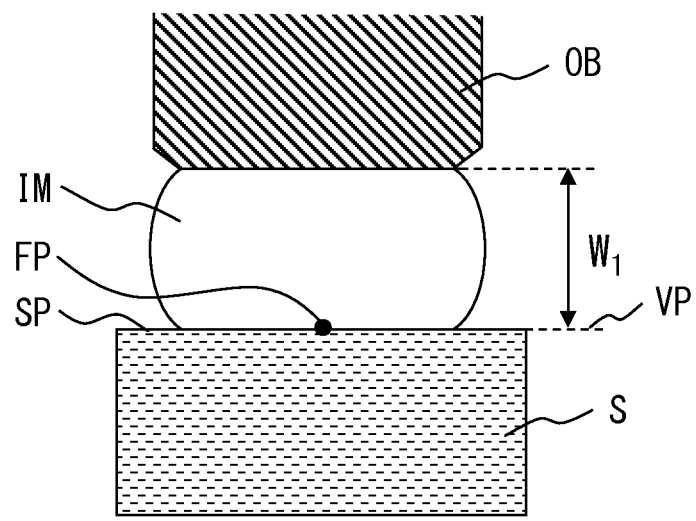
F I G. 2 A

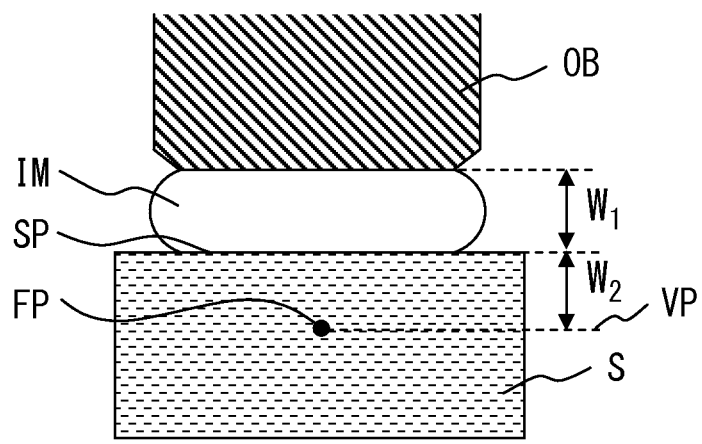
F I G. 2 B

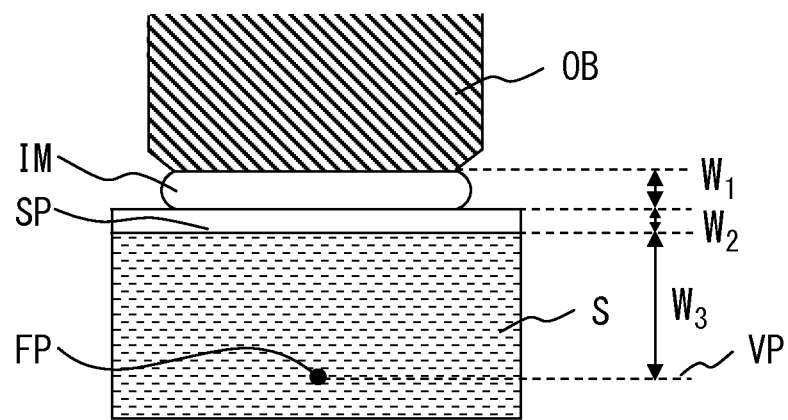
F I G. 2 C

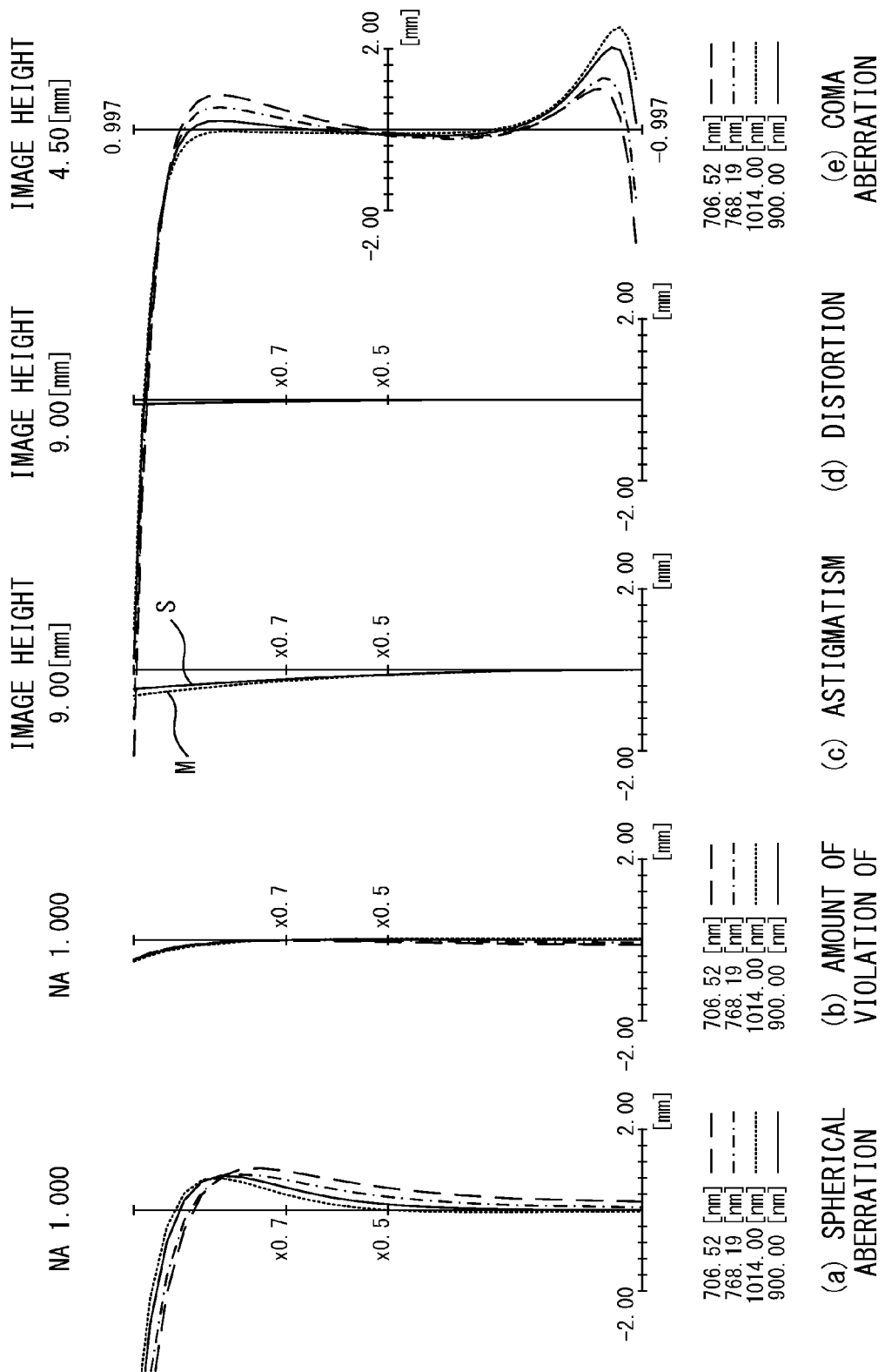

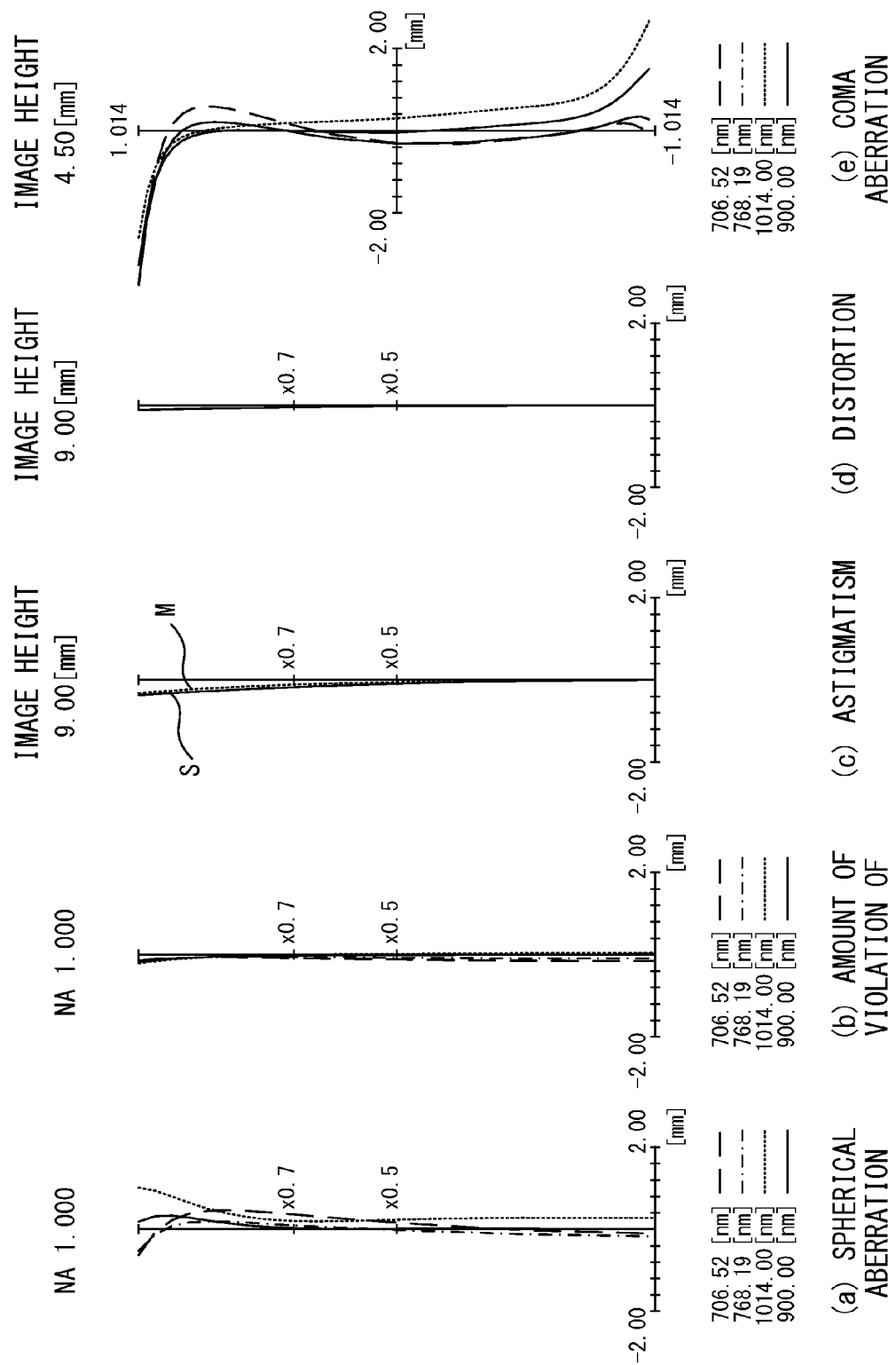
F I G. 4 B

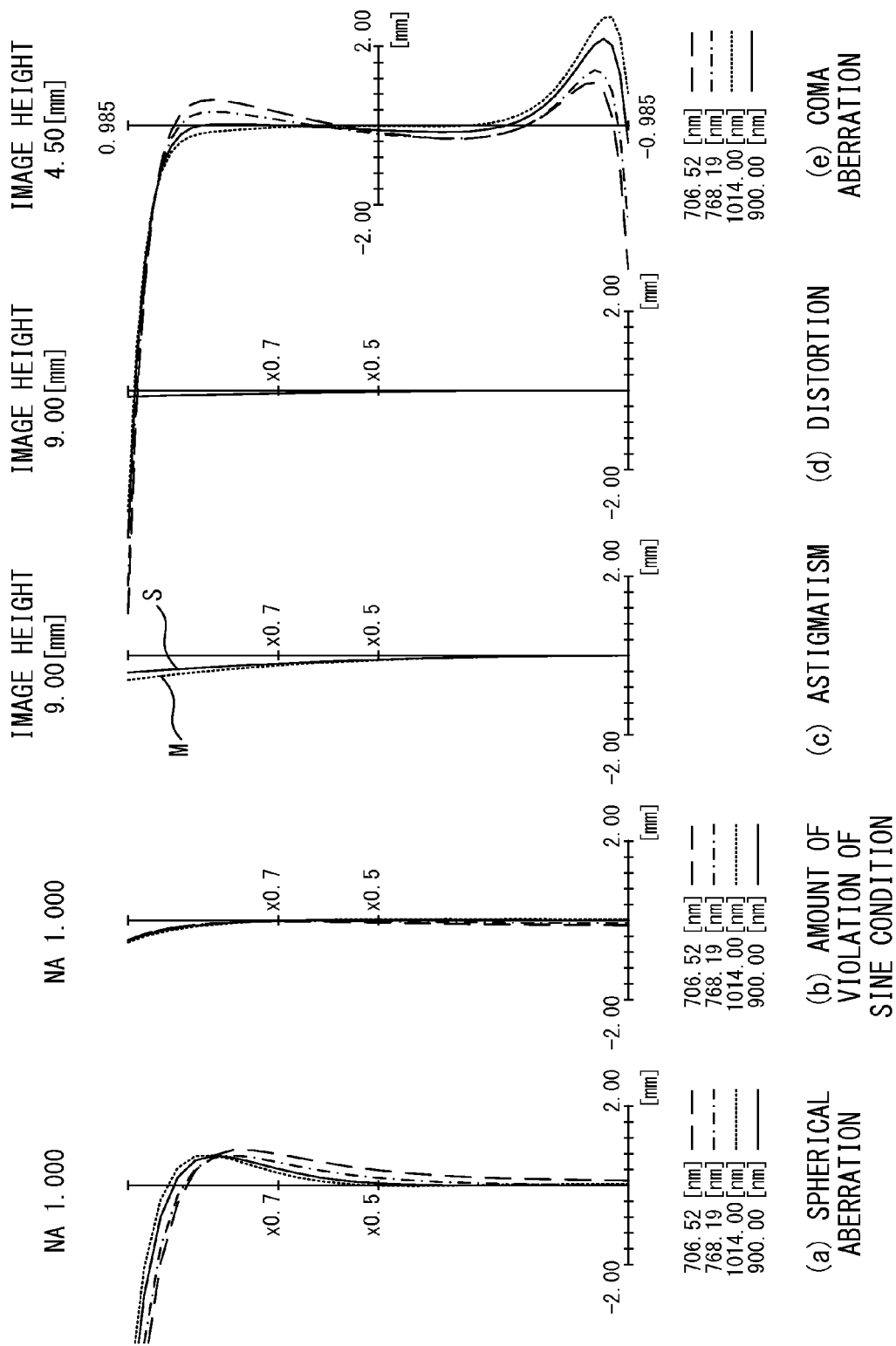
F I G. 6 A

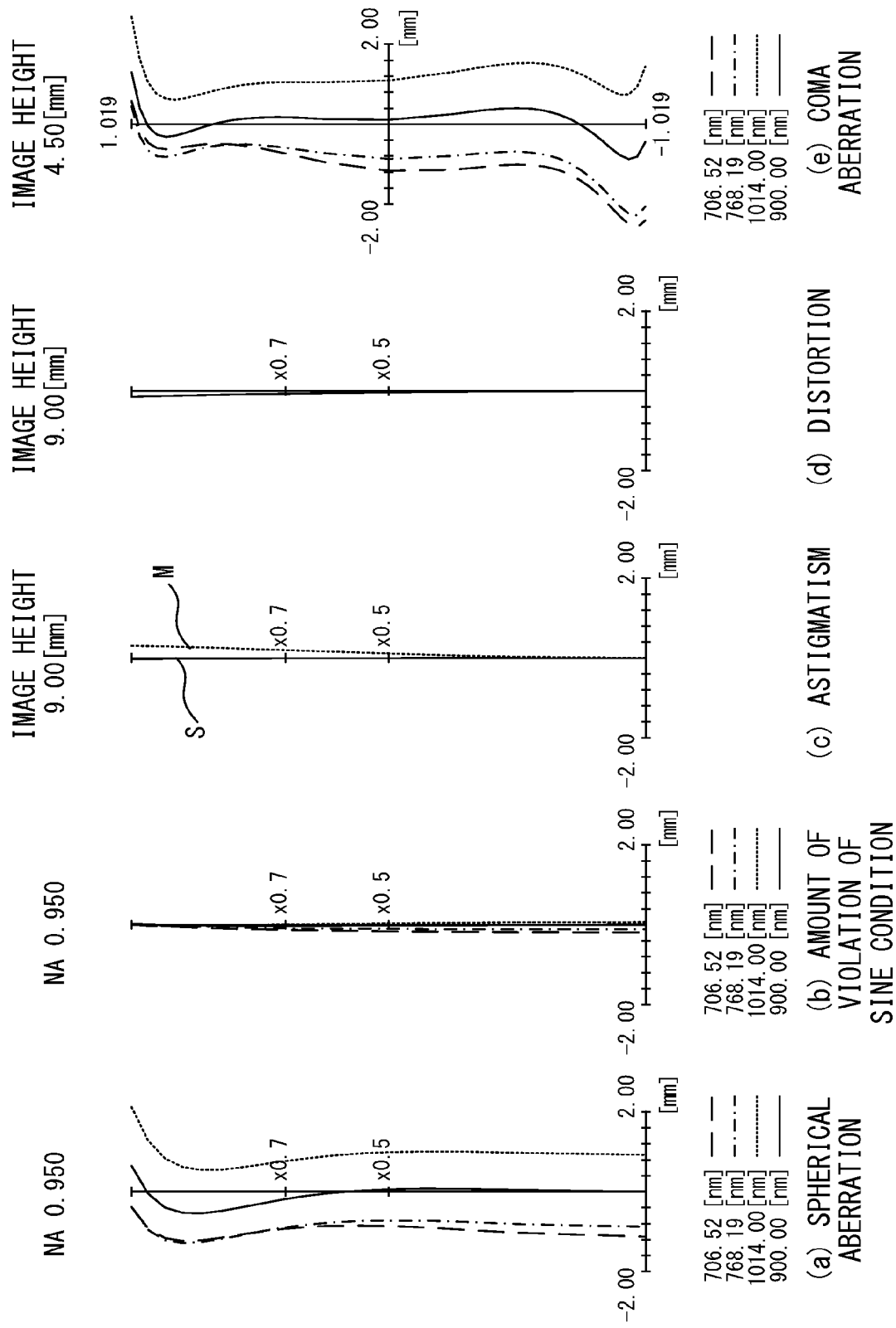
F I G. 8C

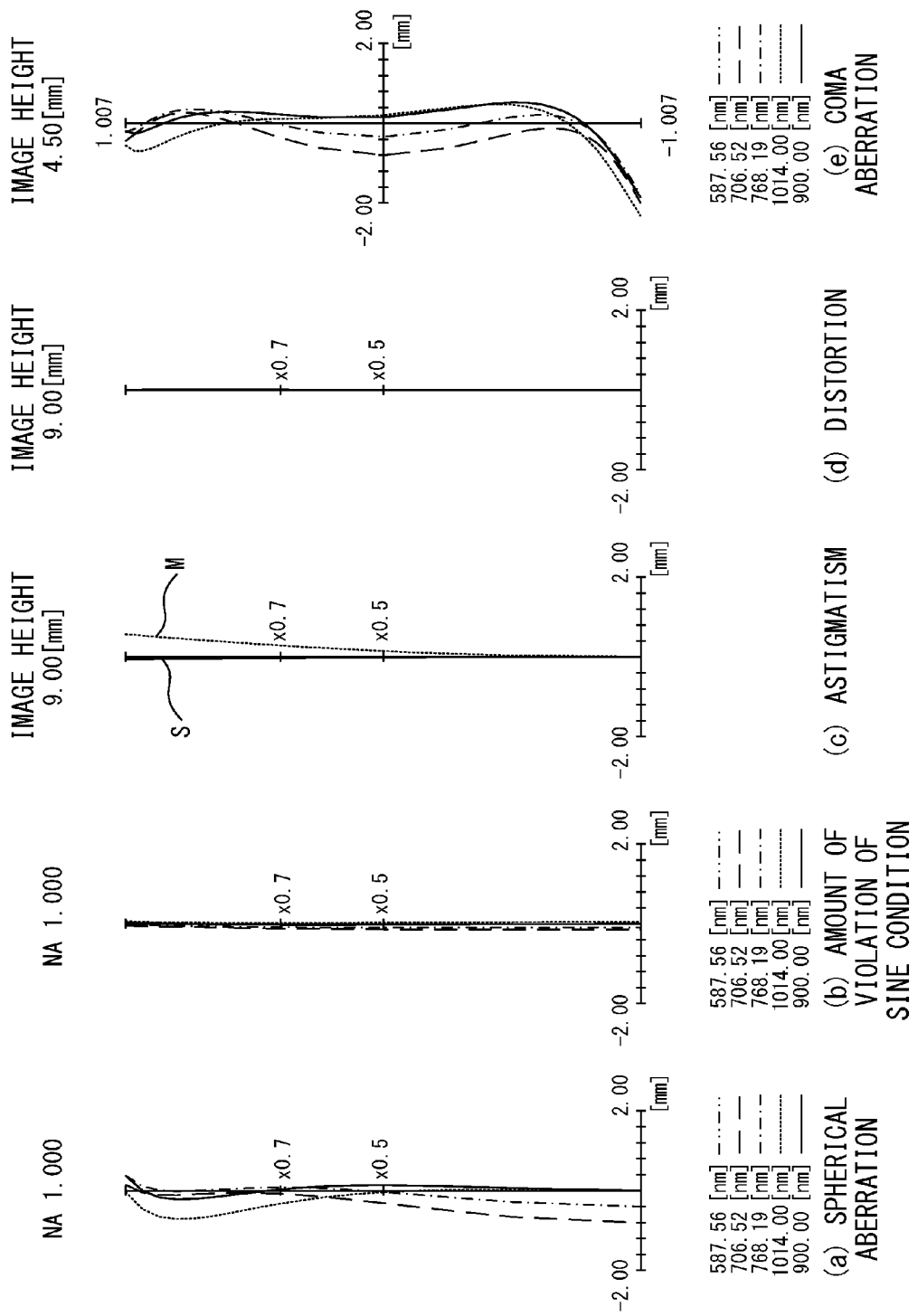

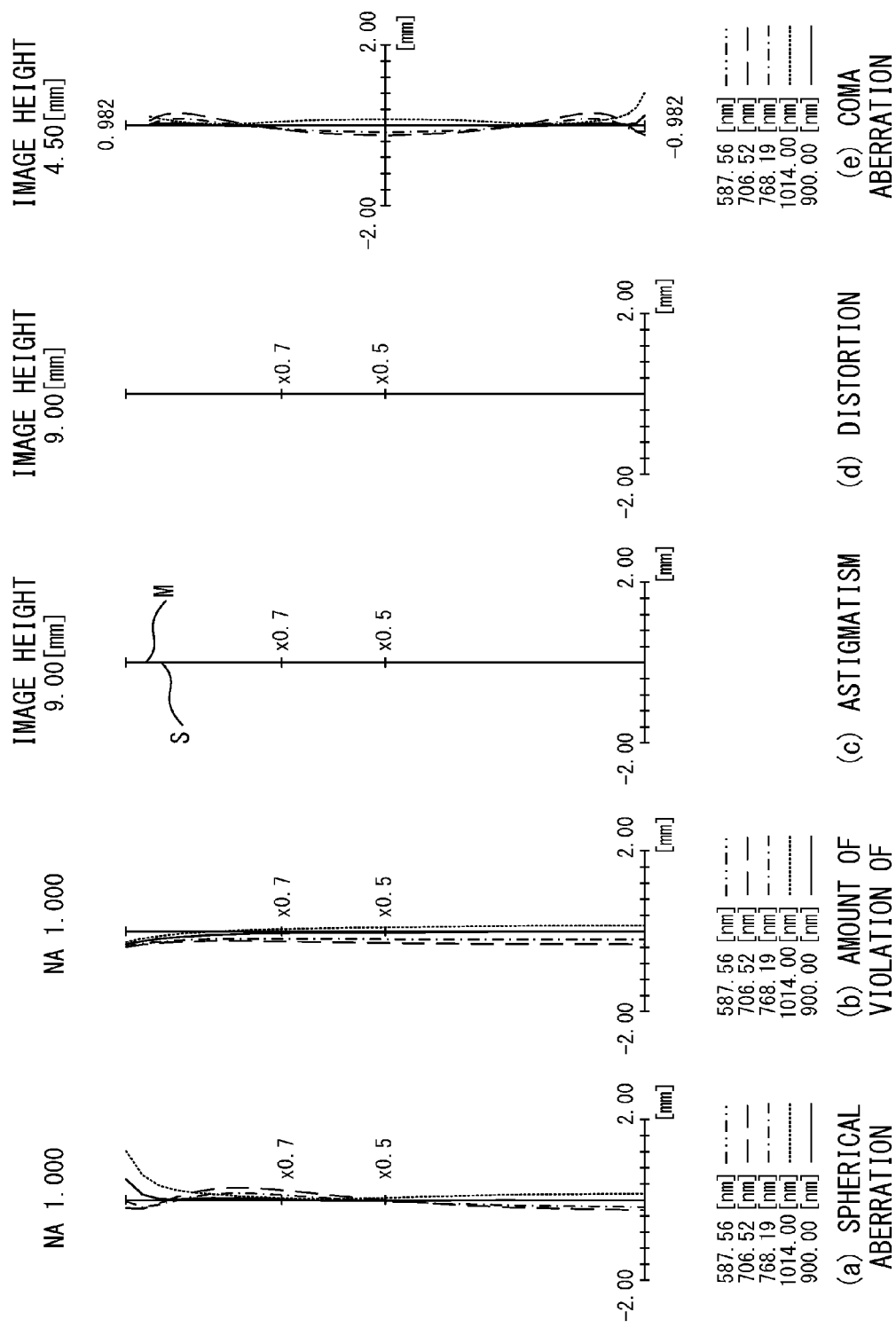
F I G. 22A

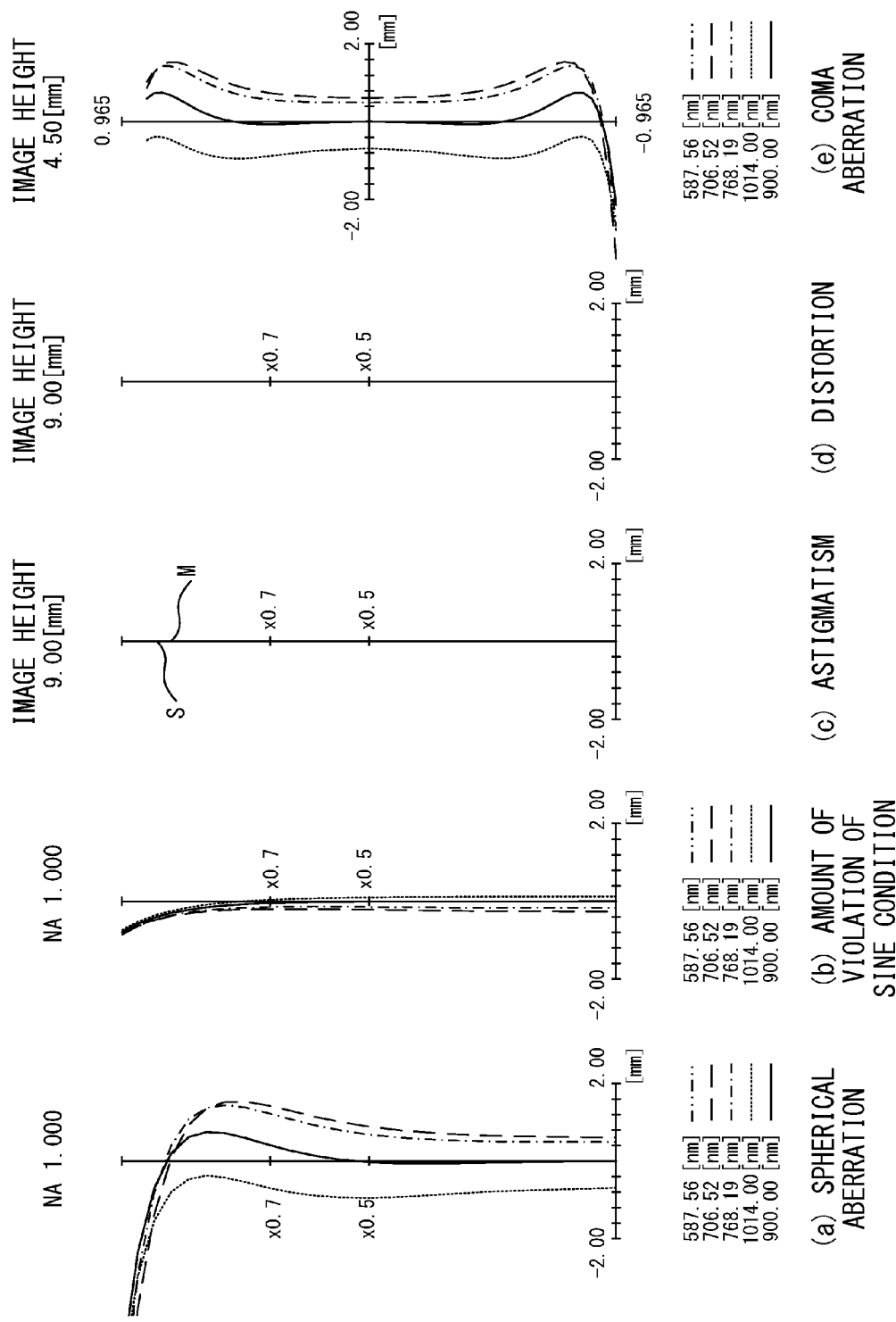
F I G. 22B

IMMERSION MICROSCOPE OBJECTIVE

CROSS REFERENCE TO RELATED APPLICATIONS

This application is based upon and claims the benefit of priority from the prior Japanese Patent Applications Nos. 2011-217461, filed Sep. 30, 2011, and 2010-252318, filed Nov. 10, 2010, the entire contents of which are incorporated herein by these references.

BACKGROUND OF THE INVENTION

1. Field of the Invention

The present invention relates to an immersion microscope objective, and more specifically to an immersion microscope objective used in multiphoton excitation.

2. Description of the Related Art

Recently, a fluorescent observation method using multiphoton excitation has received widespread attention as means for performing a fluorescent observation by a microscope. The multiphoton excitation is a phenomenon equivalent to the excitation caused by the intrinsic absorption wavelength by simultaneously irradiating phosphors with the light having a wavelength of a substantially integral multiple of an absorption wavelength.

A multiphoton excitation phenomenon is a nonlinear phenomenon and caused, for example, at a probability proportional to the square of the intensity of the excitation light in case of two-photon excitation. On the other hand, when the excitation light is condensed by an objective of a microscope, the optical density of the excitation light becomes lower at the inverse square of the distance from the focal plane. Therefore, the multiphoton excitation phenomenon occurs only in the vicinity of the focal point, and fluorescence is irradiated only from the portion. By the property, a multiphoton excitation microscope does not require a confocal pinhole used in a normal confocal microscope. In addition, since an excitation phenomenon occurs only on the focal plane, there is little fading of fluorescence in a sample.

The excitation light used in the multiphoton excitation is generally infrared light having a wavelength longer than the wavelength of normally used visible light. Generally, the longer a wavelength, the harder the light scatters (Rayleigh scattering). Therefore, although a scattering sample such as a living body sample etc. is to be observed, the excitation light can reach the deep part of the sample by the excitation by infrared light. Accordingly, the deep part of a living body which has not been observed by visible light etc. can be observed by the multiphoton excitation. In addition, since the infrared light is less phototoxic than ultraviolet light or visible light, the damage to a living body sample can be successfully suppressed.

As described above, the fluorescent observation method using the multiphoton excitation has a number of merits, it is a very effective fluorescent observation method.

On the other hand, in the fluorescent observation method using the multiphoton excitation above, the following technological demand is imposed on an objective.

First, the objective is to have a large numerical aperture, and to be appropriately aberration-corrected. To generate the multiphoton excitation, a plurality of photons are to simultaneously collide against one phosphor. To attain this, it is necessary to realize very high photon density at the focal position of the objective. Therefore, the objective is to have a large numerical aperture, and to be appropriately aberration-corrected. To be more practical, since the excitation light is infrared light, it is necessary that the aberration of the infrared light is corrected.

Second, it is necessary that the objective has a long working distance. Since a patch clamp method is often used in the multiphoton excitation microscope, it is necessary to reserve a work space between the tip of the objective and the sample. In addition, to observe the deep part of a sample, it is necessary to reserve the distance from the tip of the objective to the object surface longer than the depth of the sample when the object surface matches the focal point of the objective. Therefore, the objective is to have a long working distance.

For example, Japanese Laid-open Patent Publication No. 2005-189732 discloses an objective having a long working distance. Furthermore, Japanese Laid-open Patent Publication No. 2003-15046 discloses an objective having a large numerical aperture and a correction ring.

SUMMARY OF THE INVENTION

An aspect of the present invention provides an immersion microscope objective including, in order from the object side, a first lens group having positive refractive power for converting the luminous flux from an object into convergent luminous flux, a second lens group having the refractive power lower than that of the first lens group, and a third lens group, and satisfies the following conditional expression where NA indicates the numerical aperture on the object side, and d0 indicates a working distance.

$$3\ mm < NA \times d0 < 8\ mm$$

BRIEF DESCRIPTION OF THE DRAWINGS

The present invention will be more apparent from the following detailed description when the accompanying drawings are referenced.

FIG. 2A is an explanatory view of an example of the optical path length between the immersion microscope objective and its focal position;

FIG. 2B is an explanatory view of another example of the optical path length between the immersion microscope objective and its focal position;

FIG. 2C is an explanatory view of a further example of the optical path length between the immersion microscope objective and its focal position;

FIG. 4A is a view illustrating the aberration when the immersion microscope objective exemplified in FIG. 1 and the tube lens exemplified in FIG. 3 are used in combination;

FIG. 4B is another view illustrating the aberration when the immersion microscope objective exemplified in FIG. 1 and the tube lens exemplified in FIG. 3 are used in combination;

FIG. 6A is a view illustrating the aberration when the immersion microscope objective exemplified in FIG. 5 and the tube lens exemplified in FIG. 3 are used in combination;

FIG. 8C is a further view illustrating the aberration when the immersion microscope objective exemplified in FIG. 7 and the tube lens exemplified in FIG. 3 are used in combination;

FIG. 18C is a further view illustrating the aberration when the immersion microscope objective exemplified in FIG. 17 and the tube lens exemplified in FIG. 3 are used in combination;

FIG. 22A is a view illustrating the aberration when the immersion microscope objective exemplified in FIG. 21 and the tube lens exemplified in FIG. 3 are used in combination;

FIG. 22B is another view illustrating the aberration when the immersion microscope objective exemplified in FIG. 21 and the tube lens exemplified in FIG. 3 are used in combination.

DESCRIPTION OF THE PREFERRED EMBODIMENTS

First, the common configuration of the objective according to each embodiment of the present invention is described below with reference to FIG. 1.

The objective is an immersion microscope objective for observing a sample through an immersion, and includes, in order from the object side, a first lens group G1 having positive refractive power for converting the luminous flux from an object into convergent luminous flux, a second lens group G2 having the refractive power lower than that of the first lens group G1, and a third lens group G3. The space between the surface (surface number s1) closest to the object of the objective and the sample plane SP is filled by the immersion not illustrated in the attached drawings to realize high numerical aperture.

The objective is configured to satisfy the following conditional expression (1) in addition to the configuration above where NA indicates the numerical aperture on the object side of the objective and d0 indicates the working distance that is a distance from the first surface of the objective to the object surface when the lens focuses on the object surface (sample plane).

$$3 \text{ mm} < NA \times d0 < 8 \text{ mm} \quad (1)$$

The conditional expression (1) regulates the numerical aperture of the objective and the working distance. By satisfying the conditional expression (1), the deep part of the sample can be observed with sufficient resolution and bright and high contrast in the fluorescent observation method using two-photon excitation.

If the lower limit of the conditional expression (1) is not reached, the distance from the first surface of the objective to the object surface cannot be sufficiently reserved, and it is difficult to observe the inside of the sample. Otherwise, since the numerical aperture is insufficient, a desired resolution cannot be obtained, and an image of bright and high contrast cannot be acquired. On the other hand, the upper limit of the conditional expression (1) is exceeded, it is difficult to correct the aberration for realizing the bright and high contrast with sufficient resolution with the objective designed to be included in the limited total length.

By satisfying the configuration and conditions above, an immersion microscope objective having high optical performance for brightly observing the deep part of a sample can be provided.

Described below are the configuration of a more preferable objective and desired conditions to be satisfied.

Figure 1:
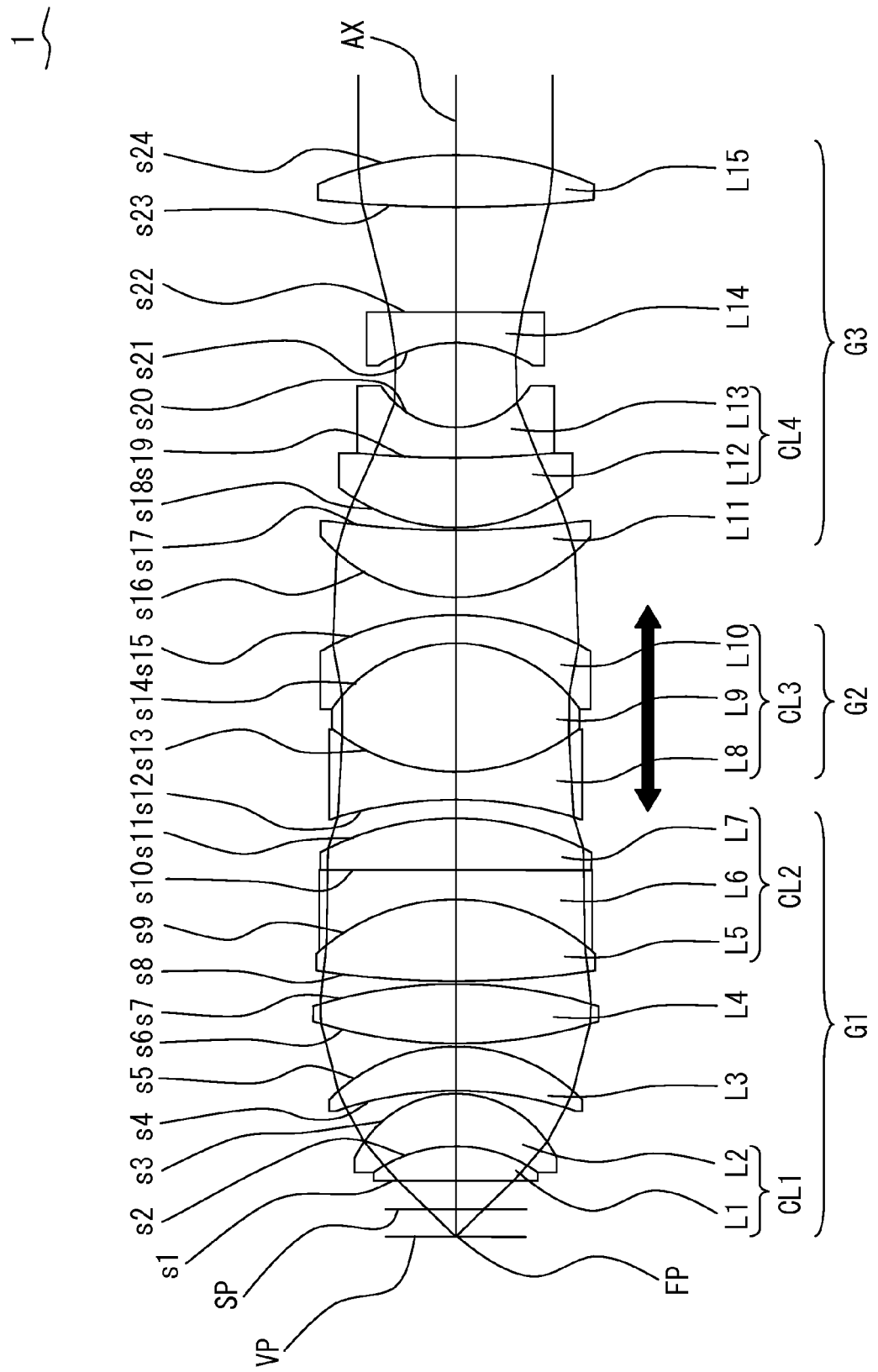
FIG. 1 is a sectional view of the immersion microscope objective according to the embodiment 1.

As exemplified in FIG. 1, the first lens group G1 can include a cemented lens CL1 configured by a plano-convex lens (lens L1) having a plane surface facing the object side and a meniscus lens (lens L2) having a concave surface facing the object side, and at least one single lens (lens L3 and lens L4) having positive refractive power. It is preferable that the first lens group G1 includes a plurality of single lenses, and that the lens component arranged closest to the object in the first lens group is a cemented lens.

It is preferable that the first lens group G1 is configured by two single lenses (lens L3, lens L4) having positive refractive power and a cemented lens CL2 on the image side of a cemented lens CL1. Especially, it is preferable that the cemented lens CL2 is a triple cemented lens including a positive lens, a negative lens, and a positive lens cemented as having positive refractive power on the whole.

As exemplified in FIG. 1, the second lens group G2 can be a movable group to be moved by a correction ring, and include a cemented lens CL3. The second lens group G2 can be configured to move with respect to the first lens group G1 with the movement of the third lens group G3. The second lens group G2 can have the refractive power lower than that of the first lens group G1, and has the refractive power lower than that of the third lens group G3 in some embodiments. For example, as exemplified in FIG. 1, the second lens group G2 can include a triple cemented lens (cemented lens CL3) configured by a negative lens, a positive lens, and a negative lens having a necessary refractive power on the whole.

It is preferable that the third lens group G3 has a negative refractive power, and as exemplified in FIG. 1, can include in order from the object side, a forward lens group (lens L11, lens L12, lens L13) having a concave surface (surface number s20) facing the image side as the surface closest to the image side, and a backward lens group (lens L14, lens L15) having a concave surface (surface number s21) facing the object side as the surface closest to the object side. Furthermore, the third lens group G3 can have lower refractive power than that of the first lens group G1, and have the refractive power lower than that of the second lens group G2 in some embodiments.

It is preferable that the objective has a magnification of 35 or less. Thus, a wide field of view can be reserved. For example, in the case of a multiphoton excitation microscope, the excitation light is infrared light and is not subject to the influence of scattering, but the fluorescence emitted thereby is in a visible light range (or ultraviolet light range). Therefore, the fluorescence to be detected is subject to the Rayleigh scattering by a sample. Even in this case, the scattered fluorescence can be collected without waste by having a wide field of view of the objective.

In addition, it is preferable that the objective has a lens group movable along the optical axis AX, that is, it has a correction ring. For example, when the deep part of a sample is to be observed, the aberration occurring depending on the refractive index of the sample itself is not ignorable, and the fluorescent efficiency may become lower. In addition, depending on the depth of the observation of the sample, the balance among the medium (for example, a immersion, a cover glass, a sample, etc.) between the objective and its focal plane may change, which causes the aberration. In this case, the aberration can be suppressed by using a correction ring.

To be more practical, the objective can be configured so that it has a correction ring not illustrated in the attached drawings. The second lens group included in the objective can be a movable group that is configured to move along the optical axis AX between the first lens group G1 and the third lens group G3 by operating the correction ring as exemplified in FIG. 1. In addition, by operating the correction ring, the second lens group G2 and the third lens group G3 can be relatively moved with respect to the first lens group G1.

When the second lens group is a movable group, it is preferable that the cemented lens included in the second lens group of the objective is a triple cemented lens having negative refractive power and configured by a negative lens, a positive lens, and a negative lens. In the movable group in which spherical aberration is corrected, an occurrence of chromatic aberration by a movement is adjusted. Therefore, it is preferable that a lens group is configured as a cemented lens. However, in a cemented lens group configured by a positive lens and a negative lens, it is hard that an appropriate chromatic aberration is compatible with appropriate negative refractive index. The appropriate chromatic aberration can be compatible with the negative appropriate refractive index by having a movable group as a lens group configured by a positive lens and a plurality of negative lenses.

The objective configured as described above includes the first lens group G1. The first lens group G1 has a planoconvex lens (lens L1) having the refractive index close to that of the immersion on the side closest to the object. In the result, the objective realizes high numerical aperture by lower aberration occurring between an immersion and a lens. Furthermore, the field curvature can also be suppressed by the meniscus lens (lens L2) correcting the Petzval sum. As a result, the objective can reserve a wide field of view. Furthermore, The single lens (lens L3, lens L4) having the positive refractive power included in the first lens group G1 suppress the beam height of the divergent light emitted from the meniscus lens (lens L2) while minimizing the occurrence of the high order spherical aberration and coma aberration, then the objective can have a long working distance with a high numerical aperture. That is, using on the side closest to the object the cemented lens CL1 configured by the planoconvex lens (lens L1) and the meniscus lens (lens L2) and further using the single lens (lens L3, lens L4) having the positive refractive power, the objective can reserve a long working distance while ensuring the compatibility between the wide field of view and the high numerical aperture.

The aberration of the objective can be appropriately corrected by configuring it by the second lens group G2 or the second lens group G2 and the third lens group G3 as a movable group although the optical path length from the objective to the focal position FP changes. Practically, when the observation plane VP located differently in the optical axis direction from the sample plane SP is observed, that is, when the positions of a sample different in the depth direction are observed, the aberration can be appropriately corrected.

With the objective, the third lens group G3 includes, in order from the object side, the forward lens group whose surface closest to the image is the concave surface facing the image side and the backward lens group whose surface closest to the object is the concave surface facing the object side. Then, the light from the second lens group G2 can be converted into parallel light and emitted by the third lens group G3 while correcting mainly the off-axis aberration. Therefore, the objective is an infinite distance correction lens.

It is preferable that the objective is configured to satisfy the following conditional expressions (2) through (9) in addition to conditional expression (1). In the conditional expressions, d1 indicates the thickness of the lens component closest to the object in the objective. The characters nd1 and nd2 respectively indicate the refractive indexes of the lenses on the object side and the image side of the cemented lens as the lens component on the side closest to the object. R1 and R2 respectively indicate the curvatures of the cemented surface and the image side surface of the cemented lens as the lens component on the side closest to the object. L indicates the total length of the objective. $W_i$ indicates the width in the optical axis direction of each medium between the objective and the focal position FP of the objective. The character $n_i$ indicates the refractive index of each medium.

$$\sum_{i=1}^{N}(W_i \times n_i)$$

indicates the optical path length between the objective and the focal position FP of the objective, and N indicates the number of medium between the objective and the focal position FP of the objective. β1 and β2 respectively indicate the magnifications of the first lens group and the second lens group. The characters f and f2 respectively indicate the focal lengths of the entire objective and the second lens group.

$$0.5 < d0/d1 < 3 \quad (2)$$

$$0.3 < nd2 - nd1 < 1 \quad (3)$$

$$1.03 < R1/R2 < 1.4 \quad (4)$$

$$-0.19 < R1/L < -0.11 \quad (5)$$

$$0.023 < \frac{\left[\text{Max}\left(\sum_{i=1}^{N}(W_i \times n_i)\right) - \text{Min}\left(\sum_{i=1}^{N}(W_i \times n_i)\right)\right]}{f} < 0.2 \quad (6)$$

$$-0.5 < 1/\beta 1 < -0.1 \quad (7)$$

$$0.2 < |\beta 2| < 2 \quad (8)$$

$$-0.18 < f/f2 < 0.1 \quad (9)$$

The conditional expression (2) regulates the relationship between the working distance and the thickness of the cemented lens closest to the object (hereafter referred to as a leading lens). In the objective having a high numerical aperture, the beam height becomes higher by a longer working distance. Therefore, although it is difficult to appropriately correct the high order aberration and the field curvature, the high order aberration and the field curvature can be appropriately corrected by satisfying the conditional expression (2).

When the lower limit of the conditional expression (2) is not reached, the beam height in and subsequent to the leading lens becomes higher, thereby hardly correcting the high order aberration. Therefore, it is hard to obtain a high numerical aperture. On the other hand, if the upper limit of the conditional expression (2) is exceeded, the thickness of the leading lens becomes insufficient, thereby causing an undesired large Petzval sum. As a result, it becomes difficult to maintain the flatness of the imaging plane due to the field curvature occurring on the leading lens.

The conditional expression (3) regulates the difference in refractive index of the lens configuring the cemented lens (leading lens) closest to the object. With the objective having a long working distance, it is necessary especially for an objective having a low magnification to be designed to have a moderate curve of the cemented surface of the leading lens so that the off-axis aberration can be appropriately corrected. By satisfying the conditional expression (3), the Petzval sum can be suppressed while maintaining the moderate curve of the surface.

When the lower limit of the conditional expression (3) is not reached, the Petzval sum cannot be sufficiently corrected. Therefore, it is difficult to correct the coma aberration and the field curvature. On the other hand, when the upper limit of the conditional expression (3) is exceeded, a glass material of high refractive index is used for the lens on the image side configuring the leading lens. The glass material of a high refractive index normally tends to occur in self-fluorescence and has low transmittance of a short wavelength, thereby hardly observing the fluorescence appropriately.

The conditional expression (4) regulates the relationship in curvature between the cemented surface of the cemented lens (leading lens) closest to the object and the surface closest to the image. By satisfying the conditional expression (4), the high order aberration and the Petzval sum occurring on the leading lens can be corrected with good balance, thereby easily correcting the high order aberration and the Petzval sum of the entire objective by lenses subsequent to the leading lens.

When the lower limit of the conditional expression (4) is not reached, the beam height on the image side of the leading lens becomes high. Therefore, it is hard for the lens closer to the image than the leading lens to appropriately correct the high order aberration. On the other hand, when the upper limit of the conditional expression (4) is exceeded, the beam height of the leading lens on the image side becomes too low. Therefore, it is hard for the lens closer to the image than the leading lens to sufficiently correct the Petzval sum.

The conditional expression (5) regulates the relationship between the curvature of the cemented surface of the cemented lens (leading lens) closest to the object and the total length of the objective. An objective having a long total length can increase the number of lenses, and relatively easily increases the beam height. Therefore, although the Petzval sum cannot be sufficiently corrected for the leading lens, the Petzval sum can be appropriately corrected as the entire objective. On the other hand, the entire length of the microscope objective cannot be selected without restrictions, and the optimum total length is set within a certain range. By satisfying the conditional expression (5), the Petzval sum of the entire objective can be appropriately corrected for the optimum total length of the microscope objective.

When the lower limit of the conditional expression (5) is not reached, the Petzval sum cannot be sufficiently corrected for the leading lens in relation to the entire length, thereby hardly correcting appropriately the Petzval sum on the entire objective. On the other hand, when the upper limit of the conditional expression (5) is exceeded, the Petzval sum can be sufficiently corrected for the leading lens, but the beam height in and subsequent to the leading lens becomes higher, thereby hardly correcting appropriate other aberrations.

The conditional expression (6) regulates the maximum amount of change of the optical path length allowed between the objective and the focal position FP while maintaining the appropriate optical performance of the objective. That is, the expression regulates the difference between the longest optical path length and the shortest optical path length allowed by the objective. The amount of aberration occurring on the objective changes depending on the optical path length between the objective and the focal position FP. However, since the aberration can be appropriately corrected by moving the movable group (second lens group G2) by the correction ring, appropriate optical performance can be maintained.

When the lower limit of the conditional expression (6) is not reached, the change of the allowed optical path length is too small. Therefore, it is difficult to realize appropriate observation performance in observing the deep part of a sample. With a change in the difference of an optical path length in such a narrow allowable range, a conventional objective having a correction ring can be corrected. On the other hand, when the upper limit of the conditional expression (6) is exceeded, very large optical path length difference is to be corrected. Therefore, it may be difficult to appropriately make a correction depending on the movement of the movable group using the correction ring. Accordingly, it is hard to realize sufficient optical performance.

FIGS. 2A, 2B, and 2C are explanatory views of an example of an optical path length between the immersion microscope objective and its focal position. The method of calculating the optical path length difference regulated by the conditional expression (6) is explained below with reference to FIGS. 2A through 2C.

FIG. 2A is an example in which the focal position FP of the objective OB is located on the sample plane SP, that is, an example in which the observation plane VP is located on the sample plane SP. In FIG. 2A, the medium between the objective OB and the focal position FP is only an immersion IM. Therefore, the optical path length between the objective OB and the focal position FP can be calculated as a product of the width $W_1$ in the optical axis direction of the immersion IM and the refractive index $n_1$ of the immersion IM, that is, $W_1*n_1$.

FIG. 2B is an example in which the focal position FP of the objective OB is located in the sample plane SP, that is, an example in which the observation plane VP is located in the sample plane SP. In FIG. 2B, the medium between the objective OB and the focal position FP is the immersion IM and the sample S. Therefore, the optical path length between the objective OB and the focal position FP can be calculated as a sum of a product of the width $W_1$ in the optical axis direction of the immersion IM and the refractive index $n_1$ of the immersion IM and a product of the width $W_2$ in the optical axis direction of the sample S from the focal position FP and the refractive index $n_2$ of the sample S, that is, $W_1*n_1+W_2*n_2$.

FIG. 2C is another example in which the focal position FP of the objective OB is located in the sample plane SP. In FIG. 2C, the media between the objective OB and the focal position FP are the immersion IM, the cover glass CG, and the sample S. Therefore, the optical path length between the objective OB and the focal position FP can be calculated as a sum of the product of the width $W_1$ in the optical axis direction of the immersion IM and the refractive index $n_1$ of the immersion IM, the product of the width $W_2$ in the optical axis direction of the cover glass CG and the refractive index $n_2$ of the cover glass CG, and the product of the width $W_3$ in the optical axis direction of the sample S to the focal position FP and the refractive index $n_3$ of the sample S, that is, $W_1*n_1+W_2*n_2+W_3*n_3$.

When the optical path lengths calculated between the objective OB and the focal position FP illustrated in FIGS. 2A through 2C satisfy the conditional expression (6), the objective OB can constantly maintain the optimum optical performance by moving the second lens group using the correction ring. Therefore, the sample S can be more appropriately observed from the surface to the deep part.

In FIGS. 2A through 2C, when the positions of the samples S having different depths are observed, the observation is performed using different number of media interposed between the objective OB and the focal position FP, but the factor that changes the optical path length is not specifically restricted. For example, even when a sample is observed with the immersions having different refractive indexes interposed, when samples having different refractive indexes are observed, and when samples having different refractive indexes depending on the depth are observed, the appropriate optical performance can be maintained so far as the conditional expression (6) is satisfied.

The conditional expression (7) regulates the magnification of the first lens group G1. The luminous flux from the first lens group G1 becomes convergent luminous flux by satisfying the conditional expression (7). Even the second lens group G2 having relatively low refractive power can be improved in the amount of correction of the spherical aberration per amount of movement by the movement in the convergent luminous flux. Therefore, the amount of movement of the second lens group G2 configured as a movable group can be suppressed. As a result, a large spherical aberration can be corrected.

When the lower limit of the conditional expression (7) is not reached, the positive refractive power of the first lens group G1 is too high, and therefore it is hard to suppress the occurrence of the high order spherical aberration and the high order coma aberration in the first lens group G1. On the other hand, when the upper limit of the conditional expression (7) is exceeded, the luminous flux from the first lens group G1 becomes divergent luminous flux. Therefore, it is hard to sufficiently correct the spherical aberration although the second lens group G2 is moved.

The conditional expression (8) regulates the range of the absolute value of the magnification of the second lens group G2. By satisfying the conditional expression (8), the magnification of the movable group indicates 1 or −1 times or near offer. Therefore, although the movable group moves, the paraxial position of the image forming position hardly changes, thereby relatively easily correcting the aberration using the correction ring.

When the lower limit of the conditional expression (8) is not reached, the magnification of the movable group changes by the movement of the movable group although the magnification of the movable group is 1 or −1 times or near offer. Therefore, it is hard to suppress the fluctuation of the focal position. On the other hand, when the upper limit of the conditional expression (8) is exceeded, the magnification of the movable group similarly changes by the movement of the movable group although the magnification of the movable group is 1 or −1 times or near offer. Therefore, it is hard to suppress the fluctuation of the focal position.

The conditional expression (9) regulates the relationship between the focal length of the second lens group G2 and the focal length of the entire objective. By satisfying the conditional expression (9), the focal length of the movable group (second lens group G2) is sufficiently long, thereby reducing the change of the magnification of the objective by the movement of the movable group. As a result, the fluctuation of the focal position caused by the amount of movement of the movable group can be suppressed.

When the lower limit of the conditional expression (9) is not reached, the magnification of the movable group changes by the movement of the movable group although the magnification of the movable group is 1 or −1 times or near offer. Therefore, it is hard to suppress the fluctuation of the focal position. On the other hand, when the upper limit of the conditional expression (9) is exceeded, the magnification of the movable group similarly changes by the movement of the movable group although the magnification of the movable group is 1 or −1 times or near offer. Therefore, it is hard to suppress the fluctuation of the focal position.

The conditional expressions (2) through (9) can be arbitrarily combined with the conditional expression (1). Each conditional expression can be limited by one of the upper limit and the lower limit.

Embodiment 1

Figure 3:
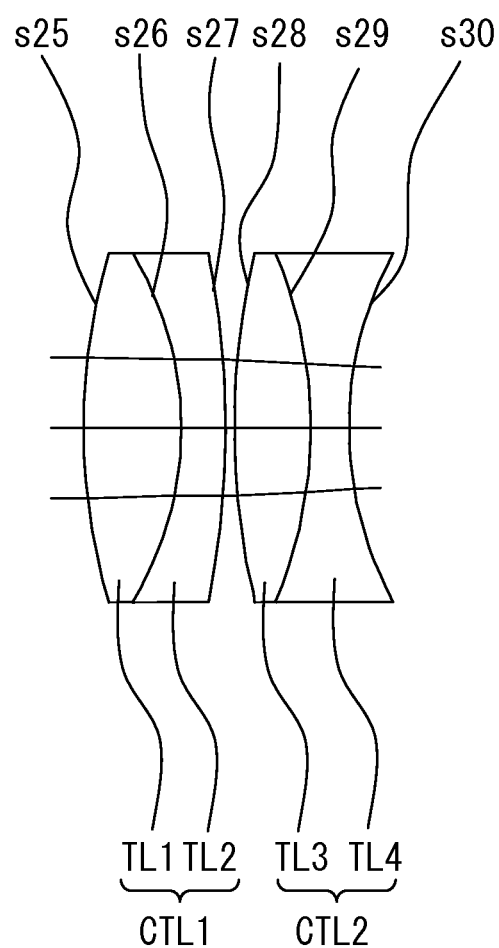
FIG. 3 is a sectional view of the tube lens according to the embodiment 1.

FIG. 1 is a sectional view of the immersion microscope objective according to the present embodiment. FIG. 3 is a sectional view of the tube lens according to the present embodiment.

An objective 1 exemplified in FIG. 1 is an immersion microscope objective, and includes, in order from the object side, the first lens group G1 (lens L1 through lens L7) having positive refractive power for converting the luminous flux from an object into convergent luminous flux, the second lens group G2 (lens L8 through lens L10) having negative refractive power and including cemented lens CL3, and the third lens group G3 (lens L11 through lens L15) having negative refractive power.

The space between the objective 1 and the sample plane SP is filled with the immersion not illustrated in the attached drawings. In the example in FIG. 1, the focal position FP of the objective 1 is located in the sample, and the observation plane VP is observed by the objective 1.

The first lens group G1 is configured by, in order from the object side, the cemented lens CL1 having positive refractive power, a single lens (lens L3) as a meniscus lens having its concave surface facing the object side, a single lens (lens L4) as a double-convex lens, and a triple cemented lens (cemented lens CL2) having positive refractive power.

The cemented lens CL1 is configured by, in order from the object side, a planoconvex lens (lens L1) having its convex surface facing the image side, and a meniscus lens (lens L2) having its concave surface facing the object side. The cemented lens CL2 is configured by, in order from the object side, a double-convex lens (lens L5), a planoconcave lens (lens L6) having its concave surface facing the object side, and a planoconvex lens (lens L7) having its convex surface facing the image side.

The second lens group G2 is a movable group configured as movable along the optical axis AX between the first lens group G1 and the third lens group G3, and is a triple cemented lens (cemented lens CL3) having negative refractive power and configured by, in order from the object side, a negative lens (lens L8) as a double-concave lens, a positive lens (lens L9) as a double-convex lens, and a negative lens (lens L10) as a meniscus lens having its concave surface facing the object side. The refractive power of the second lens group G2 is lower than the refractive power of the first lens group G1.

The third lens group G3 has negative refractive power on the whole and is configured by, in order from the object side, a forward lens group (lens L11, lens L12, lens L13) having negative refractive power with the surface closest to the image (surface number s20) as a concave surface facing the image side, and a backward lens group (lens L14, lens L15) having negative refractive power with the surface closest to the object (surface number s21) as a concave surface facing the object side.

The forward lens group is configured by, in order from the object side, a meniscus lens (lens L11) having its concave surface facing the image side, and the cemented lens CL4 obtained by combining a meniscus lens (lens L12) having its concave surface facing the image side and a meniscus lens (lens L13) having its concave surface facing the image side.

The backward lens group is configured by, in order from the object side, a planoconcave lens (lens L14) having its concave surface facing the object side and a double-convex lens (lens L15).

A tube lens 11 exemplified in FIG. 3 is configured by, in order from the object side, a cemented lens CLT1 composed of a lens TL1 and a lens TL2 and a cemented lens CTL2 composed of a lens TL3 and a lens TL4.

Described below are various types of data of the objective 1 and the tube lens 11 according to the present embodiment.

In the objective 1, a magnification $\beta$ in the second state, a numerical aperture NA on the object side, a focal length f, a total length L, a working distance d0, and a thickness d1 of a lens component closest to the object are described below.

$\beta = -24.98$, NA=1.0, $f = 7.223$ mm, $L = 73.816$ mm, $d0 = 4.036$ mm, $d1 = 6.222$ mm In the objective 1, the focal length f1 and the magnification $\beta 1$ of the first lens group, the focal length f2 and the magnification $\beta 2$ of the second lens group, and the focal length f3 of the third lens group are described below.

$f1 = 9.05$ mm, $\beta 1 = -5.213$, $f2 = -63.737$ mm, $\beta 2 = 4.455$, $f3 = -167.927$ mm In addition, the focal length ft of the tube lens 11 is described below $ft = 180.499$ mm The lens data of the objective 1 and the tube lens 11 is listed below.

| s | r | d | nd | vd |
|---|---|---|---|---|
| Objective 1 | | | | |
| 1 | INF | 2.5000 | 1.45852 | 67.83 |
| 2 | −10.3591 | 3.7217 | 1.77250 | 49.60 |
| 3 | −8.1150 | 0.2003 | | |
| 4 | −20.7085 | 3.0458 | 1.56907 | 71.30 |
| 5 | −11.9976 | 0.1998 | | |

-continued

| s | r | d | nd | vd |
|---|---|---|---|---|
| 6 | 35.6190 | 4.2045 | 1.56907 | 71.30 |
| 7 | −35.6190 | 0.2005 | | |
| 8 | 51.8971 | 6.0695 | 1.49700 | 81.54 |
| 9 | −15.3535 | 2.1000 | 1.67300 | 38.15 |
| 10 | INF | 3.7191 | 1.49700 | 81.54 |
| 11 | −21.3761 | da | | |
| 12 | −39.3962 | 2.0000 | 1.61340 | 44.27 |
| 13 | 14.5803 | 9.3164 | 1.43875 | 94.93 |
| 14 | −10.9287 | 2.0500 | 1.74100 | 52.64 |
| 15 | −21.2621 | db | | |
| 16 | 13.0526 | 4.8888 | 1.49700 | 81.54 |
| 17 | 62.3697 | 0.2000 | | |
| 18 | 14.3893 | 4.9710 | 1.49700 | 81.54 |
| 19 | 77.8199 | 2.2000 | 1.77250 | 49.60 |
| 20 | 6.5287 | 6.1712 | | |
| 21 | −10.6452 | 2.2000 | 1.61340 | 44.27 |
| 22 | INF | 7.5351 | | |
| 23 | 104.6788 | 3.7831 | 1.67300 | 38.15 |
| 24 | −24.3402 | | | |
| | | Tube lens 11 | | |
| 25 | 68.7541 | 7.7321 | 1.48749 | 70.21 |
| 26 | −37.5679 | 3.4742 | 1.80610 | 40.95 |
| 27 | −102.8477 | 0.6973 | | |
| 28 | 84.3099 | 6.0238 | 1.83400 | 37.17 |
| 29 | −50.7100 | 3.0298 | 1.64450 | 40.82 |
| 30 | 40.6619 | | | |

In the list above, s indicates a surface number, r indicates a curvature radius (mm), d indicates a surface interval (mm), nd indicates the refractive index for the d line, and vd indicates the Abbe number for the d line. The surface number s1 indicates the first surface (surface closest to the object) of the objective 1, the surface number s24 indicates the surface closest to the image of the objective 1. The surface number s25 indicates the first surface (surface closest to the object) of the tube lens 11, and the surface number s30 indicates the surface closest to the image of the tube lens 11. The interval between the objective 1 and the tube lens 11 is 116.096 mm.

Furthermore, the surface interval d11 between the surface number s11 and the surface number s12 and the surface interval d15 between the surface number s15 and the surface number s16 are variables da and db respectively which depend on the movement of the second lens group G2 (cemented lens CL3) in the optical axis direction. The variables da and db are adjusted by the correction ring to appropriately correct the spherical aberration which changes depending on the change in optical path length between the objective 1 and the focal position.

The relationship between the state of the medium between the objective 1 and the focal position FP and the variables da and db after the correction of the spherical aberration by the correction ring is expressed as follows.

| | First state | | Second state | | Third state | |
|---|---|---|---|---|---|---|
| | Thickness (mm) | average refractive index | Thickness (mm) | average refractive index | Thickness (mm) | average refractive index |
| S | 0 | 1.35103 | 2 | 1.3652 | 3.9128 | 1.38568 |
| CG | 0 | 1.51446 | 0 | 1.51446 | 0.17 | 1.51446 |
| IM | 3.9833 | 1.32782 | 2.0364 | 1.3589 | 0 | 1.37944 |
| da | 0.2342 | — | 1.2507 | — | 2.0504 | — |
| db | 2.3051 | — | 1.2886 | — | 0.4889 | — |

The data above exemplifies the relationships, in order from left to right, in the case where the sample plane SP is observed, in the case where the inside of the sample (depth of 2 mm) is observed, and in the case where the inside deeper in the sample (depth of 3.9128 mm) is observed. S indicates a sample, CG indicates a cover glass, and IM indicates an immersion. The average refractive index refers to the average refractive index for the light of 900 nm. The cover glass CG is used only when the inside deeper in the sample (depth of 3.9128 mm) is observed.

The objective 1 according to the present embodiment satisfies the conditional expressions (1) through (9) except the conditional expression (8) as expressed by the following expressions (A1) through (A9). The expressions (A1) through (A9) respectively correspond to the conditional expressions (1) through (9).

$$NA \times d0 = 4.036 \text{ mm} \tag{A1}$$

$$d0/d1 = 0.651 \tag{A2}$$

$$nd2 - nd1 = 0.306 \tag{A3}$$

$$R1/R2 = 1.277 \tag{A4}$$

$$R1/L = -0.140 \tag{A5}$$

$$\frac{\left[\text{Max}\left(\sum_{i=1}^{N}(W_i \times n_i)\right) - \text{Min}\left(\sum_{i=1}^{N}(W_i \times n_i)\right)\right]}{f} = 0.043 \tag{A6}$$

$$1/\beta = -0.192 \tag{A7}$$

$$|\beta 2| = 4.455 \tag{A8}$$

$$f/f2 = -0.113 \tag{A9}$$

With λ=900 nm, the wavefront aberration is 0.012λ (that is, 1.2% of the wavelength λ).

Figure 4C:
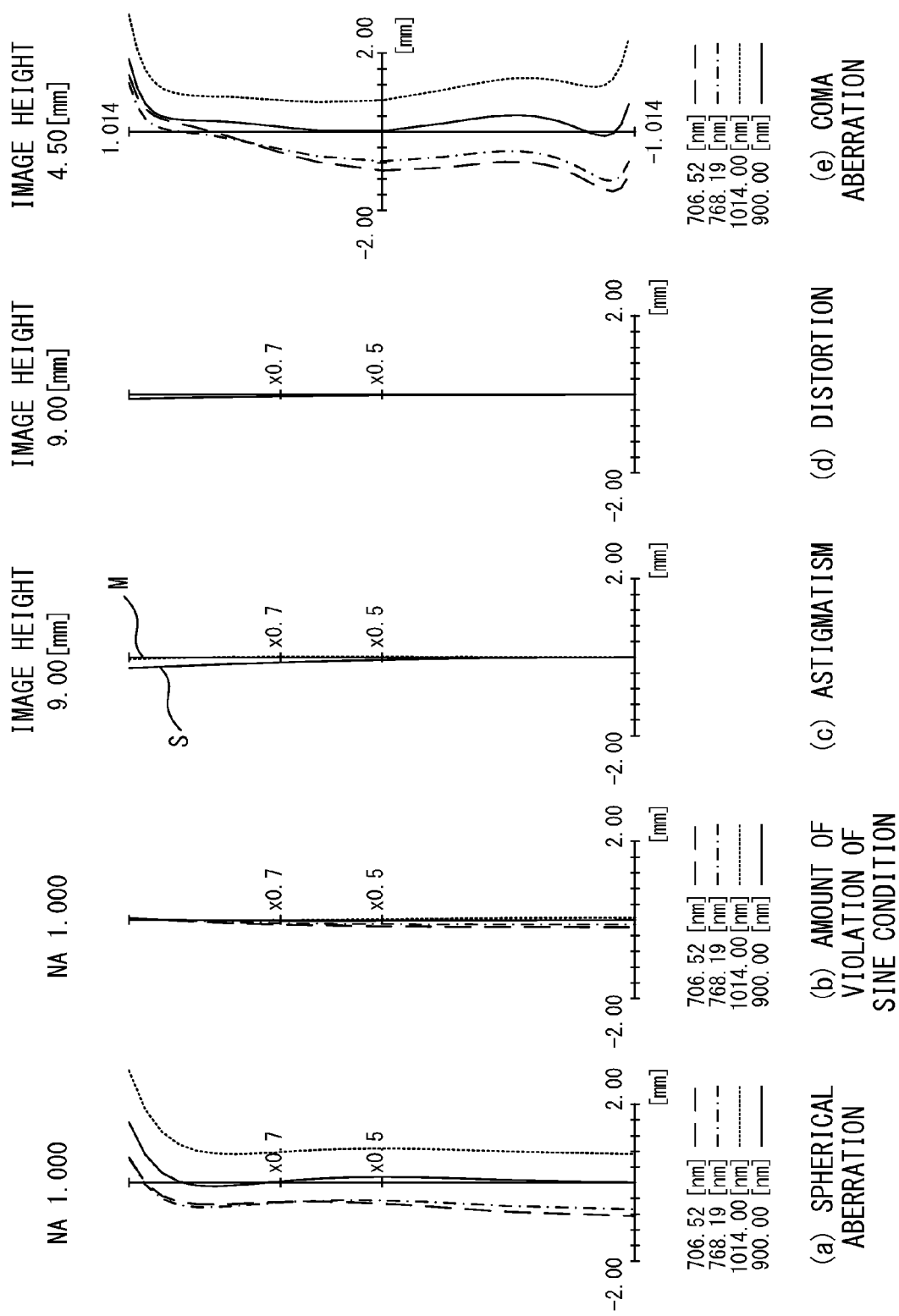
FIG. 4C is a further view illustrating the aberration when the immersion microscope objective exemplified in FIG. 1 and the tube lens exemplified in FIG. 3 are used in combination.

FIGS. 4A, 4B, and 4C illustrate the aberrations when the objective 1 according to the present embodiment and the tube lens 11 are used in combination, and illustrate the aberration on the imaging plane on the image side. Each of FIGS. 4A, 4B, and 4C respectively illustrates the aberration with the settings above in the case where the sample plane SP is observed, in the case where the inside of the sample (depth of 2 mm) is observed, and in the case where the inside deeper in the sample (depth of 3.9128 mm) is observed. Each of FIGS. 4A, 4B, and 4C illustrates, in order from left to right, (a) spherical aberration, (b) amount of violation against sine condition, (c) astigmatism, (d) distortion, and (e) coma aberration. Each view illustrates an appropriate correction. "M" and "S" in the view of the astigmatism respectively indicate a meridional component and a sagittal component.

Embodiment 2

Figure 5:
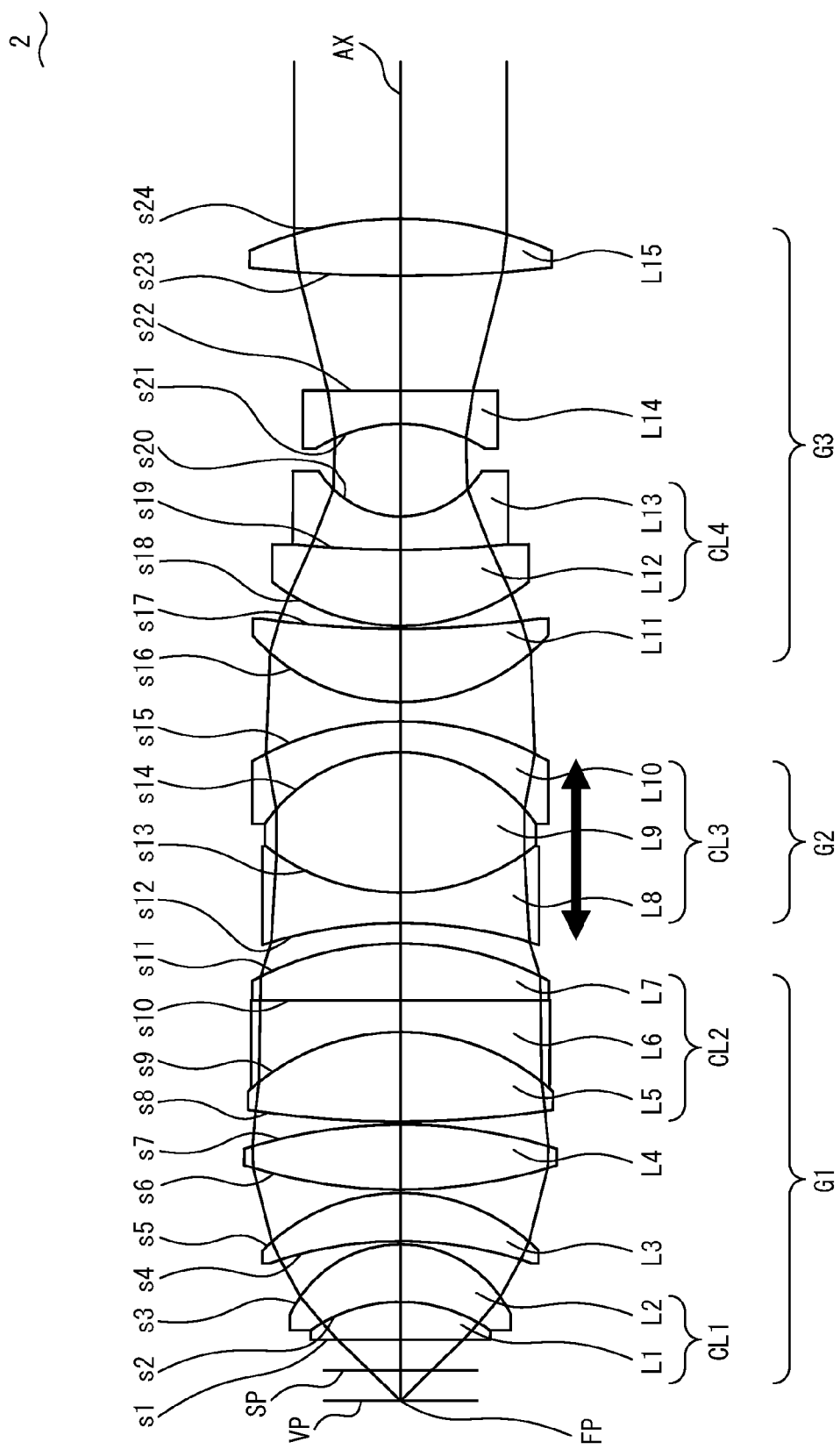
FIG. 5 is a sectional view of the immersion microscope objective according to the embodiment 2.

FIG. 5 is a sectional view of the immersion microscope objective according to the present embodiment. An objective 2 illustrated in FIG. 5 is an immersion microscope objective, and the lens configuration is the same as that of the objective 1 according to the embodiment 1, and the detailed explanation is omitted here.

The space between the objective 2 and the sample plane SP is filled with the immersion not illustrated in the attached drawings. In the example in FIG. 5, the focal position FP of the objective 2 is located in the sample, and the observation plane VP is observed by the objective 2.

Described below are various types of data of the objective 2 according to the present embodiment.

In the objective 2, a magnification β in the second state, a numerical aperture NA on the object side, a focal length f, a total length L, a working distance d0, and a thickness d1 of a lens component closest to the object are described below.

β=−24.98, NA=1.0, f=7.223 mm, L=73.961 mm, d0=4.036 mm, d1=6.302 mm

In the objective 2, the focal length f1 and the magnification β1 of the first lens group, the focal length f2 and the magnification β2 of the second lens group, and the focal length f3 of the third lens group are described below.

f1=9.001 mm, β1=−4.936, f2=−60.587 mm, β2=4.682, f3=−167.236 mm

The lens data of the objective 2 is listed below.

| Objective 2 | | | | |
|---|---|---|---|---|
| s | r | d | nd | vd |
| 1 | INF | 2.5000 | 1.45852 | 67.83 |
| 2 | −10.3591 | 3.8017 | 1.77250 | 49.60 |
| 3 | −8.1150 | 0.2026 | | |
| 4 | −26.6221 | 3.1832 | 1.56907 | 71.30 |
| 5 | −12.9210 | 0.2000 | | |
| 6 | 34.0995 | 4.3097 | 1.56907 | 71.30 |
| 7 | −34.0995 | 0.2000 | | |
| 8 | 68.0280 | 5.9020 | 1.49700 | 81.54 |
| 9 | −14.9981 | 2.1000 | 1.67300 | 38.15 |
| 10 | INF | 3.7468 | 1.49700 | 81.54 |
| 11 | −20.8746 | da | | |
| 12 | −29.8307 | 2.0000 | 1.61340 | 44.27 |
| 13 | 14.5426 | 9.2598 | 1.43875 | 94.93 |
| 14 | −10.9368 | 2.0500 | 1.74100 | 52.64 |
| 15 | −19.6665 | db | | |
| 16 | 13.1254 | 4.8429 | 1.49700 | 81.54 |
| 17 | 63.3527 | 0.2000 | | |
| 18 | 13.9196 | 5.0144 | 1.49700 | 81.54 |
| 19 | 70.2577 | 2.2000 | 1.77250 | 49.60 |
| 20 | 6.3985 | 6.1141 | | |
| 21 | −10.4387 | 2.2000 | 1.61340 | 44.27 |
| 22 | INF | 7.5589 | | |
| 23 | 95.6591 | 3.7794 | 1.67300 | 38.15 |
| 24 | −24.6815 | | | |

The relationship between the state of the medium between the objective 2 and the focal position FP and the variables da and db after the correction of the spherical aberration by the correction ring is expressed as follows.

| | First state | | Second state | | Third state | |
|---|---|---|---|---|---|---|
| | Thickness (mm) | average refractive index | Thickness (mm) | average refractive index | Thickness (mm) | average refractive index |
| S | 0 | 1.35103 | 2 | 1.3652 | 4 | 1.38568 |
| CG | 0 | 1.51446 | 0 | 1.51446 | 0.17 | 1.51446 |
| IM | 3.976 | 1.32666 | 2.03 | 1.3589 | 0.0004 | 1.37944 |
| da | 0.3891 | — | 1.3439 | — | 2.0756 | — |
| db | 2.2067 | — | 1.2520 | — | 0.5203 | — |

The data above exemplifies the relationships, in order from left to right, in the case where the sample plane SP is observed, in the case where the inside of the sample (depth of 2 mm) is observed, and in the case where the inside deeper in the sample (depth of 4 mm) is observed. S indicates a sample, CG indicates a cover glass, and IM indicates an immersion. The average refractive index refers to the average refractive index for the light of 900 nm. The cover glass CG is used only when the inside deeper in the sample (depth of 4 mm) is observed.

The objective 2 according to the present embodiment satisfies the conditional expressions (1) through (9) except the conditional expression (8) as expressed by the following expressions (B1) through (B9). The expressions (B1) through (B9) respectively correspond to the conditional expressions (1) through (9).

$$NA \times d0 = 4.036 \text{ mm} \tag{B1}$$

$$d0/d1 = 0.631 \tag{B2}$$

$$nd2 - nd1 = 0.306 \tag{B3}$$

$$R1/R2 = 1.277 \tag{B4}$$

$$R1/L = -0.140 \tag{B5}$$

$$\frac{\left[\text{Max}\left(\sum_{i=1}^{N}(W_i \times n_i)\right) - \text{Min}\left(\sum_{i=1}^{N}(W_i \times n_i)\right)\right]}{f} = 0.055 \tag{B6}$$

$$1/\beta1 = -0.203 \tag{B7}$$

$$|\beta2| = 4.682 \tag{B8}$$

$$f/f2 = -0.119 \tag{B9}$$

With λ=900 nm, the wavefront aberration is 0.009λ (that is, 0.9% of the wavelength λ).

Figure 6B:
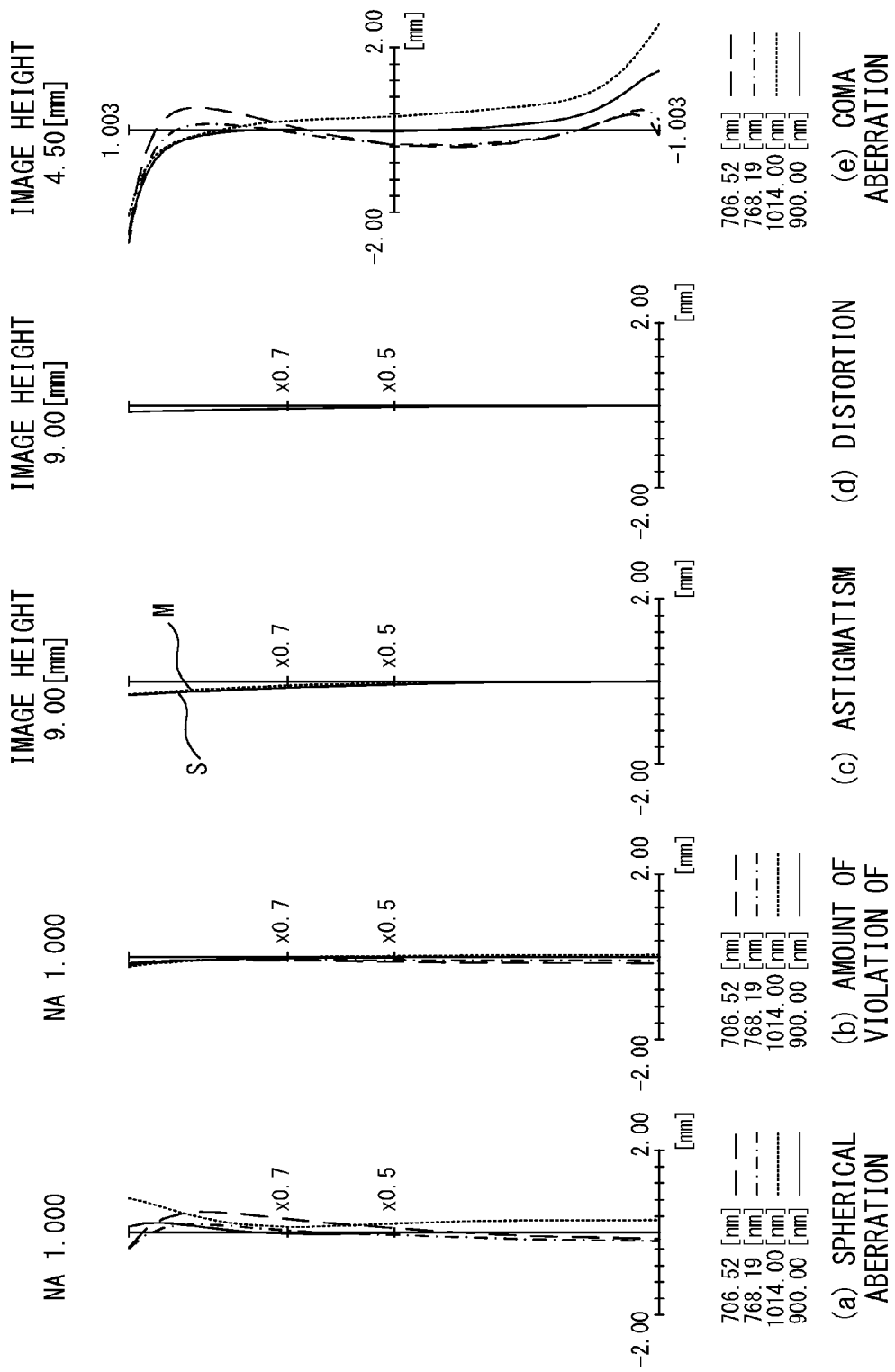
FIG. 6B is another view illustrating the aberration when the immersion microscope objective exemplified in FIG. 5 and the tube lens exemplified in FIG. 3 are used in combination.
Figure 6C:
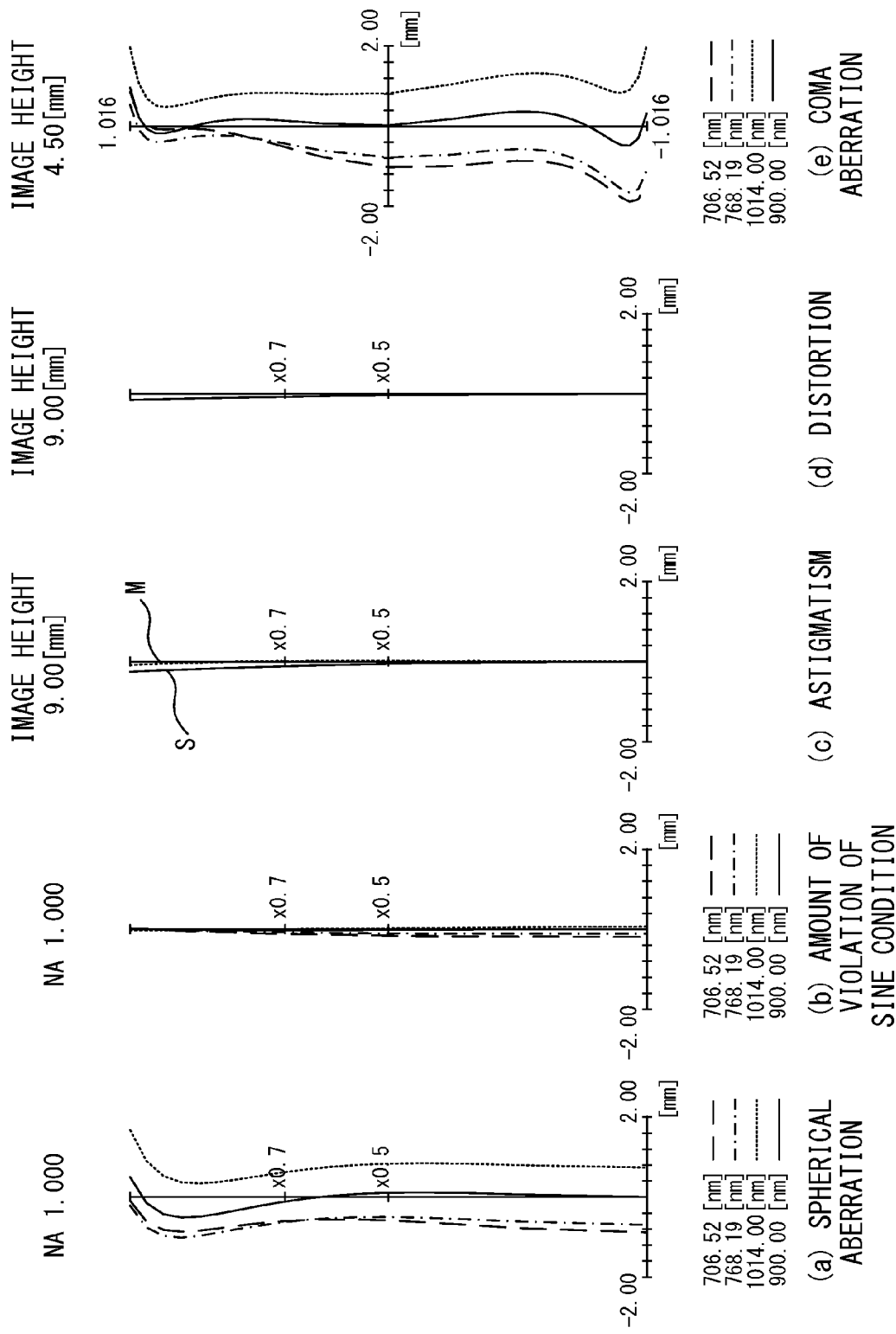
FIG. 6C is a further view illustrating the aberration when the immersion microscope objective exemplified in FIG. 5 and the tube lens exemplified in FIG. 3 are used in combination.

FIGS. 6A, 6B, and 6C illustrate the aberrations when the objective 2 according to the present embodiment and the tube lens 11 exemplified in FIG. 3 are used in combination, and illustrate the aberration on the imaging plane on the image side. Each of FIGS. 6A, 6B, and 6C respectively illustrates the aberration with the settings above in the case where the sample plane SP is observed, in the case where the inside of the sample (depth of 2 mm) is observed, and in the case where the inside deeper in the sample (depth of 4 mm) is observed. Each of FIGS. 6A, 6B, and 6C illustrates, in order from left to right, (a) spherical aberration, (b) amount of violation against sine condition, (c) astigmatism, (d) distortion, and (e) coma aberration. Each view illustrates an appropriate correction. "M" and "S" in the view of the astigmatism respectively indicate a meridional component and a sagittal component. The interval between the objective 2 and the tube lens 11 is 116.09 mm.

Embodiment 3

Figure 7:
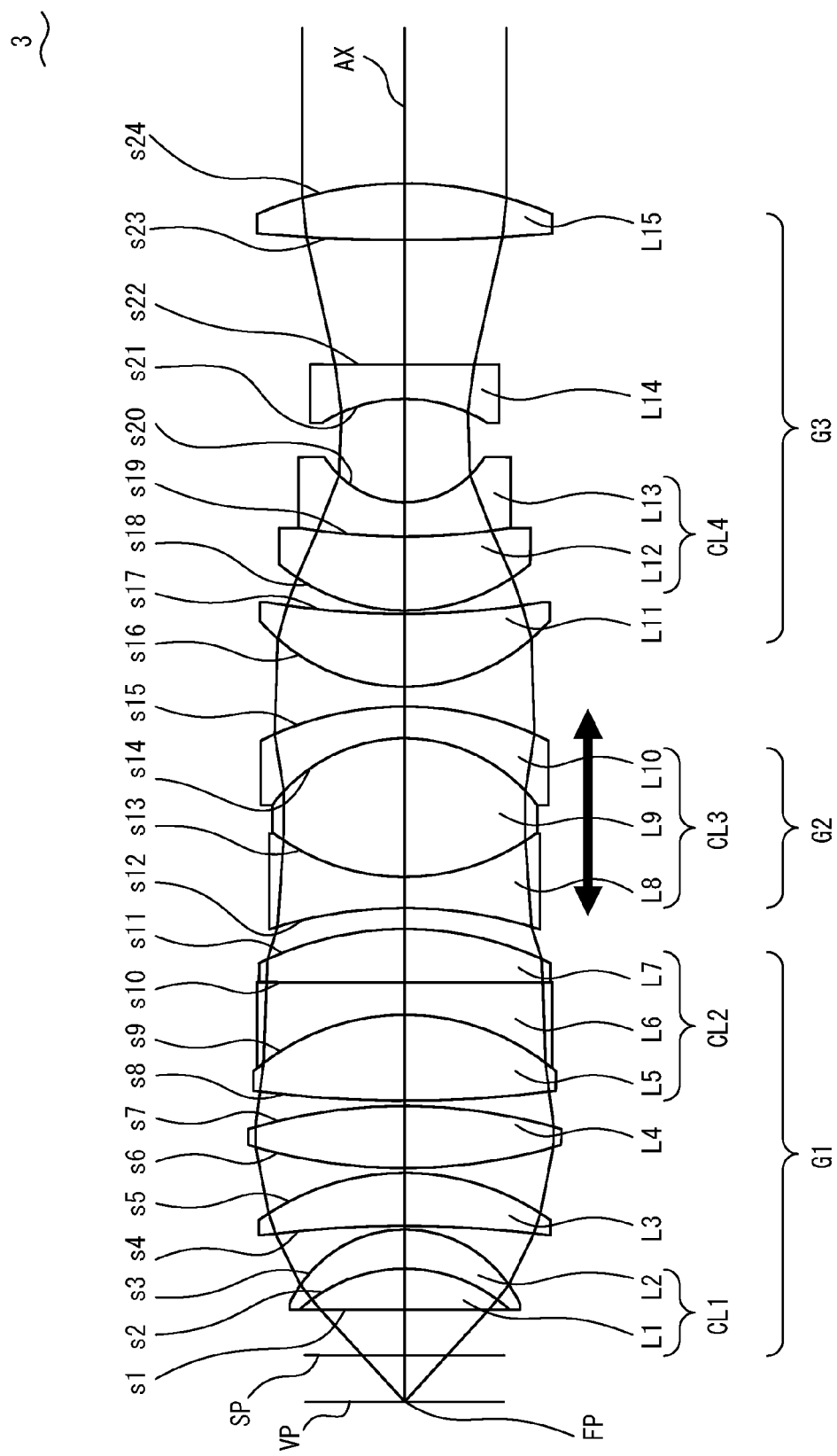
FIG. 7 is a sectional view of the immersion microscope objective according to the embodiment 3.

FIG. 7 is a sectional view of the immersion microscope objective according to the present embodiment. An objective 3 illustrated in FIG. 7 is an immersion microscope objective, and the lens configuration is the same as that of the objective 1 according to the embodiment 1, and the detailed explanation is omitted here.

The space between the objective 3 and the sample plane SP is filled with the immersion not illustrated in the attached drawings. In the example in FIG. 7, the focal position FP of the objective 3 is located in the sample, and the observation plane VP is observed by the objective 3.

Described below are various types of data of the objective 3 according to the present embodiment.

In the objective 3, a magnification β in the second state, a numerical aperture NA on the object side, a focal length f, a total length L, a working distance d0, and a thickness d1 of a lens component closest to the object are described below.

β=−24.98, NA=0.95, f=7.223 mm, L=72.330 mm, d0=6.03 mm, d1=5.058 mm

In the objective 3, the focal length f1 and the magnification β1 of the first lens group, the focal length f2 and the magnification β2 of the second lens group, and the focal length f3 of the third lens group are described below.

f1=9.298 mm, β1=−4.321, f2=−49.232 mm, β2=6, f3=−187.647 mm

The lens data of the objective 3 is listed below.

Objective 3

| s | r | d | nd | vd |
|---|---|---|---|---|
| 1 | INF | 2.5000 | 1.45852 | 67.83 |
| 2 | −10.3591 | 2.5578 | 1.77250 | 49.60 |
| 3 | −8.3631 | 0.2096 | | |
| 4 | −75.0048 | 3.4190 | 1.56907 | 71.30 |
| 5 | −16.6318 | 0.2990 | | |
| 6 | 36.0431 | 4.0187 | 1.56907 | 71.30 |
| 7 | −36.0431 | 0.3197 | | |
| 8 | 76.8450 | 5.5288 | 1.49700 | 81.54 |
| 9 | −15.4459 | 2.1000 | 1.67300 | 38.15 |
| 10 | INF | 3.4283 | 1.49700 | 81.54 |
| 11 | −21.7765 | da | | |
| 12 | −29.3326 | 2.0000 | 1.61340 | 44.27 |
| 13 | 14.7362 | 8.9160 | 1.43875 | 94.93 |
| 14 | −10.9727 | 2.0500 | 1.74100 | 52.64 |
| 15 | −21.2817 | db | | |
| 16 | 12.7915 | 4.7093 | 1.49700 | 81.54 |
| 17 | 57.2161 | 0.2000 | | |
| 18 | 12.9216 | 4.7594 | 1.49700 | 81.54 |
| 19 | 43.9842 | 2.2000 | 1.77250 | 49.60 |
| 20 | 6.2020 | 6.6686 | | |
| 21 | −10.2589 | 2.2000 | 1.61340 | 44.27 |
| 22 | INF | 7.9886 | | |
| 23 | 109.6531 | 3.6576 | 1.67300 | 38.15 |
| 24 | −24.8540 | | | |

The relationship between the state of the medium between the objective 3 and the focal position FP and the variables da and db after the correction of the spherical aberration by the correction ring is expressed as follows.

| | First state | | Second state | | Third state | |
|---|---|---|---|---|---|---|
| | Thickness (mm) | average refractive index | Thickness (mm) | average refractive index | Thickness (mm) | average refractive index |
| S | 0 | 1.35103 | 3 | 1.3652 | 5.9241 | 1.38568 |
| CG | 0 | 1.51446 | 0 | 1.51446 | 0.17 | 1.51446 |
| IM | 5.9496 | 1.32782 | 3.03 | 1.3589 | 0 | 1.37944 |
| da | 0.3438 | — | 1.3465 | — | 2.124 | — |
| db | 2.2561 | — | 1.2533 | — | 0.4759 | — |

The data above exemplifies the relationships, in order from left to right, in the case where the sample plane SP is observed, in the case where the inside of the sample (depth of 3 mm) is observed, and in the case where the inside deeper in the sample (depth of 5.9241 mm) is observed. S indicates a sample, CG indicates a cover glass, and IM indicates an immersion. The average refractive index refers to the average refractive index for the light of 900 nm. The cover glass CG is used only when the inside deeper in the sample (depth of 5.9241 mm) is observed.

The objective 3 according to the present embodiment satisfies the conditional expressions (1) through (9) except the conditional expression (8) as expressed by the following expressions (C1) through (C9). The expressions (C1) through (C9) respectively correspond to the conditional expressions (1) through (9).

$$NA \times d0 = 5.729 \text{ mm} \tag{C1}$$

$$d0/d1 = 1.176 \tag{C2}$$

$$nd2 - nd1 = 0.306 \tag{C3}$$

$$R1/R2 = 1.239 \tag{C4}$$

$$R1/L = -0.143 \tag{C5}$$

$$\frac{\left[\text{Max}\left(\sum_{i=1}^{N}(W_i \times n_i)\right) - \text{Min}\left(\sum_{i=1}^{N}(W_i \times n_i)\right)\right]}{f} = 0.078 \tag{C6}$$

$$1/\beta1 = -0.231 \tag{C7}$$

$$|\beta2| = 6 \tag{C8}$$

$$f/f2 = -0.147 \tag{C9}$$

With λ=900 nm, the wavefront aberration is 0.009λ (that is, 0.9% of the wavelength λ).

Figure 8A:
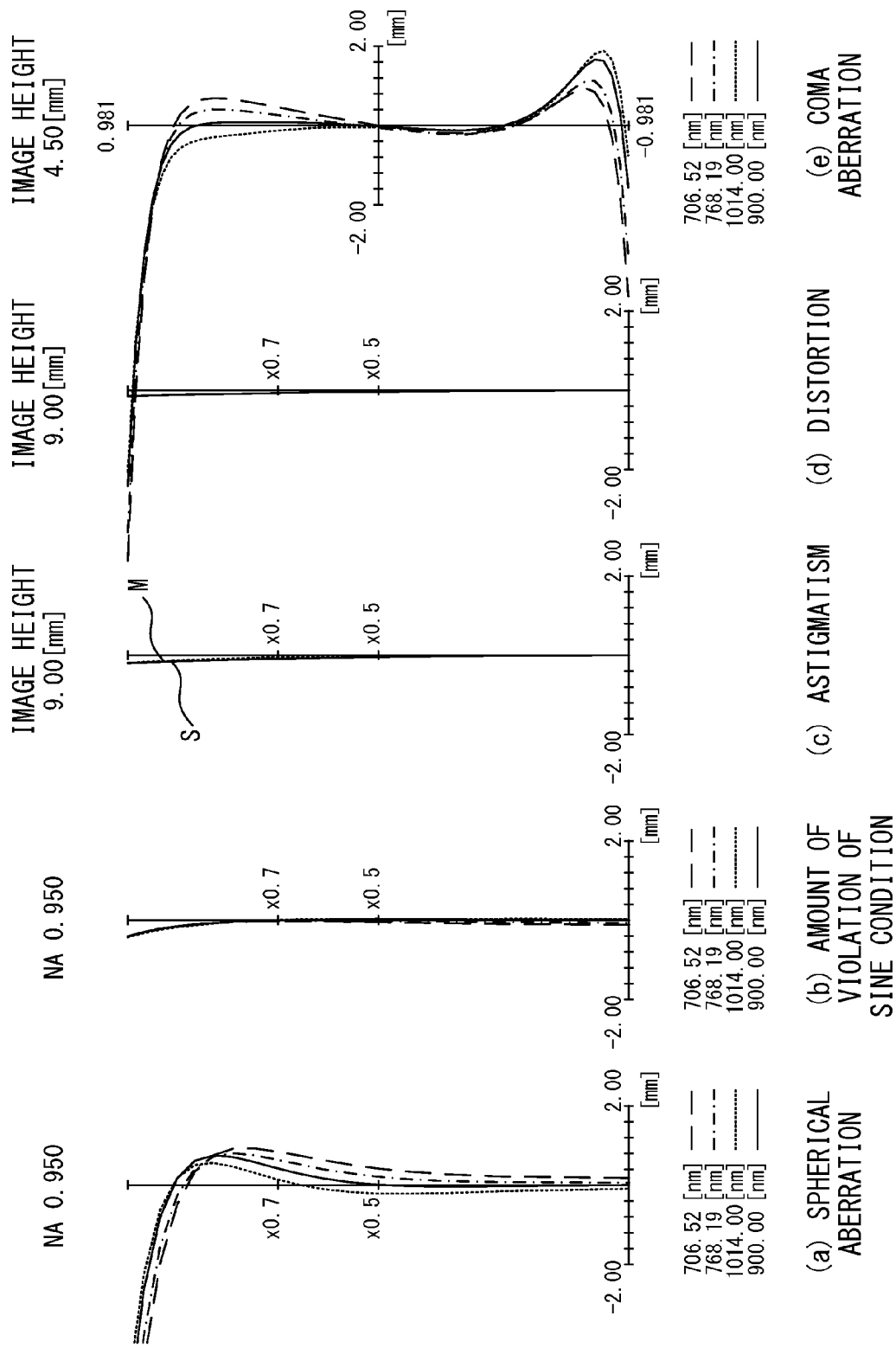
FIG. 8A is a view illustrating the aberration when the immersion microscope objective exemplified in FIG. 7 and the tube lens exemplified in FIG. 3 are used in combination.
Figure 8B:
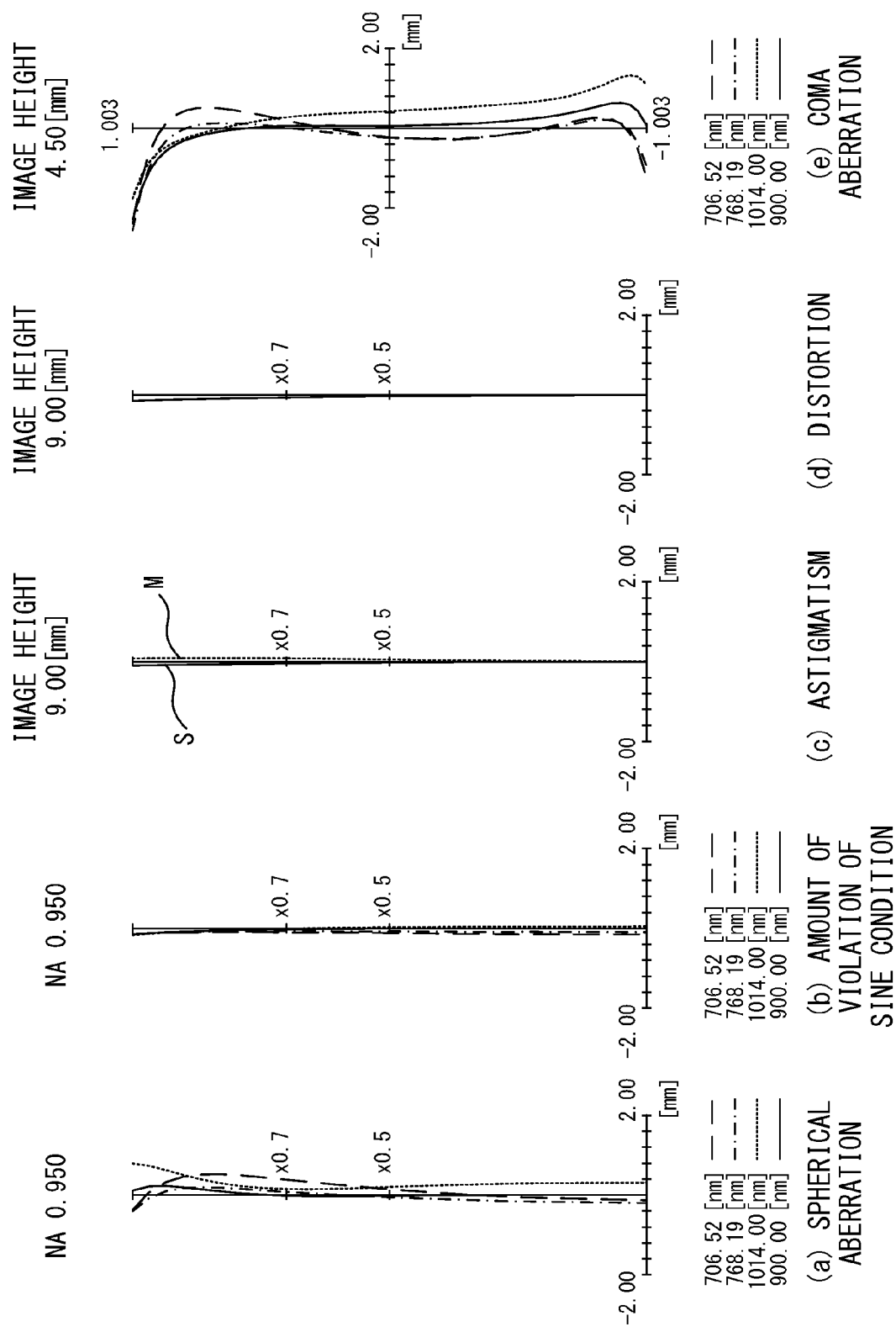
FIG. 8B is another view illustrating the aberration when the immersion microscope objective exemplified in FIG. 7 and the tube lens exemplified in FIG. 3 are used in combination.

FIGS. 8A, 8B, and 8C illustrate the aberrations when the objective 3 according to the present embodiment and the tube lens 11 exemplified in FIG. 3 are used in combination, and illustrate the aberration on the imaging plane on the image side. Each of FIGS. 8A, 8B, and 8C respectively illustrates the aberration with the settings above in the case where the sample plane SP is observed, in the case where the inside of the sample (depth of 3 mm) is observed, and in the case where the inside deeper in the sample (depth of 5.9241 mm) is observed. Each of FIGS. 8A, 8B, and 8C illustrates, in order from left to right, (a) spherical aberration, (b) amount of violation against sine condition, (c) astigmatism, (d) distortion, and (e) coma aberration. Each view illustrates an appropriate correction. "M" and "S" in the view of the astigmatism respectively indicate a meridional component and a sagittal component. The interval between the objective 3 and the tube lens 11 is 115.64 mm.

Embodiment 4

Figure 9:
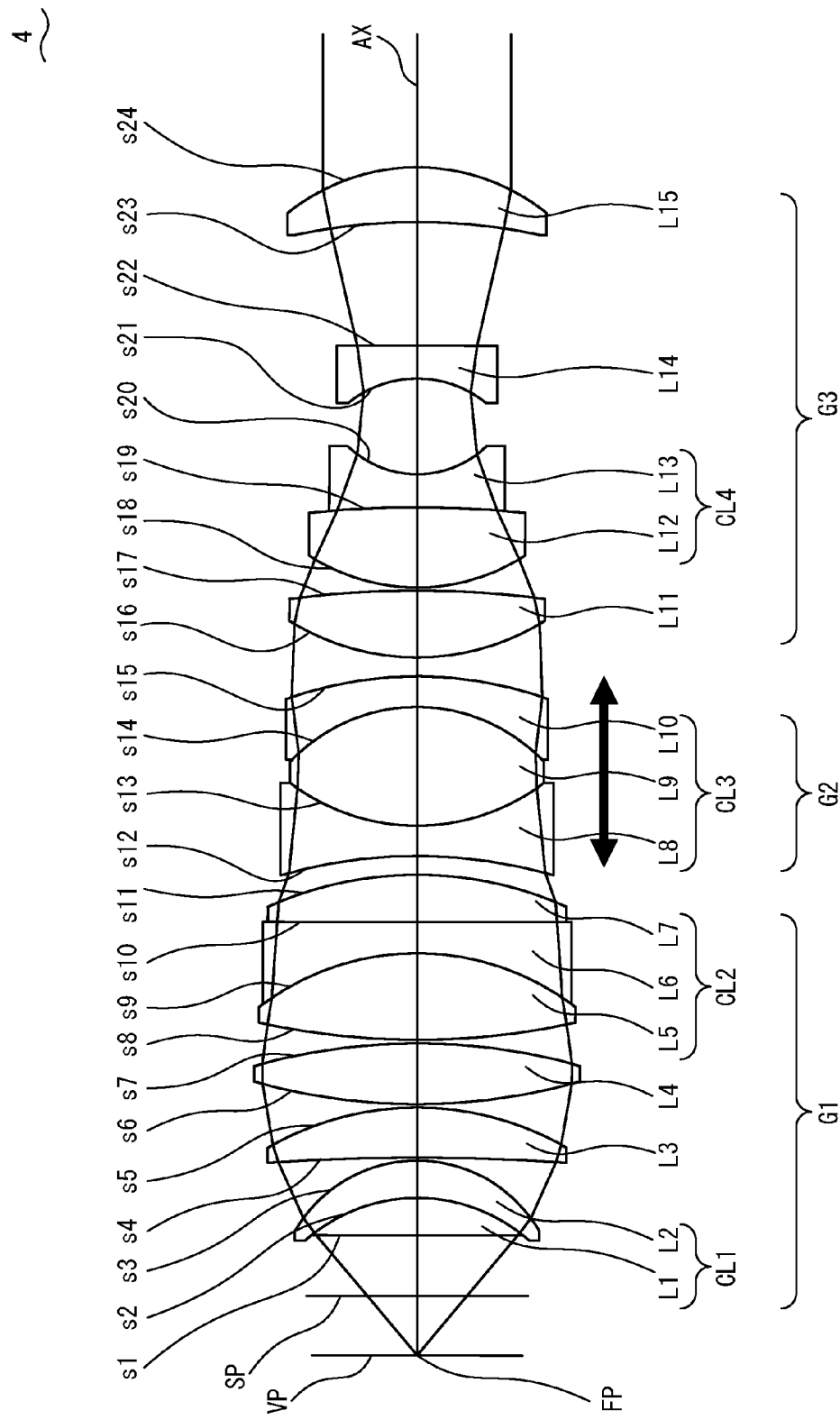
FIG. 9 is a sectional view of the immersion microscope objective according to the embodiment 4.

FIG. 9 is a sectional view of the immersion microscope objective according to the present embodiment. An objective 4 illustrated in FIG. 9 is an immersion microscope objective, and the lens configuration is the similar as that of the objective 1 according to the embodiment 1, but is different from the objective 1 according to the embodiment 1 in the configuration of the third lens group G3. Therefore, only the configuration of the third lens group G3 different from the objective 1 according to the embodiment 1 is described below.

The third lens group G3 has negative refractive power on the whole and is configured by, in order from the object side, a forward lens group (lens L11, lens L12, lens L13) having positive refractive power with the surface closest to the image (surface number s20) as a concave surface facing the image side, and a backward lens group (lens L14, lens L15) having negative refractive power with the surface closest to the object (surface number s21) as a concave surface facing the object side.

The forward lens group is configured by, in order from the object side, a double-convex lens (lens L11) and the cemented lens CL4 obtained by combining a double-convex lens (lens L12) and a double-concave lens (lens L13).

The backward lens group is configured by, in order from the object side, a planoconcave lens (lens L14) having its concave surface facing the object side and a meniscus lens (lens L15) having its concave surface facing the object side.

The space between the objective 4 and the sample plane SP is filled with the immersion not illustrated in the attached drawings. In the example in FIG. 9, the focal position FP of the objective 4 is located in the sample, and the observation plane VP is observed by the objective 4.

Described below are various types of data of the objective 4 according to the present embodiment.

In the objective 4, a magnification $\beta$ in the second state, a numerical aperture NA on the object side, a focal length f, a total length L, a working distance d0, and a thickness d1 of a lens component closest to the object are described below.

$\beta=-24.98$, NA=0.9, $f=7.223$ mm, $L=71.429$ mm, $d0=8.03$ mm, $d1=5.000$ mm In the objective 4, the focal length f1 and the magnification $\beta 1$ of the first lens group, the focal length f2 and the magnification $\beta 2$ of the second lens group, and the focal length f3 of the third lens group are described below.

$f1=9.939$ mm, $\beta 1=-3.479$, $f2=-40.566$ mm, $\beta 2=6.197$, $f3=-155.967$ mm The lens data of the objective 4 is listed below.

| Objective 4 | | | | |
|---|---|---|---|---|
| s | r | d | nd | vd |
| 1 | INF | 2.5000 | 1.45852 | 67.83 |
| 2 | −11.5000 | 2.5000 | 1.77250 | 49.60 |
| 3 | −9.5926 | 0.2035 | | |
| 4 | −142.7255 | 3.3474 | 1.56907 | 71.30 |
| 5 | −20.2047 | 0.2030 | | |
| 6 | 40.3202 | 4.0947 | 1.56907 | 71.30 |
| 7 | −40.3202 | 0.2128 | | |
| 8 | 49.8999 | 5.8110 | 1.49700 | 81.54 |
| 9 | −17.6397 | 2.1000 | 1.67300 | 38.15 |
| 10 | INF | 3.1467 | 1.49700 | 81.54 |
| 11 | −24.7988 | da | | |
| 12 | −33.1242 | 2.0000 | 1.61340 | 44.27 |
| 13 | 14.2451 | 7.9613 | 1.43875 | 94.93 |
| 14 | −11.8396 | 2.0500 | 1.74100 | 52.64 |
| 15 | −26.2603 | db | | |
| 16 | 16.4118 | 4.4714 | 1.49700 | 81.54 |
| 17 | −68.1763 | 0.2000 | | |
| 18 | 13.4958 | 5.3730 | 1.49700 | 81.54 |
| 19 | −70.7767 | 2.2000 | 1.77250 | 49.60 |
| 20 | 6.7467 | 6.4060 | | |

-continued

| Objective 4 | | | | |
|---|---|---|---|---|
| s | r | d | nd | vd |
| 21 | −7.4984 | 2.2000 | 1.61340 | 44.27 |
| 22 | INF | 8.2700 | | |
| 23 | −39.9265 | 3.6650 | 1.67300 | 38.15 |
| 24 | −14.0048 | | | |

The relationship between the state of the medium between the objective 4 and the focal position FP and the variables da and db after the correction of the spherical aberration by the correction ring is expressed as follows.

| | First state | | Second state | | Third state | |
|---|---|---|---|---|---|---|
| | Thickness (mm) | average refractive index | Thickness (mm) | average refractive index | Thickness (mm) | average refractive index |
| S | 0 | 1.35103 | 4 | 1.3652 | 7.9385 | 1.38568 |
| CG | 0 | 1.51446 | 0 | 1.51446 | 0.17 | 1.51446 |
| IM | 7.9273 | 1.32782 | 4.03 | 1.3589 | 0.0003 | 1.37944 |
| da | 0.3589 | — | 1.2619 | — | 1.9483 | — |
| db | 2.1548 | — | 1.2518 | — | 0.5654 | — |

The data above exemplifies the relationships, in order from left to right, in the case where the sample plane SP is observed, in the case where the inside of the sample (depth of 4 mm) is observed, and in the case where the inside deeper in the sample (depth of 7.9385 mm) is observed. S indicates a sample, CG indicates a cover glass, and IM indicates an immersion. The average refractive index refers to the average refractive index for the light of 900 nm. The cover glass CG is used only when the inside deeper in the sample (depth of 7.9385 mm) is observed.

The objective 4 according to the present embodiment satisfies the conditional expressions (1) through (9) except the conditional expression (8) as expressed by the following expressions (D1) through (C9). The expressions (D1) through (D9) respectively correspond to the conditional expressions (1) through (9).

$NA \times d0 = 7.227$ mm (D1)

$d0/d1 = 1.585$ (D2)

$nd2 - nd1 = 0.306$ (D3)

$R1/R2 = 1.199$ (D4)

$R1/L = -0.161$ (D5)

$$\frac{\left[\text{Max}\left(\sum_{i=1}^{N}(W_i \times n_i)\right) - \text{Min}\left(\sum_{i=1}^{N}(W_i \times n_i)\right)\right]}{f} = 0.101 \quad \text{(D6)}$$

$1/\beta 1 = -0.287$ (D7)

$|\beta 2| = 6.197$ (D8)

$f/f2 = -0.178$ (D9)

With λ=900 nm, the wavefront aberration is 0.007λ (that is, 0.7% of the wavelength λ).

Figure 10A:
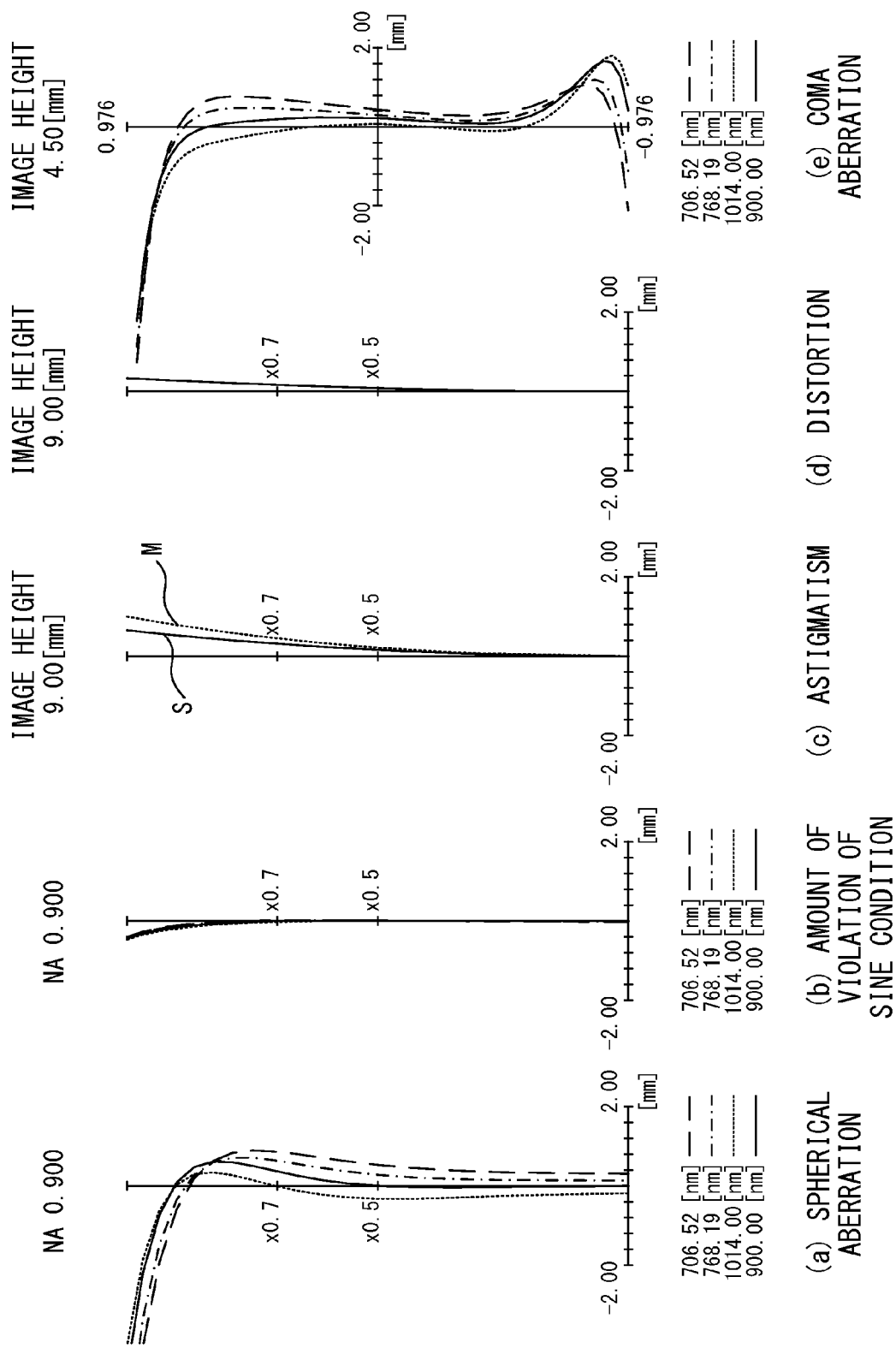
FIG. 10A is a view illustrating the aberration when the immersion microscope objective exemplified in FIG. 9 and the tube lens exemplified in FIG. 3 are used in combination.
Figure 10B:
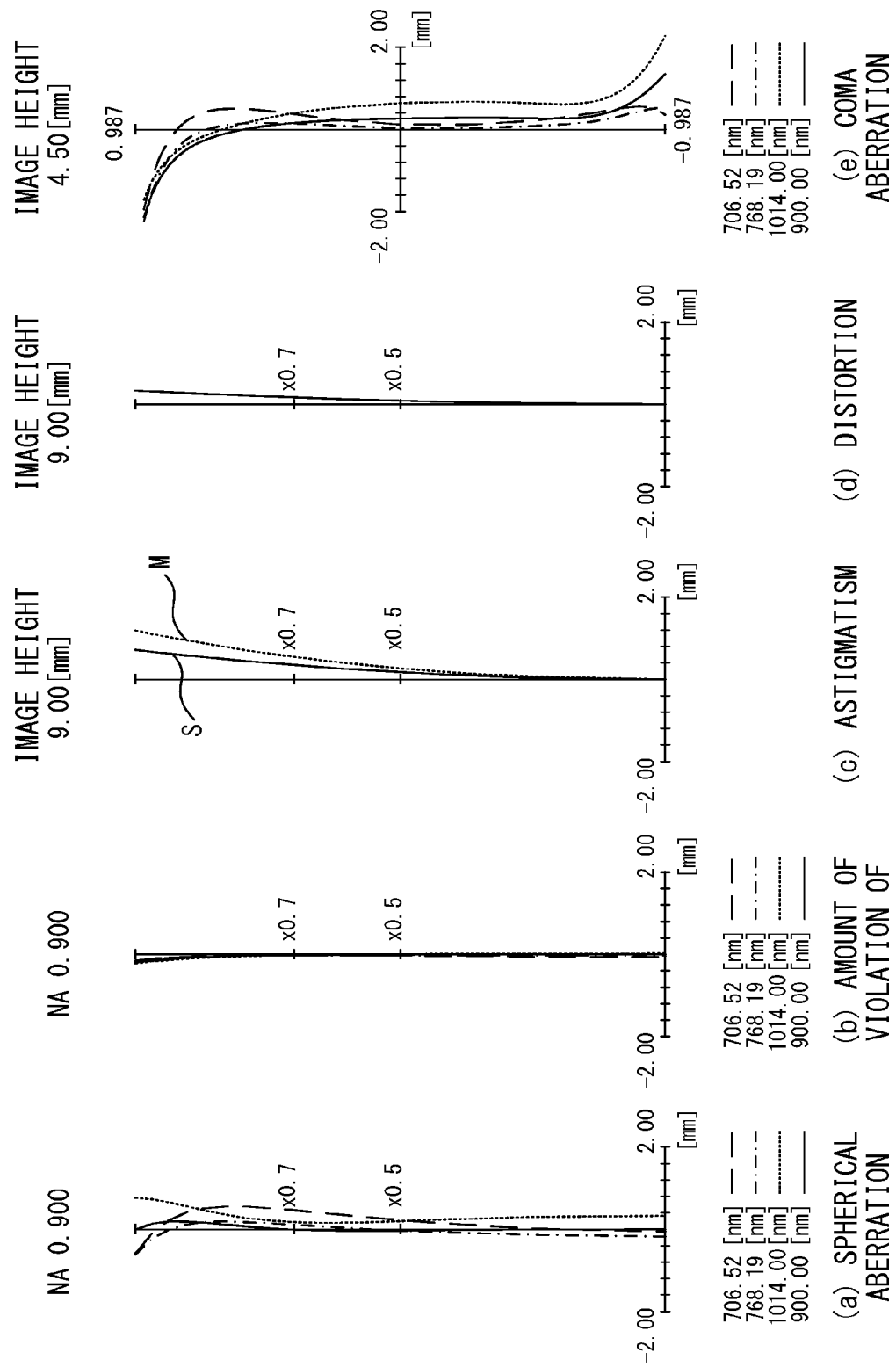
FIG. 10B is another view illustrating the aberration when the immersion microscope objective exemplified in FIG. 9 and the tube lens exemplified in FIG. 3 are used in combination.
Figure 10C:
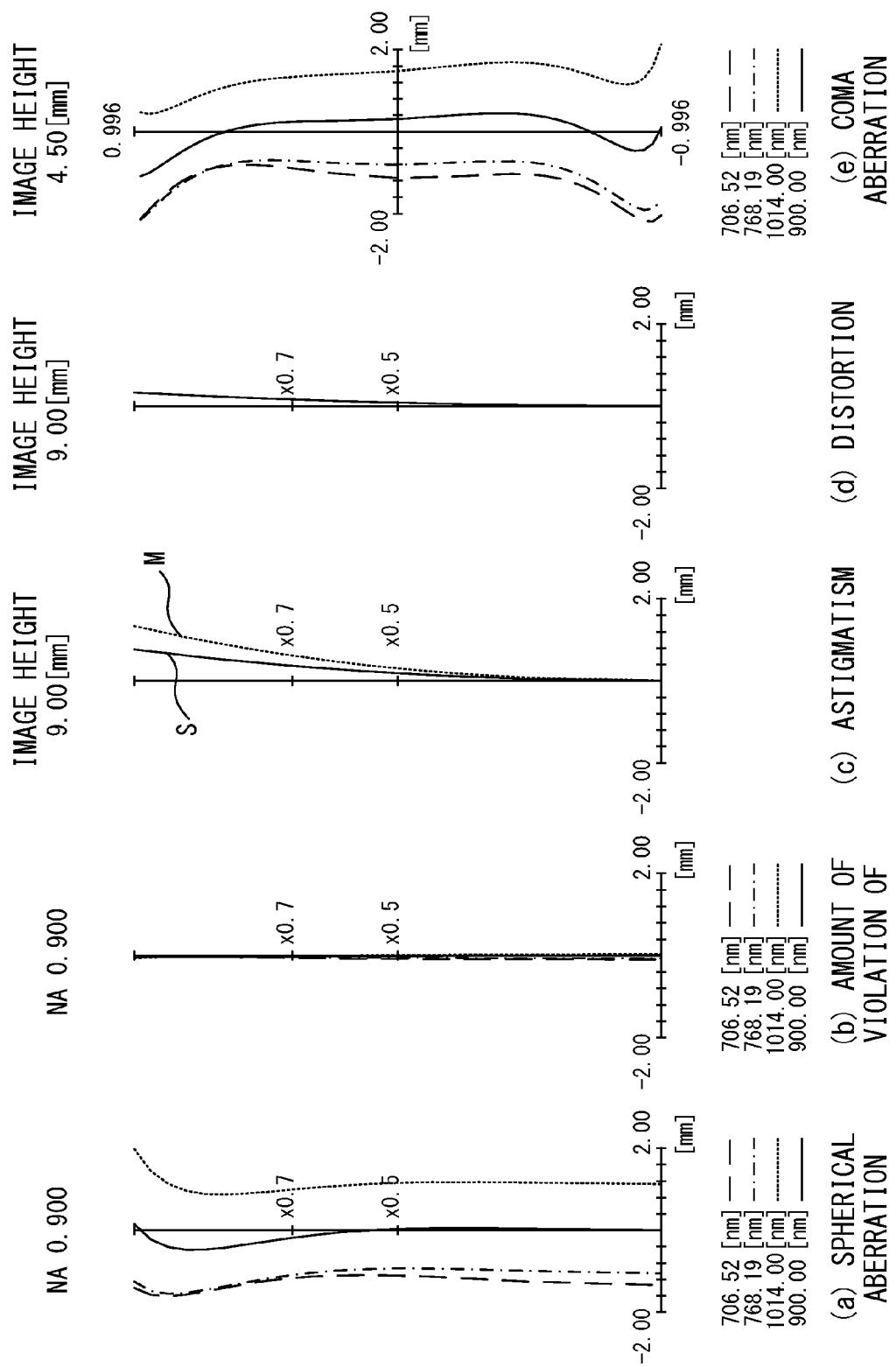
FIG. 10C is a further view illustrating the aberration when the immersion microscope objective exemplified in FIG. 9 and the tube lens exemplified in FIG. 3 are used in combination.

FIGS. 10A, 10B, and 10C illustrate the aberrations when the objective 4 according to the present embodiment and the tube lens 11 exemplified in FIG. 3 are used in combination, and illustrate the aberration on the imaging plane on the image side. Each of FIGS. 10A, 10B, and 10C respectively illustrates the aberration with the settings above in the case where the sample plane SP is observed, in the case where the inside of the sample (depth of 4 mm) is observed, and in the case where the inside deeper in the sample (depth of 7.9385 mm) is observed. Each of FIGS. 10A, 10B, and 10C illustrates, in order from left to right, (a) spherical aberration, (b) amount of violation against sine condition, (c) astigmatism, (d) distortion, and (e) coma aberration. Each view illustrates an appropriate correction. "M" and "S" in the view of the astigmatism respectively indicate a meridional component and a sagittal component. The interval between the objective 4 and the tube lens 11 is 115.541 mm.

Embodiment 5

Figure 11:
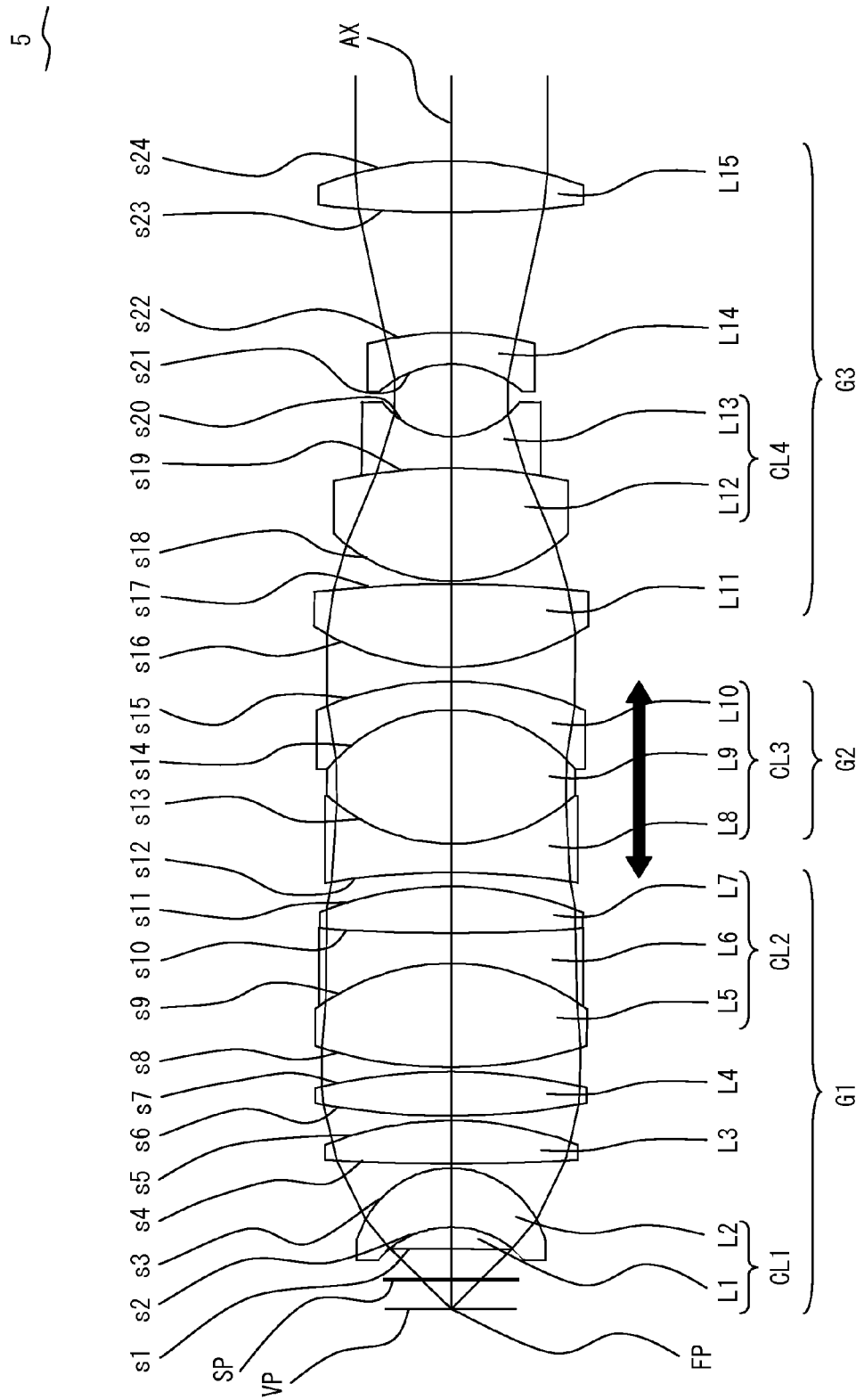
FIG. 11 is a sectional view of the immersion microscope objective according to the embodiment 5.

FIG. 11 is a sectional view of the immersion microscope objective according to the present embodiment. An objective 5 illustrated in FIG. 11 is an immersion microscope objective, and the lens configuration is the similar as that of the objective 1 according to the embodiment 1, but is different from the objective 1 according to the embodiment 1 in the configurations of the first lens group G1 and the third lens group G3. Therefore, only the configurations of first lens group G1 and the third lens group G3 different from the objective 1 according to the embodiment 1 are described below.

The first lens group G1 is configured by, in order from the object side, the cemented lens CL1 having positive refractive power for converting the luminous flux from an object into a convergent luminous flux, a single lens (lens L3) as a double-convex lens, a single lens (lens L4) as a double-convex lens, and a triple cemented lens (cemented lens CL2) having positive refractive power.

The cemented lens CL1 is configured by, in order from the object side, a planoconvex lens (lens L1) having its convex surface facing the image side, and a meniscus lens (lens L2) having its concave surface facing the object side. The cemented lens CL2 is configured by, in order from the object side, a double-convex lens (lens L5), a double-concave lens (lens L6), and a double-convex lens (lens L7).

The third lens group G3 has positive refractive power on the whole and is configured by, in order from the object side, a forward lens group (lens L11, lens L12, lens L13) having positive refractive power with the surface closest to the image (surface number s20) as a concave surface facing the image side, and a backward lens group (lens L14, lens L15) having positive refractive power with the surface closest to the object (surface number s21) as a concave surface facing the object side.

The forward lens group is configured by, in order from the object side, a double-convex lens (lens L11), and the cemented lens CL4 obtained by combining a double-convex lens (lens L12) and a double-concave lens (lens L13).

The backward lens group is configured by, in order from the object side, a meniscus lens (lens L14) having its concave surface facing the object side, and a double-convex lens (lens L15).

The space between the objective 5 and the sample plane SP is filled with the immersion not illustrated in the attached drawings. In the example in FIG. 11, the focal position FP of the objective 5 is located in the sample, and the observation plane VP is observed by the objective 5.

Described below are various types of data of the objective 5 according to the present embodiment.

In the objective 5, a magnification β in the second state, a numerical aperture NA on the object side, a focal length f, a total length L, a working distance d0, and a thickness d1 of a lens component closest to the object are described below.

β=24.98, NA=1.0, f=7.223 mm, L=75.860 mm, d0=4.03 mm, d1=5.630 mm

In the objective 5, the focal length f1 and the magnification β1 of the first lens group, the focal length f2 and the magnification β2 of the second lens group, and the focal length f3 of the third lens group are described below.

f1=8.621 mm, β1=9.637, f2=−67.472 mm, β2=−4.483, f3=308.289 mm

The lens data of the objective 5 is listed below.

| Objective 5 | | | | |
|---|---|---|---|---|
| s | r | d | nd | vd |
| 1 | INF | 1.5400 | 1.45852 | 67.83 |
| 2 | −7.4691 | 4.0897 | 1.77250 | 49.60 |
| 3 | −7.3372 | 0.3000 | | |
| 4 | 155.1922 | 3.0213 | 1.56907 | 71.30 |
| 5 | −26.5121 | 0.3000 | | |
| 6 | 54.1543 | 3.1138 | 1.56907 | 71.30 |
| 7 | −44.3983 | 0.3000 | | |
| 8 | 34.3556 | 7.2572 | 1.49700 | 81.54 |
| 9 | −17.2116 | 2.1000 | 1.67300 | 38.15 |
| 10 | 138.8923 | 3.2396 | 1.49700 | 81.54 |
| 11 | −26.9797 | da | | |
| 12 | −59.2926 | 2.0000 | 1.61340 | 44.27 |
| 13 | 14.0602 | 9.3195 | 1.43875 | 94.93 |
| 14 | −12.1679 | 2.0000 | 1.74100 | 52.64 |
| 15 | −25.1101 | db | | |
| 16 | 19.3230 | 5.7836 | 1.49700 | 81.54 |
| 17 | −94.8819 | 0.1991 | | |
| 18 | 12.9797 | 7.9023 | 1.49700 | 81.54 |
| 19 | −41.4538 | 2.2000 | 1.77250 | 49.60 |
| 20 | 6.5516 | 5.0255 | | |
| 21 | −8.2007 | 2.2000 | 1.61340 | 44.27 |
| 22 | −25.1520 | 8.3667 | | |
| 23 | 88.4682 | 3.6018 | 1.67300 | 38.15 |
| 24 | −28.3992 | | | |

The relationship between the state of the medium between the objective 5 and the focal position FP and the variables da and db after the correction of the spherical aberration by the correction ring is expressed as follows.

| | First state | | Second state | | Third state | |
|---|---|---|---|---|---|---|
| | Thickness (mm) | average refractive index | Thickness (mm) | average refractive index | Thickness (mm) | average refractive index |
| S | 0 | 1.35103 | 2 | 1.35103 | 4 | 1.35103 |
| IM | 4.0014 | 1.32666 | 2.03 | 1.32666 | 0.0583 | 1.32666 |
| da | 0.4594 | — | 1 | — | 1.5672 | — |
| db | 1.5405 | — | 1 | — | 0.4327 | — |

The data above exemplifies the relationships, in order from left to right, in the case where the sample plane SP is observed, in the case where the inside of the sample (depth of 2 mm) is observed, and in the case where the inside deeper in the sample (depth of 4 mm) is observed. S indicates a sample, and IM indicates an immersion. The average refractive index refers to the average refractive index for the light of 900 nm.

The objective 5 according to the present embodiment satisfies the conditional expressions (1) through (9) except the conditional expressions (4), (5), and (8) as expressed by the following expressions (E1) through (E9). The expressions (E1) through (E9) respectively correspond to the conditional expressions (1) through (9).

$$NA \times d0 = 4.03 \text{ mm} \tag{E1}$$

$$d0/d1 = 0.711 \tag{E2}$$

$$nd2 - nd1 = 0.306 \tag{E3}$$

$$R1/R2 = 1.018 \tag{E4}$$

$$R1/L = -0.098 \tag{E5}$$

$$\frac{\left[\text{Max}\left(\sum_{i=1}^{N}(W_i \times n_i)\right) - \text{Min}\left(\sum_{i=1}^{N}(W_i \times n_i)\right)\right]}{f} = 0.024 \tag{E6}$$

$$1/\beta 1 = -0.104 \tag{E7}$$

$$|\beta 2| = 4.483 \tag{E8}$$

$$f/f2 = -0.107 \tag{E9}$$

With λ=900 nm, the wavefront aberration is 0.005λ (that is, 0.5% of the wavelength λ).

Figure 12A:
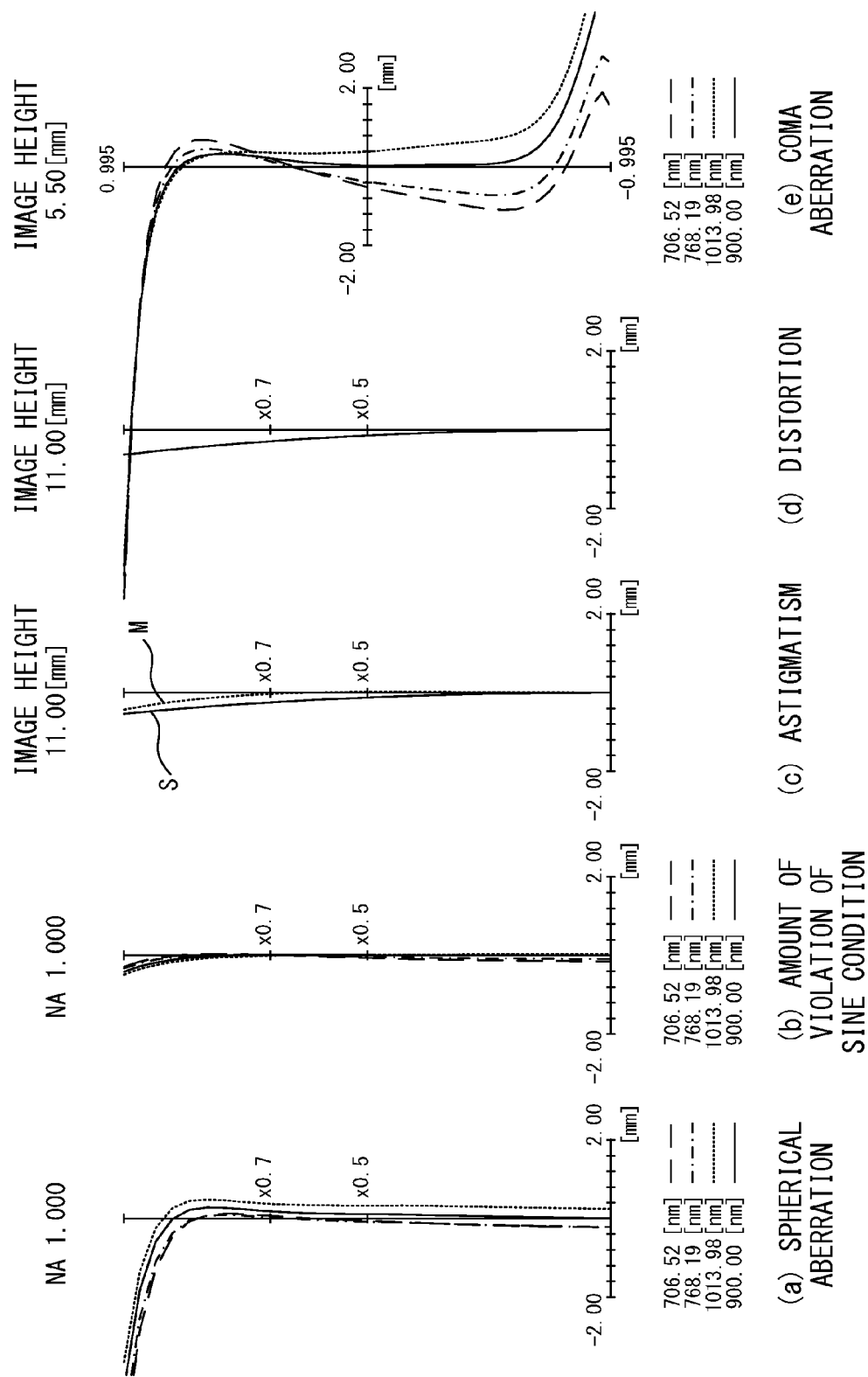
FIG. 12A is a view illustrating the aberration when the immersion microscope objective exemplified in FIG. 11 and the tube lens exemplified in FIG. 3 are used in combination.
Figure 12B:
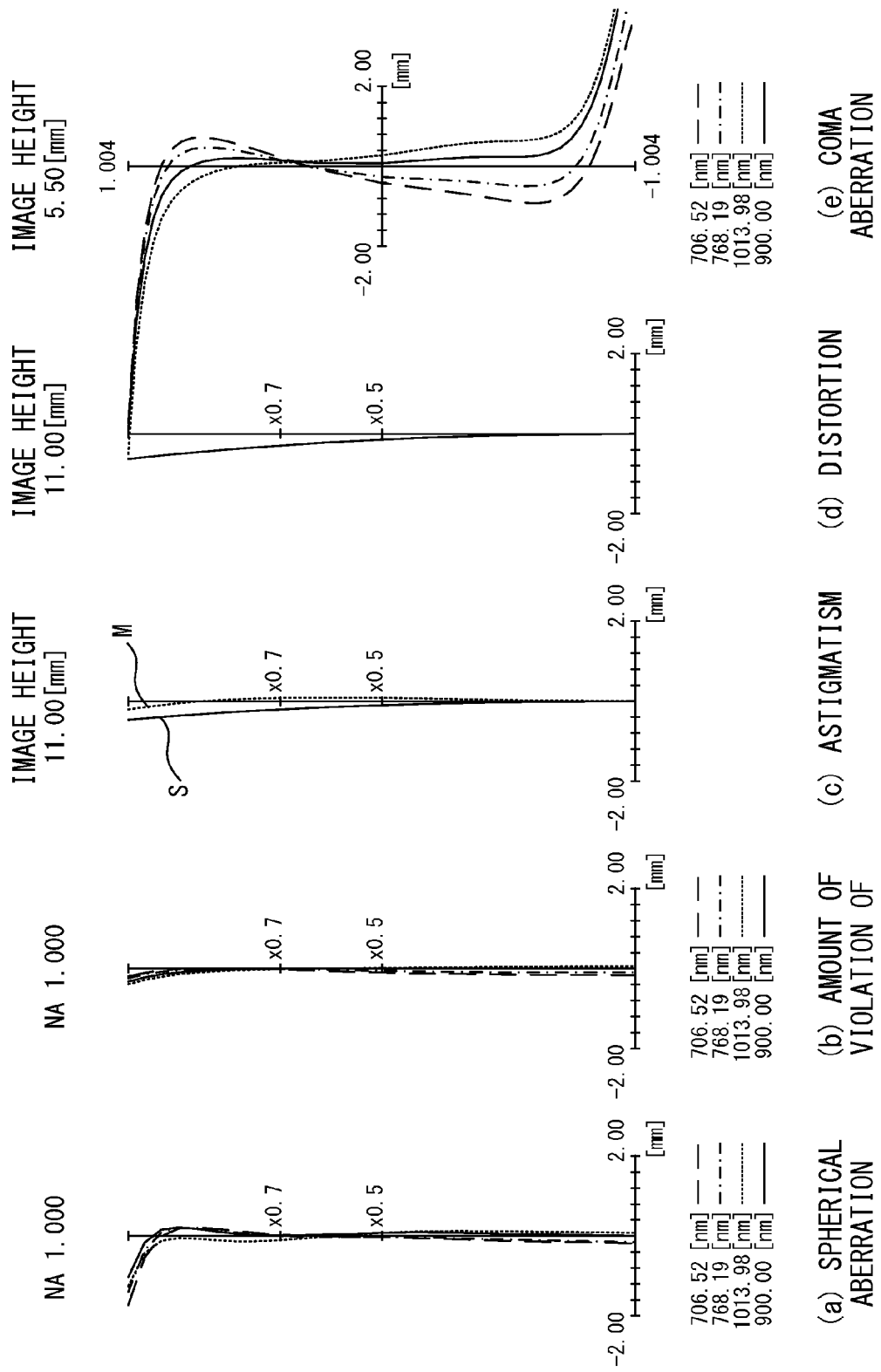
FIG. 12B is another view illustrating the aberration when the immersion microscope objective exemplified in FIG. 11 and the tube lens exemplified in FIG. 3 are used in combination.
Figure 12C:
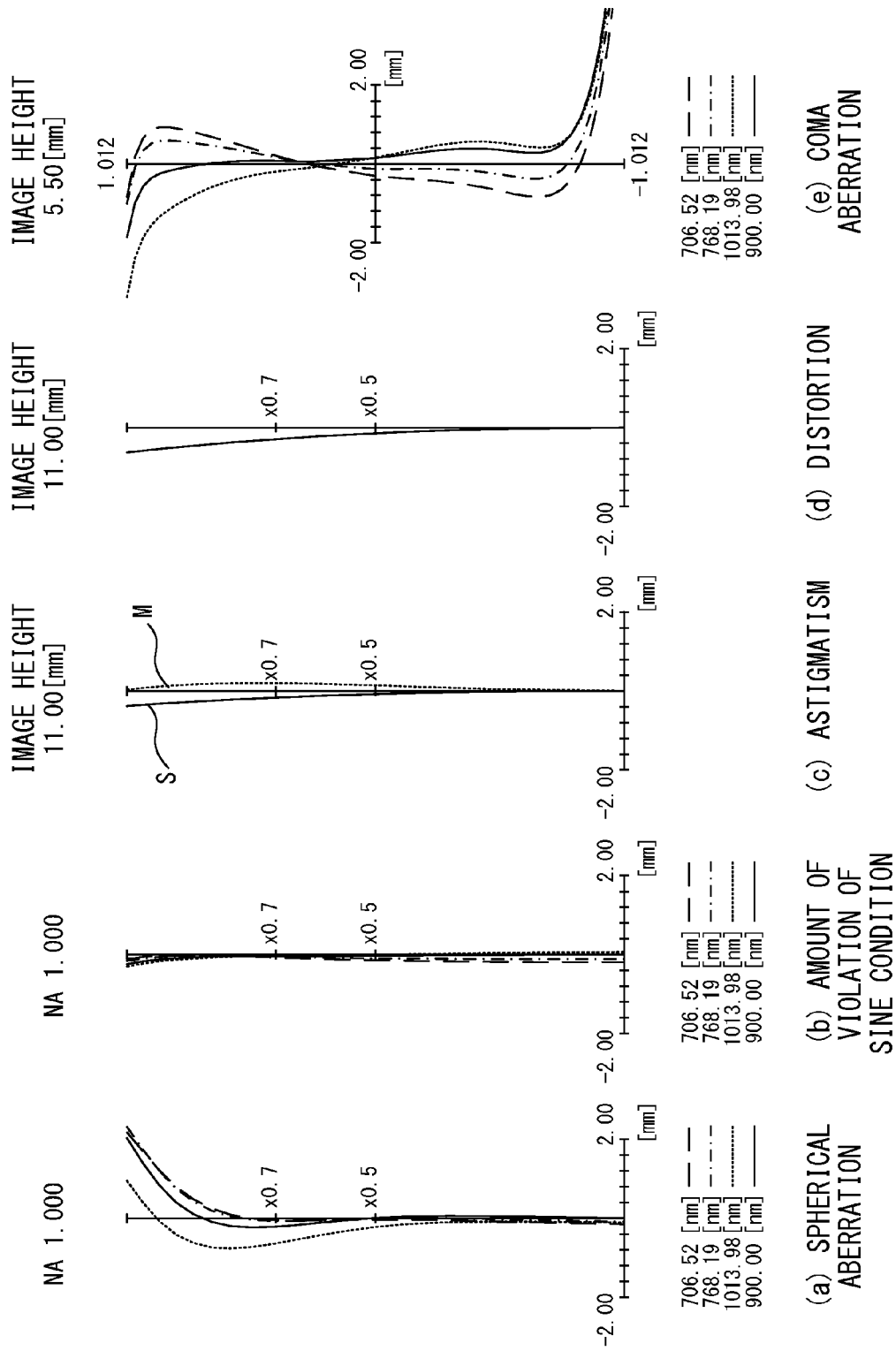
FIG. 12C is a further view illustrating the aberration when the immersion microscope objective exemplified in FIG. 11 and the tube lens exemplified in FIG. 3 are used in combination.

FIGS. 12A, 12B, and 12C illustrate the aberrations when the objective 5 according to the present embodiment and the tube lens 11 exemplified in FIG. 3 are used in combination, and illustrate the aberration on the imaging plane on the image side. Each of FIGS. 12A, 12B, and 12C respectively illustrates the aberration with the settings above in the case where the sample plane SP is observed, in the case where the inside of the sample (depth of 2 mm) is observed, and in the case where the inside deeper in the sample (depth of 4 mm) is observed. Each of FIGS. 12A, 12B, and 12C illustrates, in order from left to right, (a) spherical aberration, (b) amount of violation against sine condition, (c) astigmatism, (d) distortion, and (e) coma aberration. Each view illustrates an appropriate correction. "M" and "S" in the view of the astigmatism respectively indicate a meridional component and a sagittal component. The interval between the objective 5 and the tube lens 11 is 115.0 mm.

Embodiment 6

Figure 13:
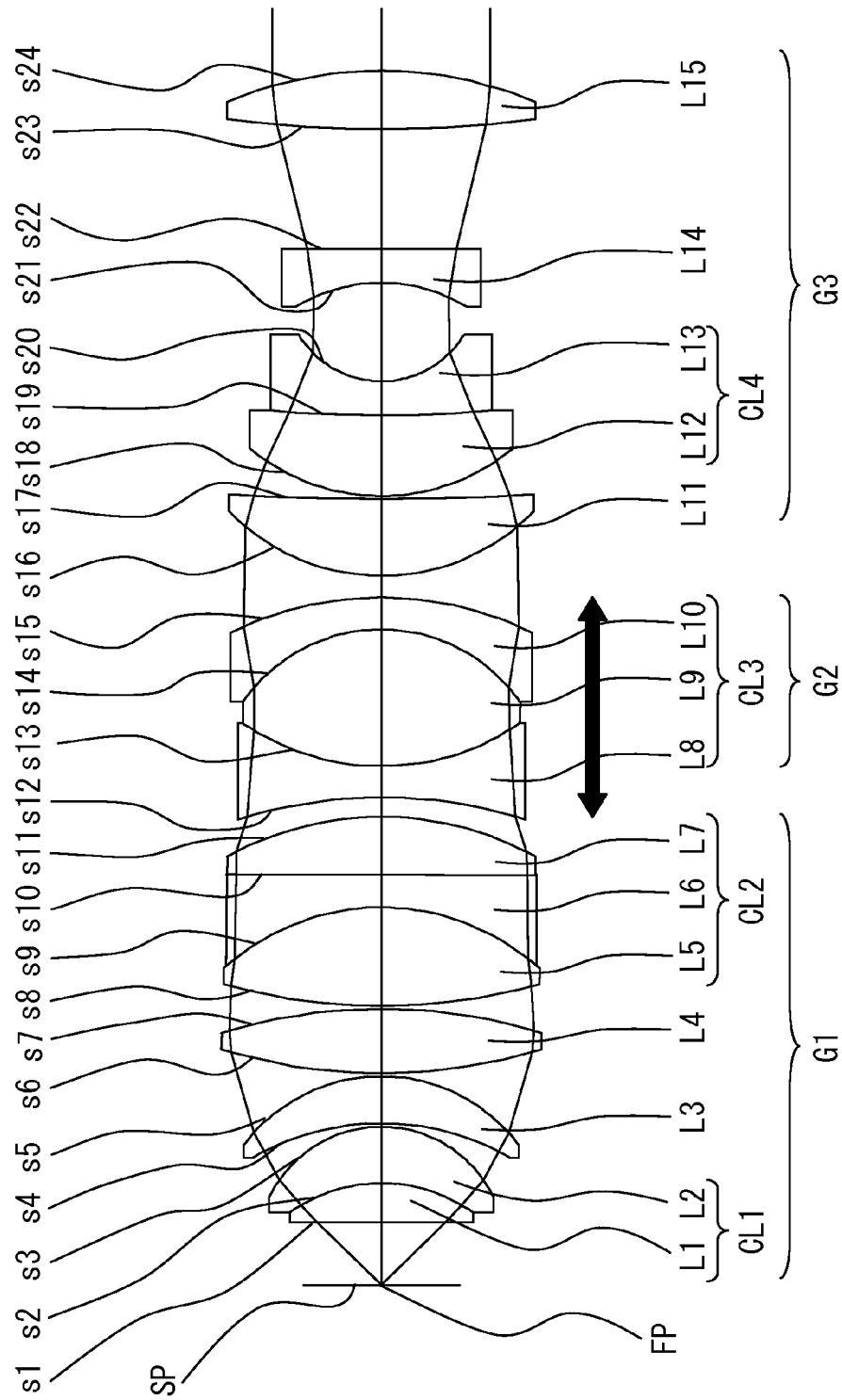
FIG. 13 is a sectional view of the immersion microscope objective according to the embodiment 6.

FIG. 13 is a sectional view of the immersion microscope objective according to the present embodiment. An objective 6 illustrated in FIG. 13 is an immersion microscope objective, and the lens configuration is the same as that of the objective 1 according to the embodiment 1, and the detailed explanation is omitted here.

The space between the objective 6 and the sample plane SP is filled with the immersion not illustrated in the attached drawings. In the example in FIG. 13, the focal position FP of the objective 6 is located on the sample plane SP, and the sample plane SP is observed by the objective 6.

Described below are various types of data of the objective 6 according to the present embodiment.

In the objective 6, a magnification β in the second state, a numerical aperture NA on the object side, a focal length f, a total length L, a working distance d0, and a thickness d1 of a lens component closest to the object are described below.

β=−24.98, NA=1.0, f=7.223 mm, L=73.924 mm, d0=4.03 mm, d1=6.140 mm

In the objective 6, the focal length f1 and the magnification β1 of the first lens group, the focal length f2 and the magnification β2 of the second lens group, and the focal length f3 of the third lens group are described below.

f1=8.358 mm, β1=−4.829, f2=−49.098 mm, β2=9.517, f3=−333.213 mm

The lens data of the objective 6 is listed below.

| Objective 6 | | | | |
|---|---|---|---|---|
| s | r | d | nd | vd |
| 1 | INF | 2.5000 | 1.45182 | 67.83 |
| 2 | −10.3591 | 3.6400 | 1.75821 | 49.60 |
| 3 | −8.1150 | 0.2037 | | |
| 4 | −17.0022 | 3.0261 | 1.56178 | 71.30 |
| 5 | −11.2198 | 0.2026 | | |
| 6 | 35.9884 | 4.1116 | 1.56178 | 71.30 |
| 7 | −35.9884 | 0.2108 | | |
| 8 | 39.0754 | 6.3096 | 1.49126 | 81.54 |
| 9 | −15.4049 | 2.1000 | 1.65754 | 38.15 |
| 10 | INF | 3.7168 | 1.49126 | 81.54 |
| 11 | −20.8957 | da | | |
| 12 | −31.0852 | 2.0000 | 1.60085 | 44.27 |
| 13 | 16.0314 | 8.7791 | 1.43436 | 94.93 |
| 14 | −11.0434 | 2.0500 | 1.72789 | 52.64 |
| 15 | −22.3667 | db | | |
| 16 | 13.9178 | 4.9330 | 1.49126 | 81.54 |
| 17 | 157.3673 | 0.2000 | | |
| 18 | 13.4583 | 5.1563 | 1.49126 | 81.54 |
| 19 | 73.1642 | 2.2000 | 1.75821 | 49.60 |
| 20 | 6.3125 | 6.3256 | | |
| 21 | −10.7600 | 2.2000 | 1.60085 | 44.27 |
| 22 | INF | 7.6919 | | |
| 23 | 86.2967 | 3.7305 | 1.65754 | 38.15 |
| 24 | −25.8363 | | | |

The relationship between the state of the medium between the objective 6 and the focal position FP and the variables da and db after the correction of the spherical aberration by the correction ring is expressed as follows.

| | First state | | Second state | | Third state | |
|---|---|---|---|---|---|---|
| | Thickness (mm) | average refractive index | Thickness (mm) | average refractive index | Thickness (mm) | average refractive index |
| IM | 3.9824 | 1.32782 | 4.03 | 1.3589 | 4.0902 | 1.39728 |
| da | 0.4721 | — | 1.2500 | — | 2.1734 | — |
| db | 2.1641 | — | 1.3863 | — | 0.4628 | — |

The data above exemplifies the relationships, in order from left to right, in the case where the sample plane SP is observed through the immersion having the refractive index of 1.32782, in the case where the sample plane SP is observed through the immersion having the refractive index of 1.3589, and in the case where the sample plane SP is observed through the immersion having the refractive index of 1.39728. IM indicates an immersion. The average refractive index of the immersion refers to the average refractive index for the light of 900 nm.

The objective 6 according to the present embodiment satisfies the conditional expressions (1) through (9) except the conditional expression (8) as expressed by the following expressions (F1) through (F9). The expressions (F1) through (F9) respectively correspond to the conditional expressions (1) through (9).

$$NA \times d0 = 4.030 \text{ mm} \tag{F1}$$

$$d0/d1 = 0.656 \tag{F2}$$

$$nd2 - nd1 = 0.306 \tag{F3}$$

$$R1/R2 = 1.277 \tag{F4}$$

$$R1/L = -0.140 \tag{F5}$$

$$\frac{\left[\text{Max}\left(\sum_{i=1}^{N}(W_i \times n_i)\right) - \text{Min}\left(\sum_{i=1}^{N}(W_i \times n_i)\right)\right]}{f} = 0.059 \tag{F6}$$

$$1/\beta1 = -0.207 \tag{F7}$$

$$|\beta2| = 9.517 \tag{F8}$$

$$f/f2 = -0.147 \tag{F9}$$

With $\lambda = 900$ nm, the wavefront aberration is $0.011\lambda$ (that is, 1.1% of the wavelength $\lambda$).

Figure 14A:
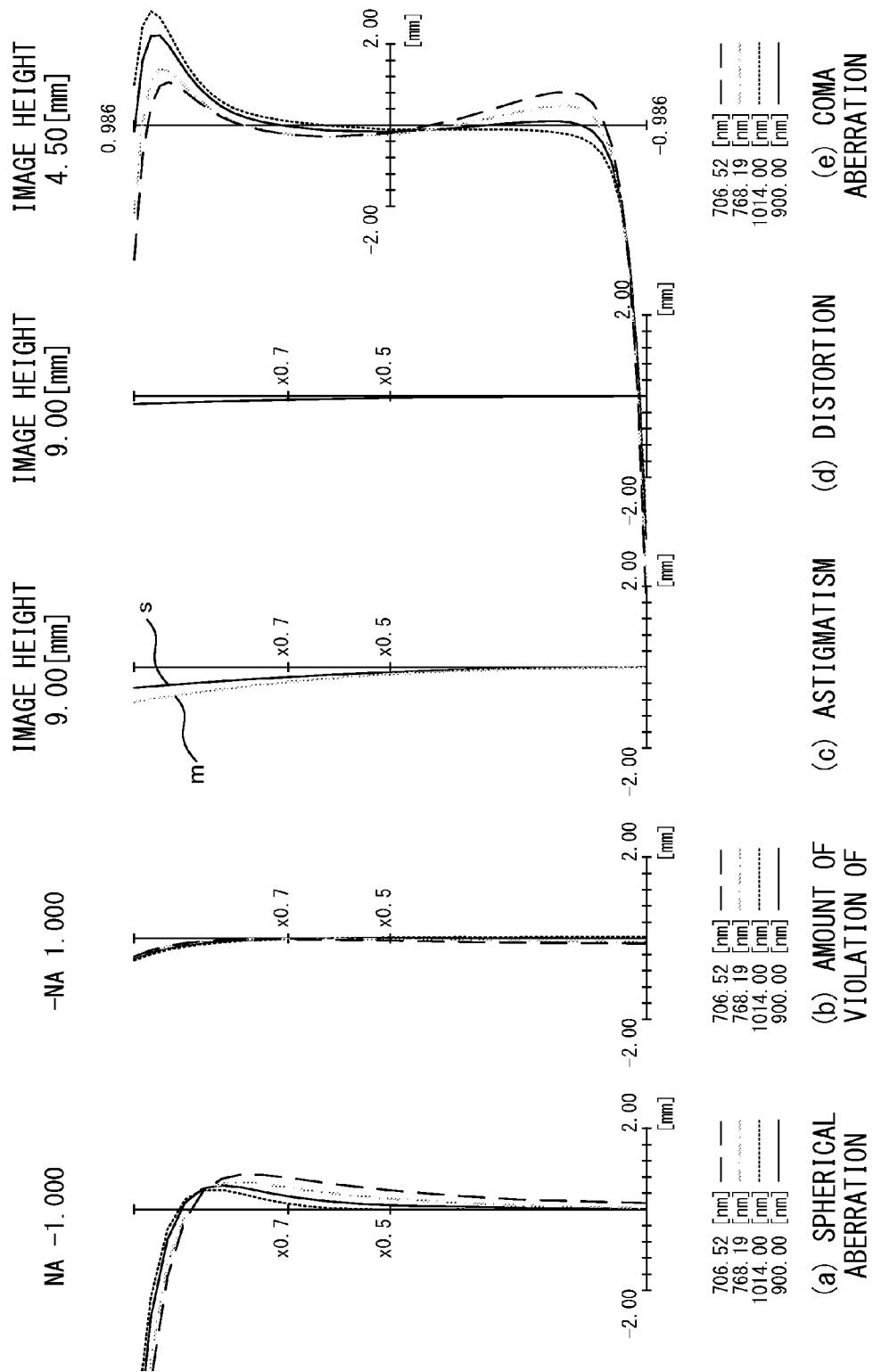
FIG. 14A is a view illustrating the aberration when the immersion microscope objective exemplified in FIG. 13 and the tube lens exemplified in FIG. 3 are used in combination.
Figure 14B:
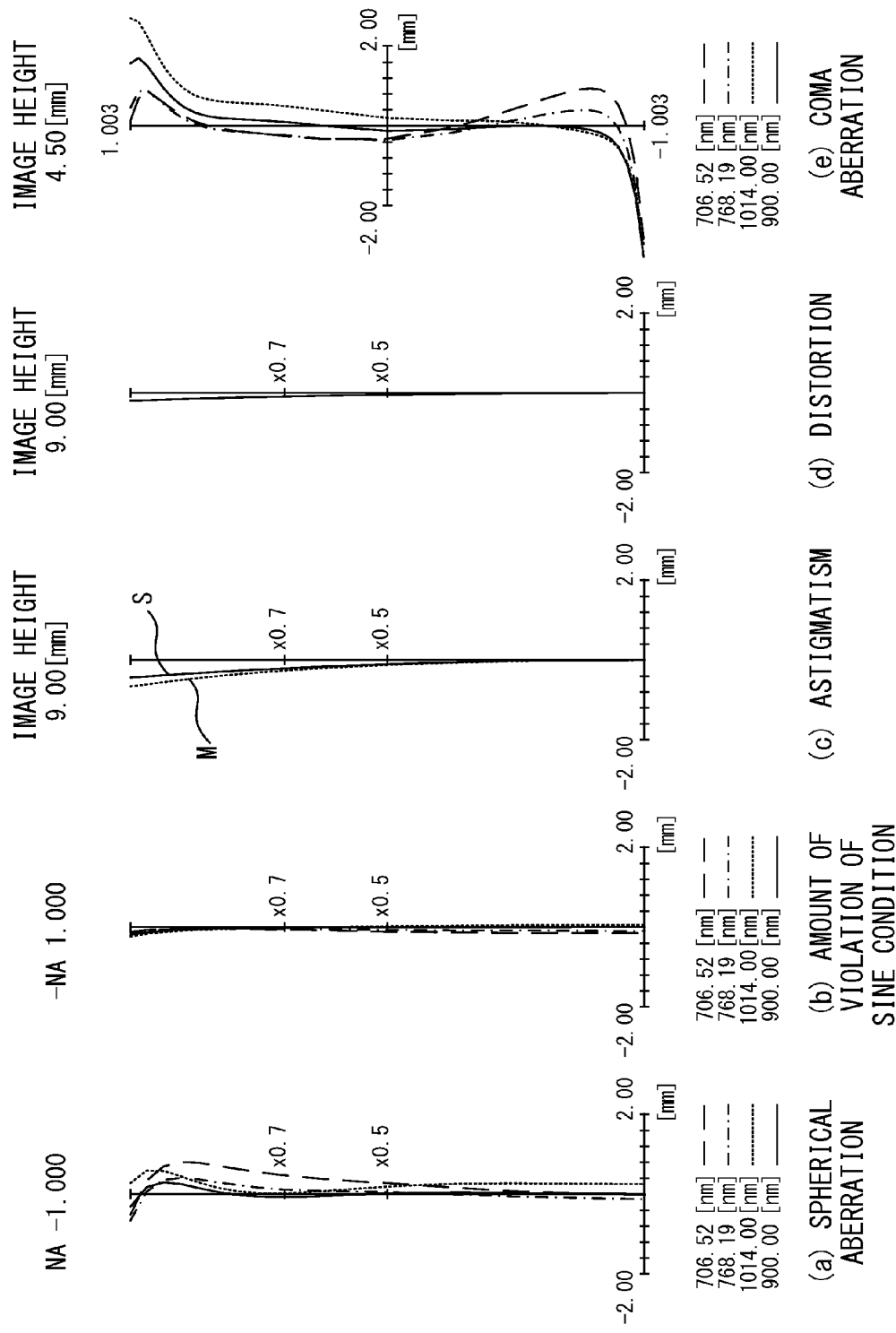
FIG. 14B is another view illustrating the aberration when the immersion microscope objective exemplified in FIG. 13 and the tube lens exemplified in FIG. 3 are used in combination.
Figure 14C:
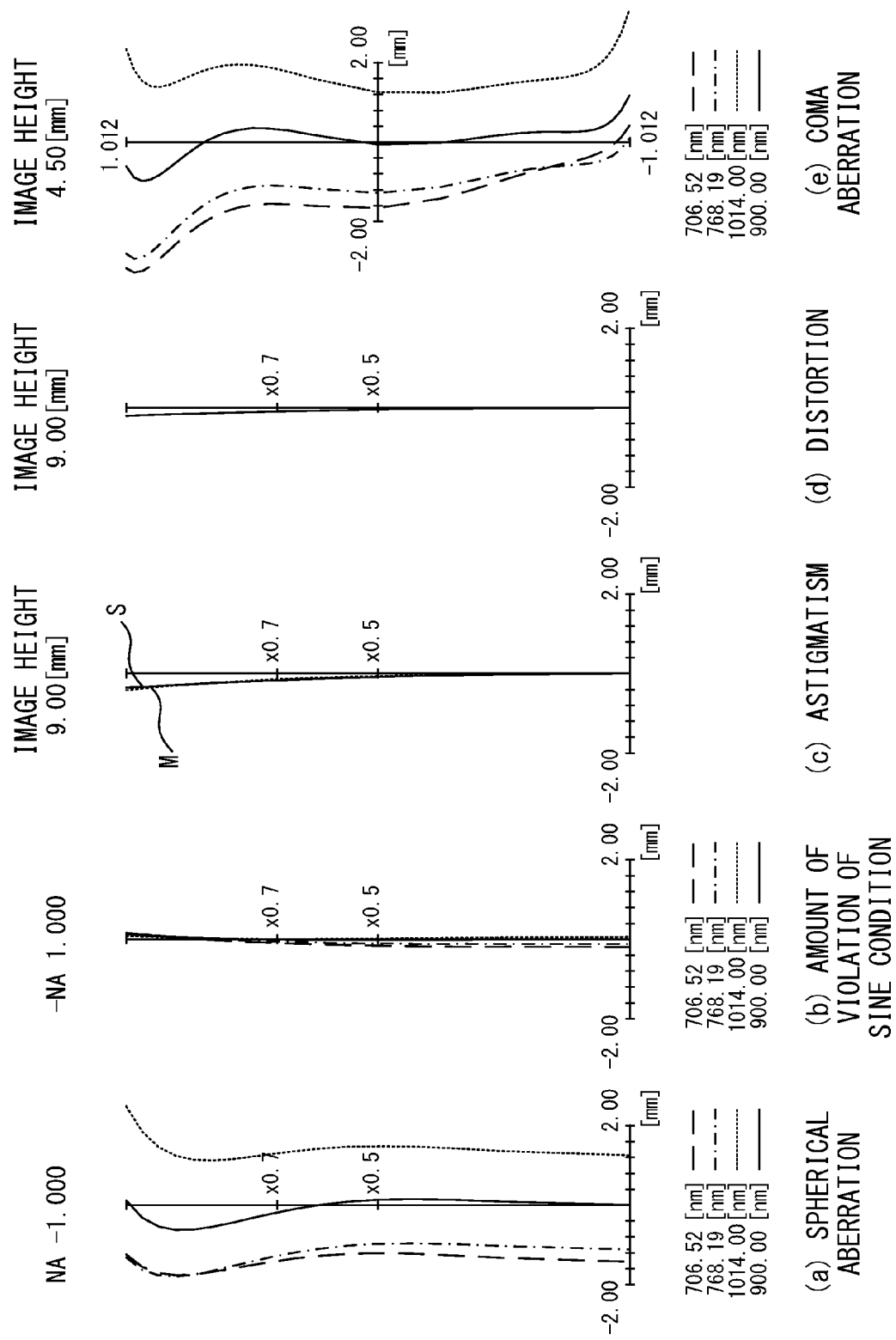
FIG. 14C is a further view illustrating the aberration when the immersion microscope objective exemplified in FIG. 13 and the tube lens exemplified in FIG. 3 are used in combination.

FIGS. 14A, 14B, and 14C illustrate the aberrations when the objective 6 according to the present embodiment and the tube lens 11 exemplified in FIG. 3 are used in combination, and illustrate the aberration on the imaging plane on the image side. Each of FIGS. 14A, 14B, and 14C respectively illustrates the aberration in the case where the sample plane SP is observed through the immersion having the refractive index of 1.32782, in the case where the sample plane SP is observed through the immersion having the refractive index of 1.3589, and in the case where the sample plane SP is observed through the immersion having the refractive index of 1.39728. Each of FIGS. 14A, 14B, and 14C illustrates, in order from left to right, (a) spherical aberration, (b) amount of violation against sine condition, (c) astigmatism, (d) distortion, and (e) coma aberration. Each view illustrates an appropriate correction. "M" and "S" in the view of the astigmatism respectively indicate a meridional component and a sagittal component. The interval between the objective 6 and the tube lens 11 is 117.046 mm.

Embodiment 7

Figure 15:
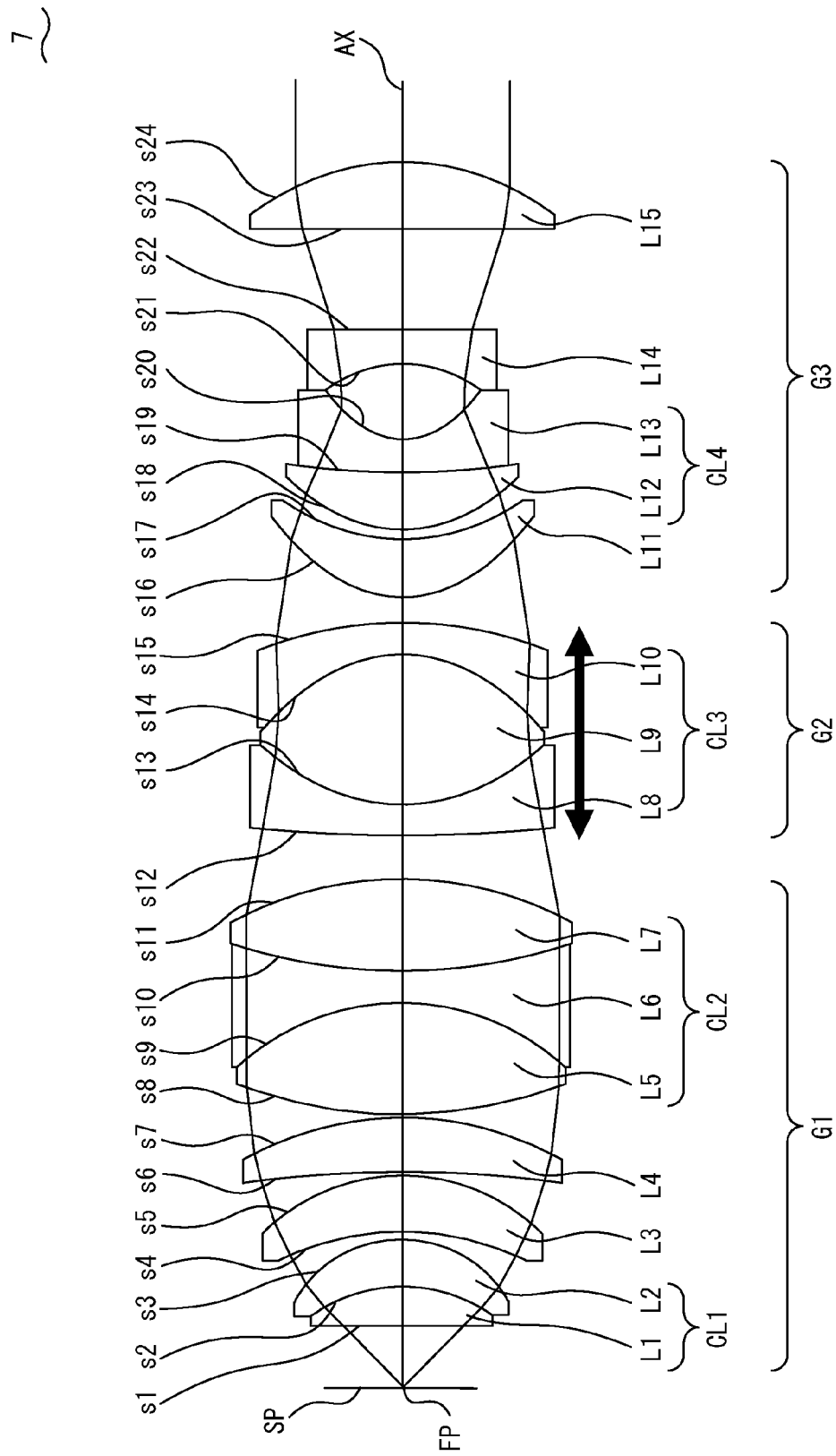
FIG. 15 is a sectional view of the immersion microscope objective according to the embodiment 7.

FIG. 15 is a sectional view of the immersion microscope objective according to the present embodiment. An objective 7 is an immersion microscope objective, and includes, in order from the object side, the first lens group G1 (lens L1 through lens L7) having the positive refractive power for converting the luminous flux from the object into the convergent luminous flux, the second lens group G2 (lens L8 through lens L10) including the cemented lens CL3 and having the positive refractive power, and the third lens group G3 (lens L11 through lens L15) having the negative refractive power.

The space between the objective 7 and the sample plane SP is filled with the immersion not illustrated in the attached drawings. In the example in FIG. 15, the focal position FP of the objective 7 is located on the sample plane SP, and the sample plane SP is observed by the objective 7.

The first lens group G1 is configured by, in order from the object side, the cemented lens CL1 having positive refractive power, a single lens (lens L3) as a meniscus lens having its concave surface facing the object side, a single lens (lens L4) as a meniscus lens having its concave surface facing the object side, and a triple cemented lens (cemented lens CL2) having positive refractive power.

The cemented lens CL1 is configured by, in order from the object side, a planoconvex lens (lens L1) having its convex surface facing the image side, and a meniscus lens (lens L2) having its concave surface facing the object side. The cemented lens CL2 is configured by, in order from the object side, a double-convex lens (lens L5), a double-concave lens (lens L6), and a double-convex lens (lens L7).

The second lens group G2 is a movable group configured as movable along the optical axis AX between the first lens group G1 and the third lens group G3, and is a triple cemented lens (cemented lens CL3) having positive refractive power and configured by, in order from the object side, a negative lens (lens L8) as a meniscus lens having its concave surface facing the image side, a positive lens (lens L9) as a double-convex lens, and a negative lens (lens L10) as a meniscus lens having its concave surface facing the object side. The refractive power of the second lens group G2 is lower than the refractive power of the first lens group G1, and is lower than the refractive power of the third lens group G3.

The third lens group G3 has negative refractive power on the whole and is configured by, in order from the object side, a forward lens group (lens L11, lens L12, lens L13) having negative refractive power with the surface closest to the image (surface number s20) as a concave surface facing the image side, and a backward lens group (lens L14, lens L15) having negative refractive power with the surface closest to the object (surface number s21) as a concave surface facing the object side.

The forward lens group is configured by, in order from the object side, a meniscus lens (lens L11) having its concave surface facing the image side, and the cemented lens CL4 obtained by combining a meniscus lens (lens L12) having its concave surface facing the image side and a meniscus lens (lens L13) having its concave surface facing the image side.

The backward lens group is configured by, in order from the object side, a planoconcave lens (lens L14) having its concave surface facing the object side and a planoconvex lens (lens L15) having its convex surface facing the image side.

Described below are various types of data of the objective 7 according to the present embodiment.

In the objective 7, a magnification $\beta$ in the second state, a numerical aperture NA on the object side, a focal length f, a total length L, a working distance d0, and a thickness d1 of a lens component closest to the object are described below.

$$\beta = -24.966, NA = 1.0, f = 7.223 \text{ mm}, L = 74.645 \text{ mm},$$

$$d0 = 4.050 \text{ mm}, d1 = 5.500 \text{ mm}$$

In the objective 7, the focal length f1 and the magnification $\beta1$ of the first lens group, the focal length f2 and the magnification $\beta2$ of the second lens group, and the focal length f3 of the third lens group are described below.

$f1=9.885$ mm, $\beta1=-7.146$, $f2=737.122$ mm, $\beta2=0.987$, $f3=-51.73$ mm

The lens data of the objective 7 is listed below.

| Objective 7 | | | | |
|---|---|---|---|---|
| s | r | d | nd | vd |
| 1 | INF | 2.5000 | 1.45852 | 67.80 |
| 2 | −10.3750 | 3.0000 | 1.88300 | 40.76 |
| 3 | −8.0000 | 0.4981 | | |
| 4 | −19.2040 | 3.6242 | 1.59522 | 67.74 |
| 5 | −13.0813 | 0.2090 | | |
| 6 | −70.7151 | 3.5000 | 1.59522 | 67.74 |
| 7 | −21.1529 | 0.1992 | | |
| 8 | 31.3815 | 7.1617 | 1.49700 | 81.54 |
| 9 | −15.8639 | 2.1000 | 1.61336 | 44.49 |
| 10 | 35.4103 | 5.8534 | 1.49700 | 81.54 |
| 11 | −22.6147 | da | | |
| 12 | 84.5524 | 2.0000 | 1.63775 | 42.41 |
| 13 | 13.0322 | 9.6433 | 1.43875 | 94.93 |
| 14 | −11.2575 | 2.0500 | 1.61340 | 44.27 |
| 15 | −26.9861 | db | | |
| 16 | 9.8836 | 3.4800 | 1.43875 | 94.93 |
| 17 | 13.6708 | 0.7000 | | |
| 18 | 10.4412 | 3.6198 | 1.49700 | 81.54 |
| 19 | 44.3375 | 2.2000 | 1.75500 | 52.32 |
| 20 | 5.7860 | 4.8000 | | |
| 21 | −8.2762 | 2.2000 | 1.67300 | 38.15 |
| 22 | INF | 6.4103 | | |
| 23 | INF | 4.3726 | 1.67300 | 38.15 |
| 24 | −16.5450 | | | |

The relationship between the state of the medium between the objective 7 and the focal position FP and the variables da and db after the correction of the spherical aberration by the correction ring is expressed as follows.

| | First state | | Second state | | Third state | |
|---|---|---|---|---|---|---|
| | Thickness (mm) | average refractive index | Thickness (mm) | average refractive index | Thickness (mm) | average refractive index |
| S | 0 | 1.35103 | 0 | 1.37787 | 3.8823 | 1.37787 |
| CG | 0 | 1.51446 | 0 | 1.51446 | 0.23 | 1.51446 |
| IM | 3.9152 | 1.32666 | 4.05 | 1.37172 | 0 | 1.37172 |
| da | 0.4998 | — | 2.6876 | — | 3.641 | — |
| db | 4.0232 | — | 1.8355 | — | 0.8823 | — |

The data above exemplifies the relationships, in order from left to right, in the case where the sample plane SP is observed through the immersion having the refractive index of 1.32666, and in the cases where the sample plane SP and inside of the sample (depth of 3.8823 mm) are observed through the immersion having the refractive index of 1.37172. S indicates a sample, CG indicates a cover glass, and IM indicates an immersion. The average refractive index of the immersion refers to the average refractive index for the light of 900 nm.

The objective 7 according to the present embodiment satisfies the conditional expressions (1) through (9) as expressed by the following expressions (G1) through (G9). The expressions (G1) through (G9) respectively correspond to the conditional expressions (1) through (9).

$NA \times d0 = 4.050$ mm (G1)

$d0/d1 = 0.736$ (G2)

$nd2 - nd1 = 0.431$ (G3)

$R1/R2 = 1.297$ (G4)

$R1/L = -0.139$ (G5)

$$\frac{\left[\text{Max}\left(\sum_{i=1}^{N}(W_i \times n_i)\right) - \text{Min}\left(\sum_{i=1}^{N}(W_i \times n_i)\right)\right]}{f} = 0.074 \quad (G6)$$

$1/\beta1 = -0.140$ (G7)

$|\beta2| = 0.987$ (G8)

$f/f2 = 0.010$ (G9)

With $\lambda = 900$ nm, the wavefront aberration is $0.002\lambda$ (that is, 0.2% of the wavelength $\lambda$).

Figure 16A:
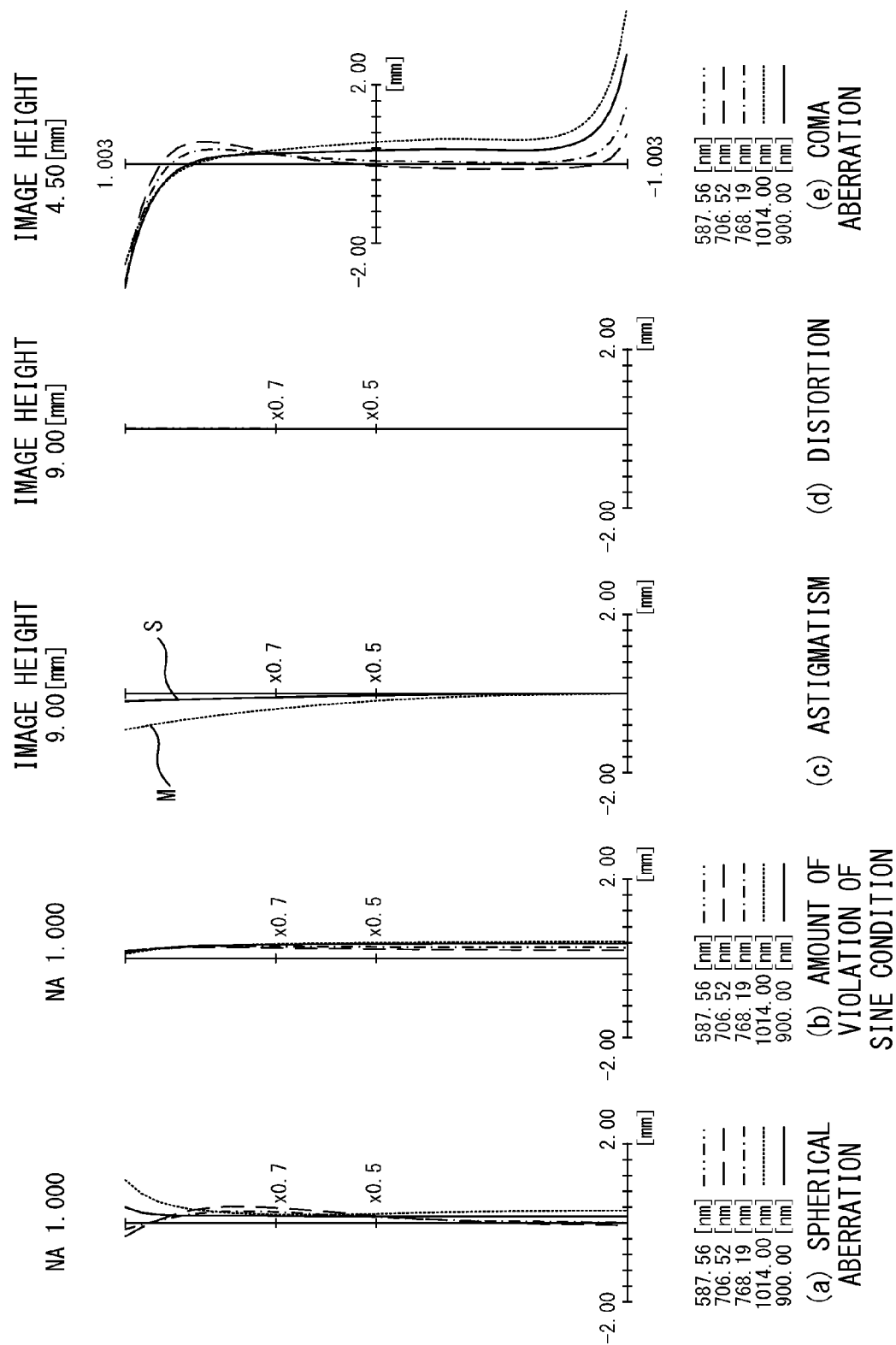
FIG. 16A is a view illustrating the aberration when the immersion microscope objective exemplified in FIG. 15 and the tube lens exemplified in FIG. 3 are used in combination.
Figure 16B:
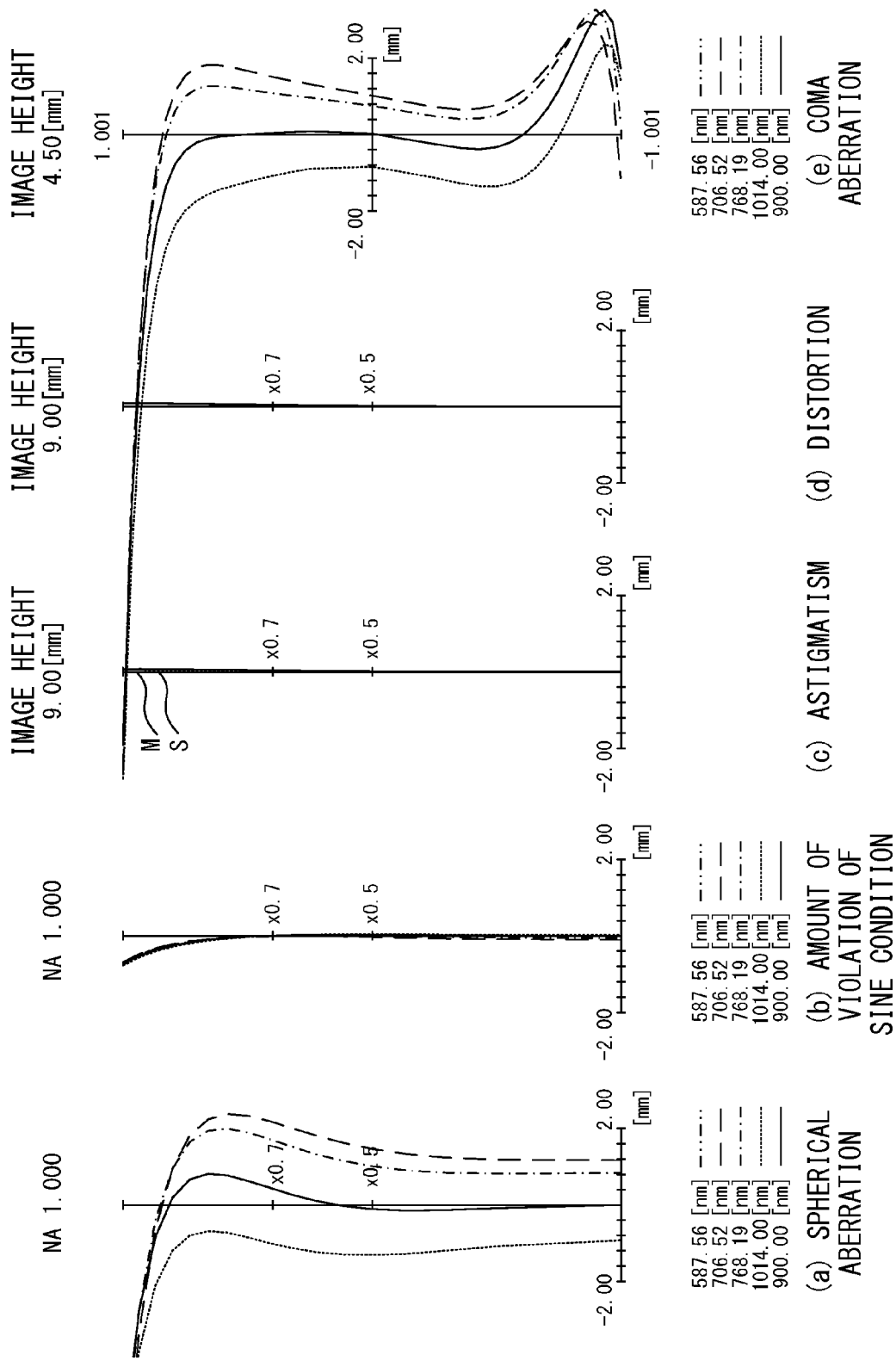
FIG. 16B is another view illustrating the aberration when the immersion microscope objective exemplified in FIG. 15 and the tube lens exemplified in FIG. 3 are used in combination.
Figure 16C:
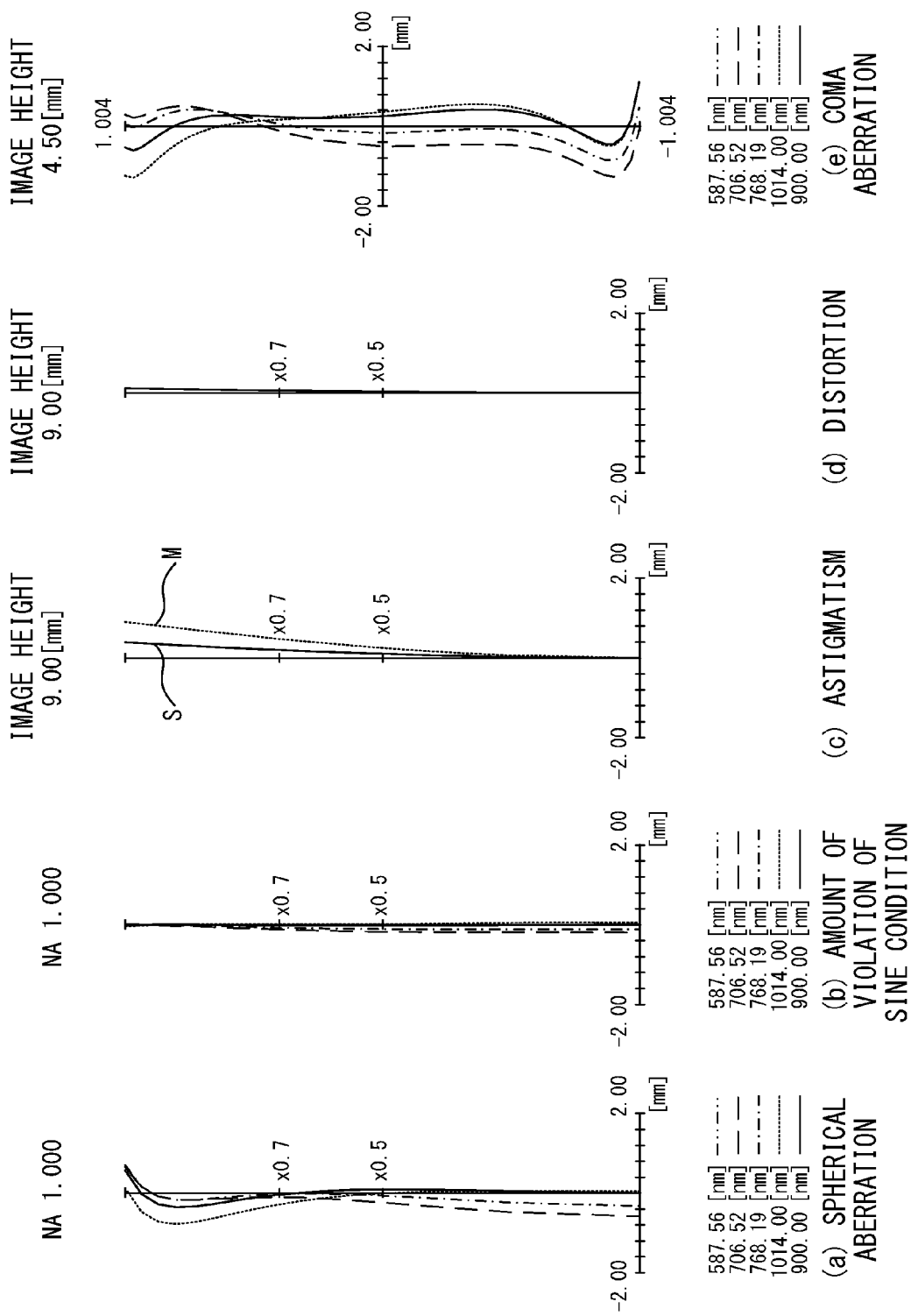
FIG. 16C is a further view illustrating the aberration when the immersion microscope objective exemplified in FIG. 15 and the tube lens exemplified in FIG. 3 are used in combination.

FIGS. 16A, 16B, and 16C illustrate the aberrations when the objective 7 according to the present embodiment and the tube lens 11 illustrated in FIG. 3 are used in combination, and illustrate the aberration on the imaging plane on the image side. Each of FIGS. 16A, 16B, and 16C respectively illustrates the aberration in the case where the sample plane SP is observed through the immersion having the refractive index of 1.32666, in the case where the sample plane SP is observed through the immersion having the refractive index of 1.37172, and in the case where the inside of the sample (depth of 3.8823 mm) is observed through the immersion having the refractive index of 1.37787. Each of FIGS. 16A, 16B, and 16C illustrates, in order from left to right, (a) spherical aberration, (b) amount of violation against sine condition, (c) astigmatism, (d) distortion, and (e) coma aberration. Each view illustrates an appropriate correction. "M" and "S" in the view of the astigmatism respectively indicate a meridional component and a sagittal component. The interval between the objective 7 and the tube lens 11 is 85.305 mm.

Embodiment 8

Figure 17:
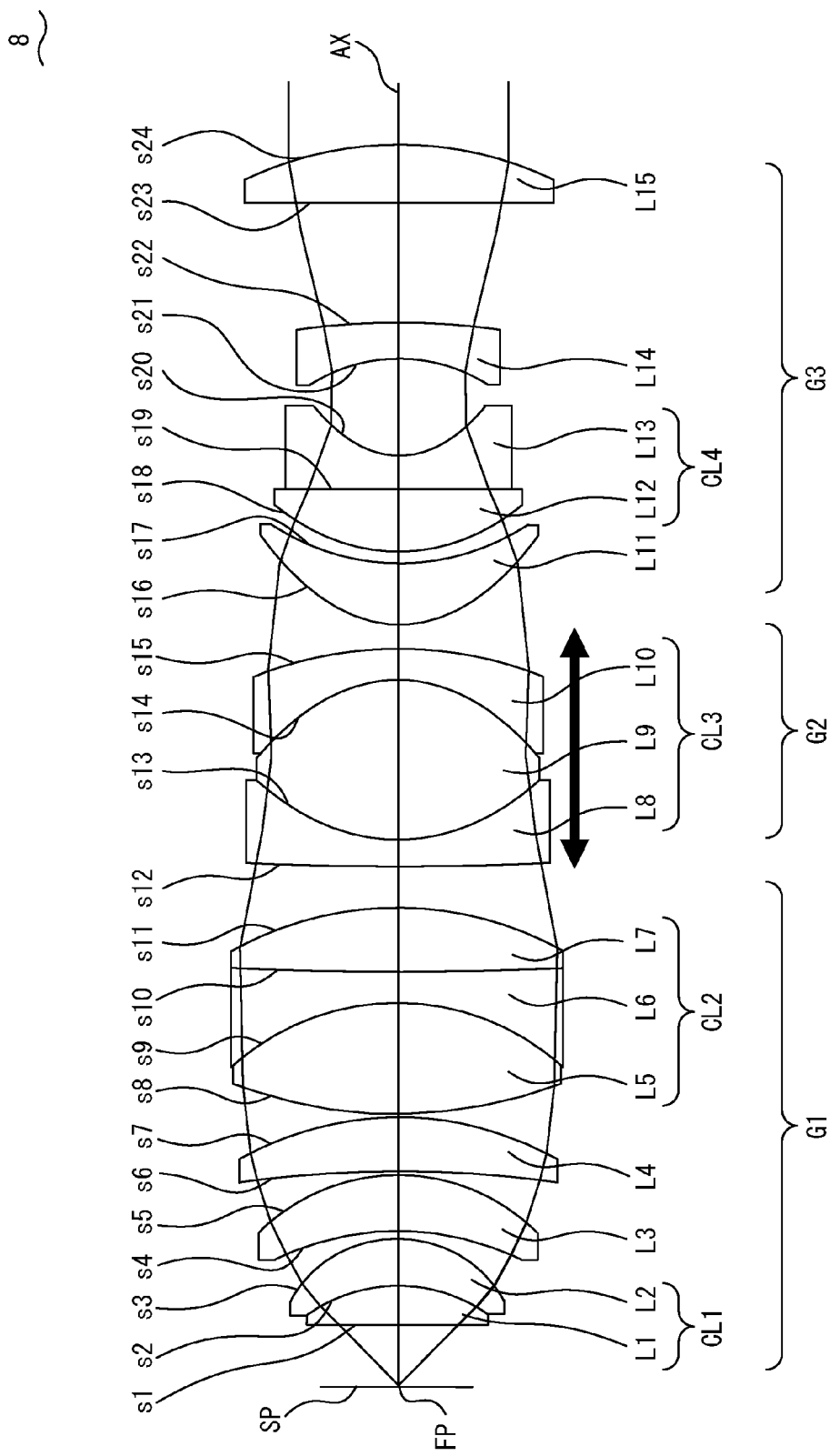
FIG. 17 is a sectional view of the immersion microscope objective according to the embodiment 8.

FIG. 17 is a sectional view of the immersion microscope objective according to the present embodiment. An objective 8 illustrated in FIG. 17 is an immersion microscope objective, and the lens configuration is the similar as that of the objective 7 according to the embodiment 7, but is different from the objective 7 according to the embodiment 7 in the configurations of the first lens group G1 and the third lens group G3. Therefore, only the configurations of the first lens group G1 and the third lens group G3 different from the objective 7 according to the embodiment 7 are described below.

The configuration of the second lens group G2 is similar to the configuration of the objective 7 according to the embodiment 7, but the second lens group G2 has negative refractive power unlike the objective 7 according to the embodiment 7. Furthermore, the refractive power of the second lens group G2 is lower than the refractive power of the first lens group G1, and is lower than the refractive power of the third lens group G3.

The first lens group G1 is configured by, in order from the object side, the cemented lens CL1 having positive refractive power for converting the luminous flux from an object into a convergent luminous flux, a single lens (lens L3) as a meniscus lens having its concave surface facing the object side, a single lens (lens L4) as a meniscus lens having its concave surface facing the object side, and a triple cemented lens (cemented lens CL2) having positive refractive power.

The cemented lens CL1 is configured by, in order from the object side, a planoconvex lens (lens L1) having its convex surface facing the image side, and a meniscus lens (lens L2) having its concave surface facing the object side. The cemented lens CL2 is configured by, in order from the object side, a double-convex lens (lens L5), a meniscus lens (lens L6) having its concave surface facing the object side, and a meniscus lens (lens L7) having its concave surface facing the image side.

The third lens group G3 has negative refractive power on the whole and is configured by, in order from the object side, a forward lens group (lens L11, lens L12, lens L13) having negative refractive power with the surface closest to the image (surface number s20) as a concave surface facing the image side, and a backward lens group (lens L14, lens L15) having negative refractive power with the surface closest to the object (surface number s21) as a concave surface facing the object side.

The forward lens group is configured by, in order from the object side, a meniscus lens (lens L11) having its concave surface facing the image side, and the cemented lens CL4 obtained by combining a planoconvex lens (lens L12) having its convex surface facing the object side and a planoconcave lens (lens L13) having its concave surface facing the image side.

The backward lens group is configured by, in order from the object side, a meniscus lens (lens L14) having its concave surface facing the object side and a double-convex lens (lens L15).

The space between the objective 8 and the sample plane SP is filled with the immersion not illustrated in the attached drawings. In the example in FIG. 17, the focal position FP of the objective 8 is located on the sample plane SP, and the sample plane SP is observed by the objective 8.

Described below are various types of data of the objective 8 according to the present embodiment.

In the objective 8, a magnification $\beta$ in the second state, a numerical aperture NA on the object side, a focal length f, a total length L, a working distance d0, and a thickness d1 of a lens component closest to the object are described below.

$\beta = -24.967$, $NA = 1.0$, $f = 7.223$ mm, $L = 74.650$ mm, $d0 = 4.050$ mm, $d1 = 5.500$ mm In the objective 8, the focal length f1 and the magnification $\beta 1$ of the first lens group, the focal length f2 and the magnification $\beta 2$ of the second lens group, and the focal length f3 of the third lens group are described below.

$f1 = 9.546$ mm, $\beta 1 = -6.440$, $f2 = -265.22$ mm, $\beta 2 = 1.401$, $f3 = -66.44$ mm The lens data of the objective 8 is listed below.

| Objective 8 | | | | |
|---|---|---|---|---|
| s | r | d | nd | vd |
| 1 | INF | 2.5000 | 1.45852 | 67.80 |
| 2 | −10.1128 | 3.0000 | 1.88300 | 40.76 |
| 3 | −8.0846 | 0.2102 | | |
| 4 | −18.5025 | 3.7617 | 1.56907 | 71.30 |
| 5 | −12.4272 | 0.2401 | | |
| 6 | −153.9267 | 3.5000 | 1.56907 | 71.30 |
| 7 | −21.2158 | 0.1996 | | |
| 8 | 37.8110 | 7.0340 | 1.49700 | 81.54 |
| 9 | −15.1386 | 2.1000 | 1.63775 | 42.41 |
| 10 | −362.3263 | 3.9190 | 1.49700 | 81.54 |
| 11 | −21.7272 | da | | |
| 12 | 329.1815 | 2.0000 | 1.63775 | 42.41 |
| 13 | 14.2052 | 9.7556 | 1.43875 | 94.93 |
| 14 | −11.0946 | 2.0500 | 1.63775 | 42.41 |
| 15 | −26.6680 | db | | |
| 16 | 9.9952 | 3.7352 | 1.43875 | 94.93 |
| 17 | 15.7140 | 0.7000 | | |
| 18 | 12.1834 | 3.9812 | 1.49700 | 81.54 |
| 19 | INF | 2.2000 | 1.75500 | 52.32 |
| 20 | 6.4097 | 6.2448 | | |
| 21 | −10.1357 | 2.2000 | 1.67300 | 38.15 |
| 22 | −55.6084 | 7.5287 | | |
| 23 | 326.1667 | 3.6147 | 1.73800 | 32.26 |
| 24 | −23.9229 | | | |

The relationship between the state of the medium between the objective 8 and the focal position FP and the variables da and db after the correction of the spherical aberration by the correction ring is expressed as follows.

| | First state | | Second state | | Third state | |
|---|---|---|---|---|---|---|
| | Thickness (mm) | average refractive index | Thickness (mm) | average refractive index | Thickness (mm) | average refractive index |
| S | 0 | 1.35103 | 0 | 1.37787 | 3.8662 | 1.37787 |
| CG | 0 | 1.51446 | 0 | 1.51446 | 0.23 | 1.51446 |
| IM | 3.9497 | 1.32666 | 4.05 | 1.37172 | 0 | 1.37172 |
| da | 0.5084 | — | 2.5537 | — | 3.449 | — |
| db | 3.6670 | — | 1.6216 | — | 0.7259 | — |

The data above exemplifies the relationships, in order from left to right, in the case where the sample plane SP is observed through the immersion having the refractive index of 1.32666, and in the cases where the sample plane SP and inside of the sample (depth of 3.8662 mm) are observed through the immersion having the refractive index of 1.37172. S indicates a sample, CG indicates a cover glass, and IM indicates an immersion. The average refractive index refers to the average refractive index for the light of 900 nm.

The objective 8 according to the present embodiment satisfies the conditional expressions (1) through (9) as expressed by the following expressions (H1) through (H9). The expressions (H1) through (H9) respectively correspond to the conditional expressions (1) through (9).

$NA \times d0 = 4.050$ mm  (H1)

$d0/d1 = 0.736$  (H2)

$nd2 - nd1 = 0.431$  (H3)

$R1/R2=1.251$ (H4)

$R1/L=-0.135$ (H5)

$$\frac{\left[\text{Max}\left(\sum_{i=1}^{N}(W_i \times n_i)\right) - \text{Min}\left(\sum_{i=1}^{N}(W_i \times n_i)\right)\right]}{f} = 0.064$$ (H6)

$1/\beta1=-0.155$ (H7)

$|\beta2|=1.401$ (H8)

$f/f2=-0.027$ (H9)

With λ=900 nm, the wavefront aberration is 0.002λ (that is, 0.2% of the wavelength λ).

Figure 18A:
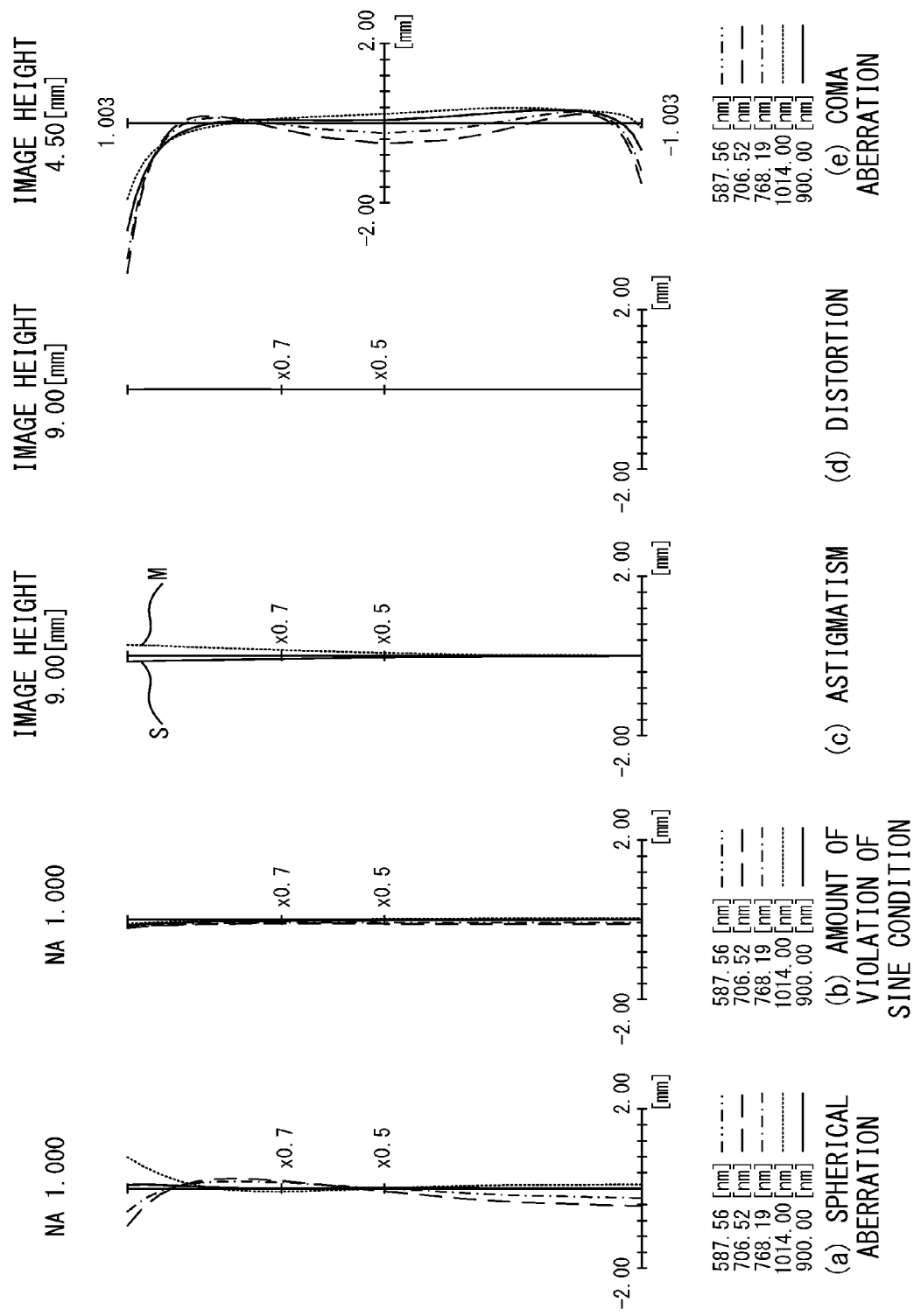
FIG. 18A is a view illustrating the aberration when the immersion microscope objective exemplified in FIG. 17 and the tube lens exemplified in FIG. 3 are used in combination.
Figure 18B:
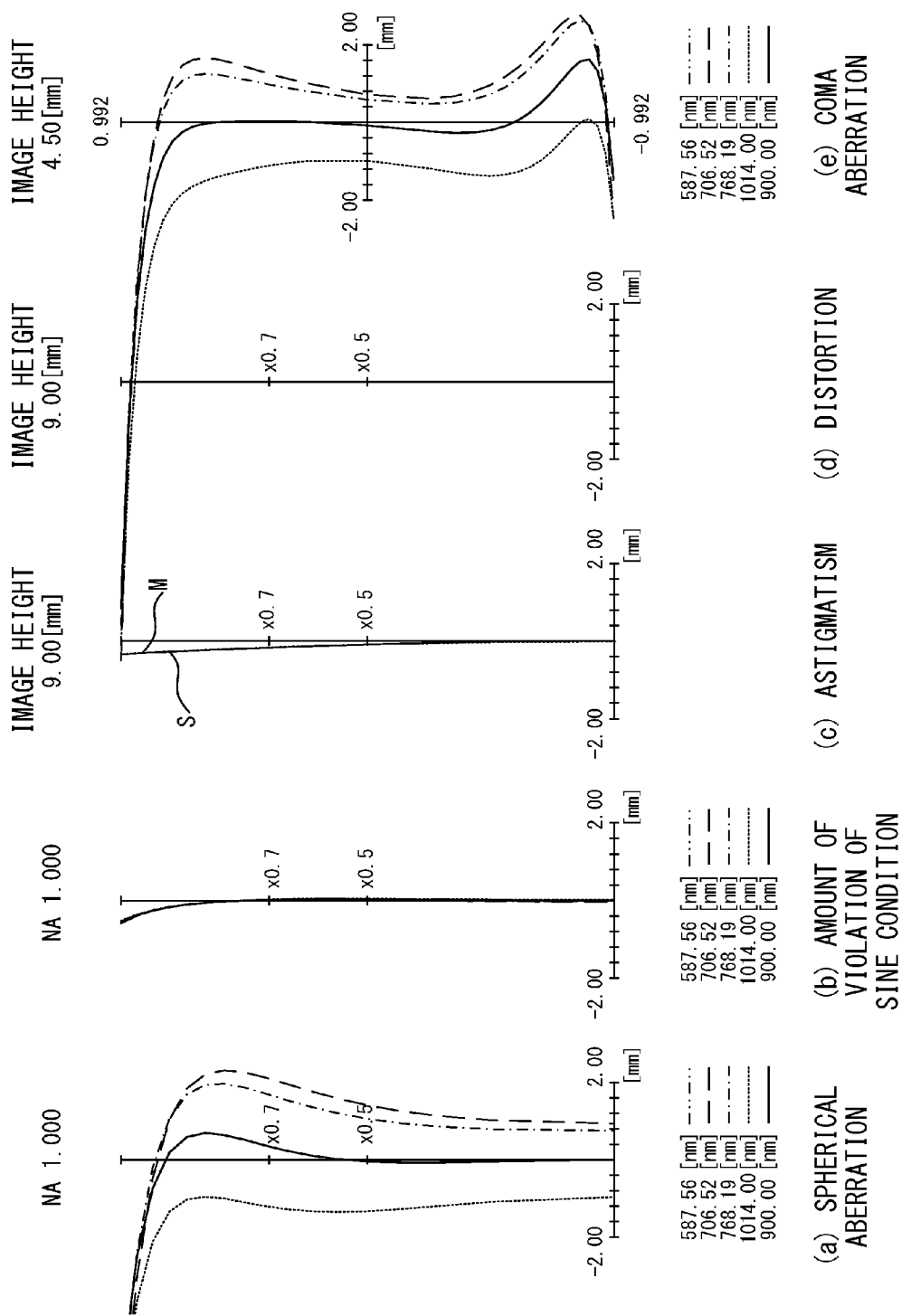
FIG. 18B is another view illustrating the aberration when the immersion microscope objective exemplified in FIG. 17 and the tube lens exemplified in FIG. 3 are used in combination.

FIGS. 18A, 18B, and 18C illustrate the aberrations when the objective 8 according to the present embodiment and the tube lens 11 illustrated in FIG. 3 are used in combination, and illustrate the aberration on the imaging plane on the image side. Each of FIGS. 18A, 18B, and 18C respectively illustrates the aberration in the case where the sample plane SP is observed through the immersion having the refractive index of 1.32666, and in the cases where the sample plane SP and the inside of the sample (depth of 3.8662 mm) are observed through the immersion having the refractive index of 1.37172. Each of FIGS. 18A, 18B, and 18C illustrates, in order from left to right, (a) spherical aberration, (b) amount of violation against sine condition, (c) astigmatism, (d) distortion, and (e) coma aberration. Each view illustrates an appropriate correction. "M" and "S" in the view of the astigmatism respectively indicate a meridional component and a sagittal component. The interval between the objective 8 and the tube lens 11 is 85.3 mm.

Embodiment 9

Figure 19:
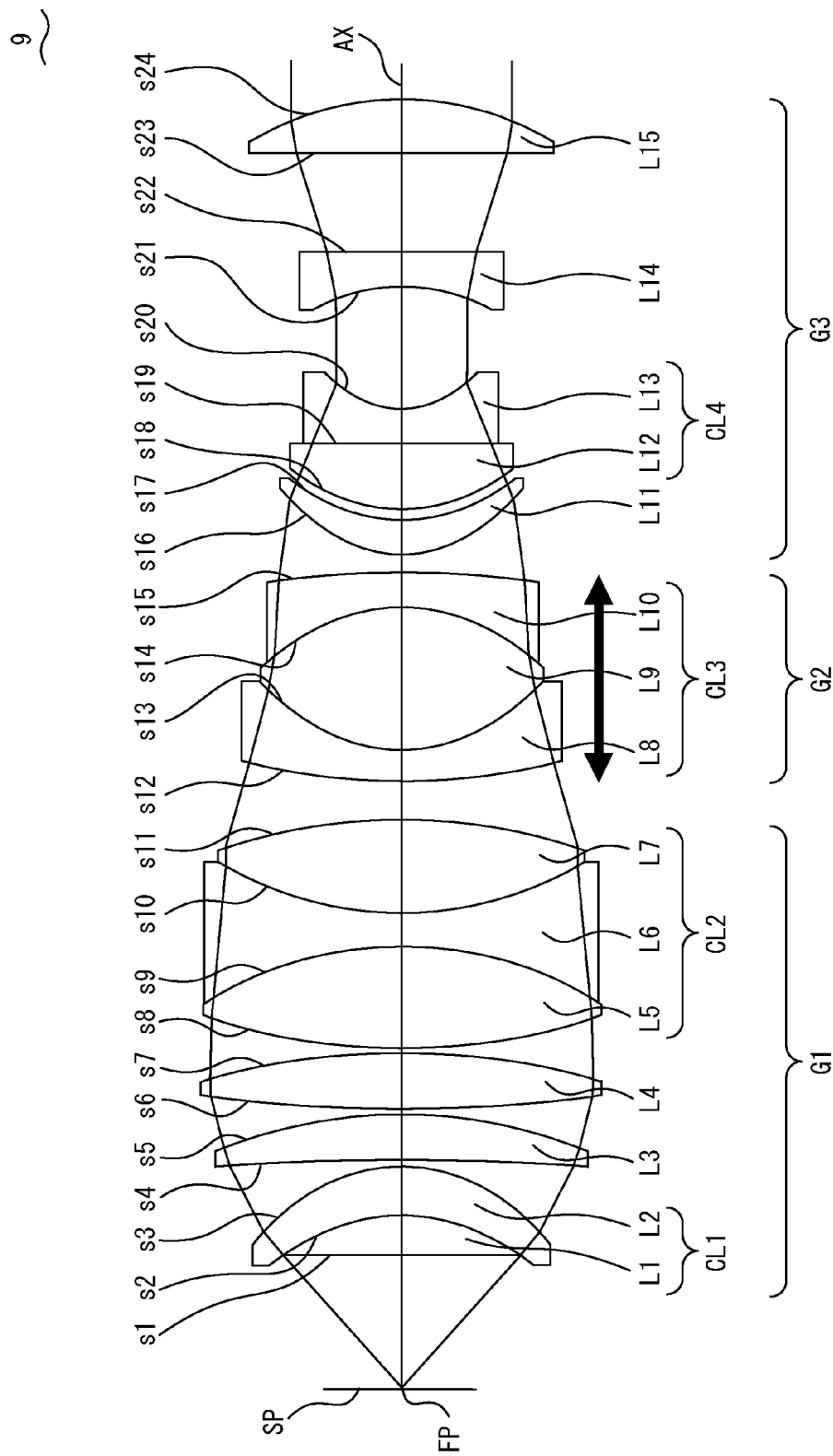
FIG. 19 is a sectional view of the immersion microscope objective according to the embodiment 9.

FIG. 19 is a sectional view of the immersion microscope objective according to the present embodiment. An objective 9 illustrated in FIG. 19 is an immersion microscope objective, and the lens configuration is the similar as that of the objective 7 according to the embodiment 7, but is different from the objective 7 according to the embodiment 7 in the configurations of the first lens group G1 and the third lens group G3. Therefore, only the configurations of the first lens group G1 and the third lens group G3 different from the objective 7 according to the embodiment 7 are described below.

The configuration of the second lens group G2 is similar to the configuration of the objective 7 according to the embodiment 7, but the second lens group G2 has negative refractive power unlike the objective 7 according to the embodiment 7. Furthermore, the refractive power of the second lens group G2 is lower than the refractive power of the first lens group G1, and is lower than the refractive power of the third lens group G3.

The first lens group G1 is configured by, in order from the object side, the cemented lens CL1 having positive refractive power for converting the luminous flux from an object into a convergent luminous flux, a single lens (lens L3) as a meniscus lens having its concave surface facing the object side, a single lens (lens L4) as a double-convex lens, and a triple cemented lens (cemented lens CL2) having positive refractive power.

The cemented lens CL1 is configured by, in order from the object side, a planoconvex lens (lens L1) having its convex surface facing the image side, and a meniscus lens (lens L2) having its concave surface facing the object side. The cemented lens CL2 is configured by, in order from the object side, a double-convex lens (lens L5), a double-concave lens (lens L6), and a double-convex lens (lens L7)

The third lens group G3 has negative refractive power on the whole and is configured by, in order from the object side, a forward lens group (lens L11, lens L12, lens L13) having negative refractive power with the surface closest to the image (surface number s20) as a concave surface facing the image side, and a backward lens group (lens L14, lens L15) having positive refractive power with the surface closest to the object (surface number s21) as a concave surface facing the object side.

The forward lens group is configured by, in order from the object side, a meniscus lens (lens L11) having its concave surface facing the image side, and the cemented lens CL4 obtained by combining a planoconvex lens (lens L12) having its convex surface facing the object side and a planoconcave lens (lens L13) having its concave surface facing the image side.

The backward lens group is configured by, in order from the object side, a planoconcave lens (lens L14) having its concave surface facing the object side and a double-convex lens (lens L15).

The space between the objective 9 and the sample plane SP is filled with the immersion not illustrated in the attached drawings. In the example in FIG. 19, the focal position FP of the objective 9 is located on the sample plane SP, and the sample plane SP is observed by the objective 9.

Described below are various types of data of the objective 9 according to the present embodiment.

In the objective 9, a magnification β in the second state, a numerical aperture NA on the object side, a focal length f, a total length L, a working distance d0, and a thickness d1 of a lens component closest to the object are described below.

β=−24.968, NA=0.9, $f$=7.223 mm, $L$=70.652 mm, d0=8.050 mm, d1=5.500 mm

In the objective 9, the focal length f1 and the magnification β1 of the first lens group, the focal length f2 and the magnification β1 of the second lens group, and the focal length f3 of the third lens group are described below.

$f1$=10.582 mm, β1=−4.991, $f2$=−167.47 mm, β2=1.307, $f3$=−47.14 mm

The lens data of the objective 9 is listed below.

| Objective 9 | | | | |
|---|---|---|---|---|
| s | r | d | nd | vd |
| 1 | INF | 2.5000 | 1.45852 | 67.83 |
| 2 | −10.8500 | 3.0000 | 1.88300 | 40.76 |
| 3 | −10.2851 | 0.1989 | | |
| 4 | −197.6772 | 3.0000 | 1.59522 | 67.74 |
| 5 | −25.9034 | 0.2000 | | |
| 6 | 80.8945 | 3.5000 | 1.59522 | 67.74 |
| 7 | −39.6508 | 0.2000 | | |
| 8 | 32.2978 | 6.2722 | 1.49700 | 81.54 |
| 9 | −21.7424 | 2.1000 | 1.61336 | 44.49 |
| 10 | 20.9814 | 5.6711 | 1.49700 | 81.54 |
| 11 | −32.0937 | da | | |
| 12 | 34.9285 | 2.0000 | 1.63775 | 42.41 |

-continued

Objective 9

| s | r | d | nd | vd |
|---|---|---|---|---|
| 13 | 10.4170 | 8.6264 | 1.43875 | 94.93 |
| 14 | −11.0891 | 2.0500 | 1.61340 | 44.27 |
| 15 | −69.2014 | db | | |
| 16 | 8.1874 | 2.0688 | 1.43875 | 94.93 |
| 17 | 10.0000 | 0.7000 | | |
| 18 | 10.2355 | 3.9477 | 1.49700 | 81.54 |
| 19 | INF | 2.2000 | 1.75500 | 52.32 |
| 20 | 5.6327 | 7.4170 | | |
| 21 | −10.0270 | 2.2000 | 1.67300 | 38.15 |
| 22 | INF | 5.9561 | | |
| 23 | 374.3870 | 3.3294 | 1.67300 | 38.15 |
| 24 | −16.7067 | | | |

The relationship between the state of the medium between the objective 9 and the focal position FP and the variables da and db after the correction of the spherical aberration by the correction ring is expressed as follows.

| | First state | | Second state | | Third state | |
|---|---|---|---|---|---|---|
| | Thickness (mm) | average refractive index | Thickness (mm) | average refractive index | Thickness (mm) | average refractive index |
| S | 0 | 1.35103 | 0 | 1.37787 | 7.9058 | 1.37787 |
| CG | 0 | 1.51446 | 0 | 1.51446 | 0.23 | 1.51446 |
| IM | 8.0500 | 1.32666 | 7.83 | 1.37172 | 0 | 1.37172 |
| da | 0.4992 | — | 2.3249 | — | 3.260 | — |
| db | 3.0147 | — | 1.1890 | — | 0.4996 | — |

The data above exemplifies the relationships, in order from left to right, in the case where the sample plane SP is observed through the immersion having the refractive index of 1.32666, and in the cases where the sample plane SP and inside of the sample (depth of 7.9058 mm) are observed through the immersion having the refractive index of 1.37172. S indicates a sample, CG indicates a cover glass, and IM indicates an immersion. The average refractive index refers to the average refractive index for the light of 900 nm.

The objective 9 according to the present embodiment satisfies the conditional expressions (1) through (9) as expressed by the following expressions (J1) through (J9). The expressions (J1) through (J9) respectively correspond to the conditional expressions (1) through (9).

$$NA \times d0 = 7.245 \text{ mm} \quad (J1)$$

$$d0/d1 = 1.464 \quad (J2)$$

$$nd2 - nd1 = 0.431 \quad (J3)$$

$$R1/R2 = 1.055 \quad (J4)$$

$$R1/L = -0.154 \quad (J5)$$

$$\frac{\left[\text{Max}\left(\sum_{i=1}^{N}(W_i \times n_i)\right) - \text{Min}\left(\sum_{i=1}^{N}(W_i \times n_i)\right)\right]}{f} = 0.127 \quad (J6)$$

$$1/\beta 1 = -0.200 \quad (J7)$$

$$|\beta 2| = 1.307 \quad (J8)$$

$$f/f2 = -0.043 \quad (J9)$$

With λ=900 nm, the wavefront aberration is 0.005λ (that is, 0.5% of the wavelength λ).

Figure 20A:
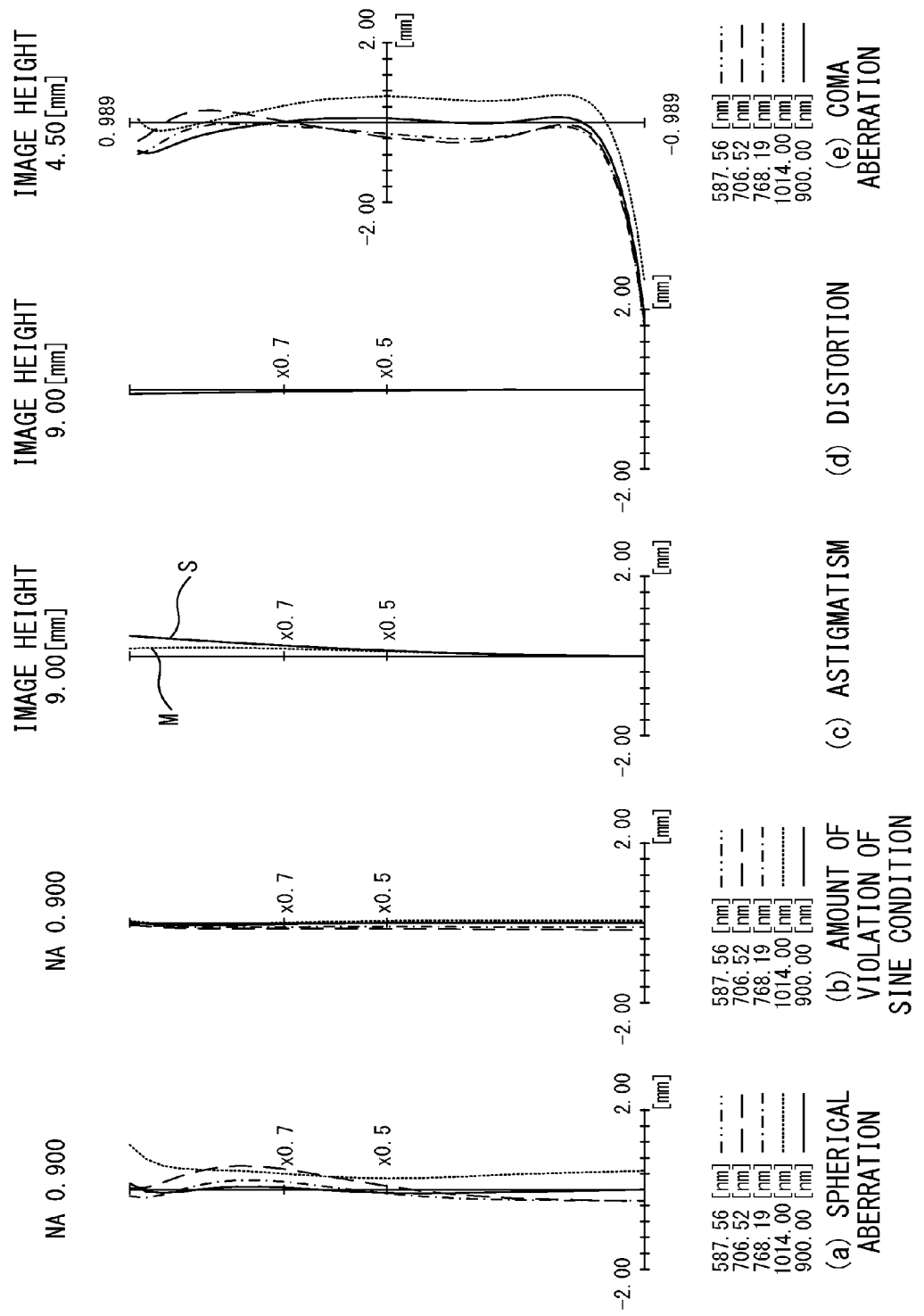
FIG. 20A is a view illustrating the aberration when the immersion microscope objective exemplified in FIG. 19 and the tube lens exemplified in FIG. 3 are used in combination.
Figure 20B:
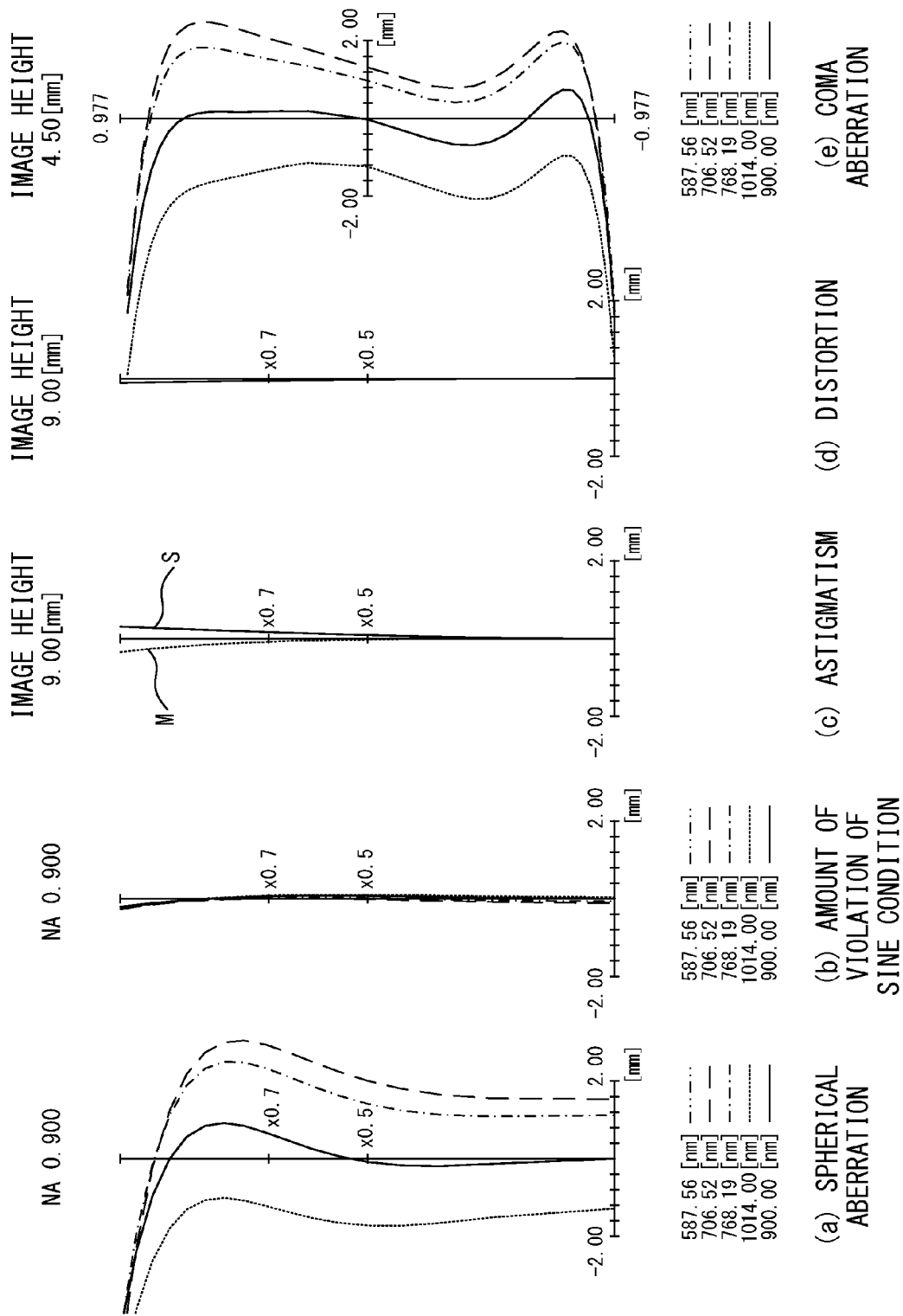
FIG. 20B is another view illustrating the aberration when the immersion microscope objective exemplified in FIG. 19 and the tube lens exemplified in FIG. 3 are used in combination.
Figure 20C:
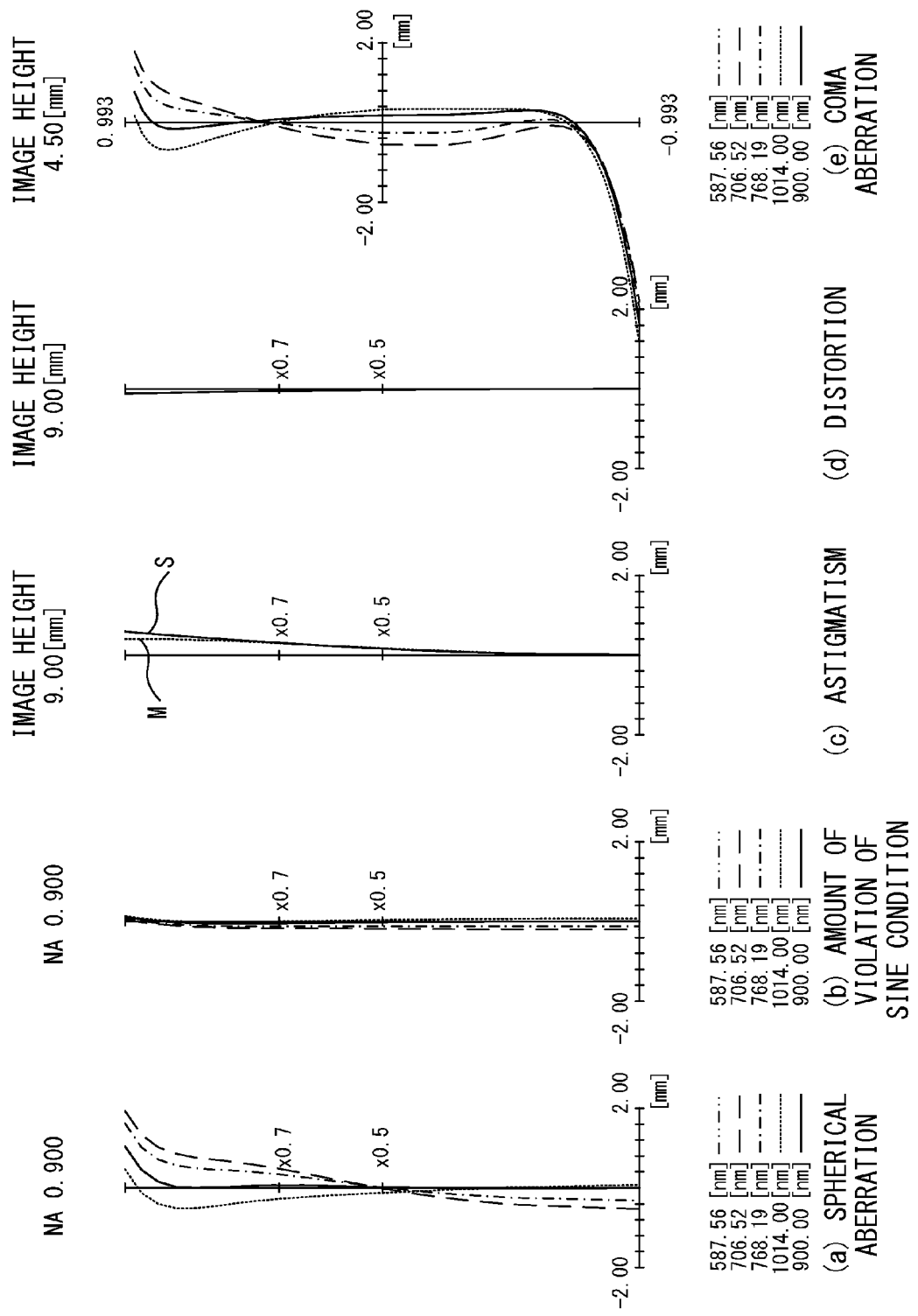
FIG. 20C is a further view illustrating the aberration when the immersion microscope objective exemplified in FIG. 19 and the tube lens exemplified in FIG. 3 are used in combination.

FIGS. 20A, 20B, and 20C illustrate the aberrations when the objective 9 according to the present embodiment and the tube lens 11 illustrated in FIG. 3 are used in combination, and illustrate the aberration on the imaging plane on the image side. Each of FIGS. 20A, 20B, and 20C respectively illustrates the aberration in the case where the sample plane SP is observed through the immersion having the refractive index of 1.32666, and in the cases where the sample plane SP and the inside of the sample (depth of 7.9058 mm) are observed through the immersion having the refractive index of 1.37172. Each of FIGS. 20A, 20B, and 20C illustrates, in order from left to right, (a) spherical aberration, (b) amount of violation against sine condition, (c) astigmatism, (d) distortion, and (e) coma aberration. Each view illustrates an appropriate correction. "M" and "S" in the view of the astigmatism respectively indicate a meridional component and a sagittal component. The interval between the objective 9 and the tube lens 11 is 84.0 mm.

Embodiment 10

Figure 21:
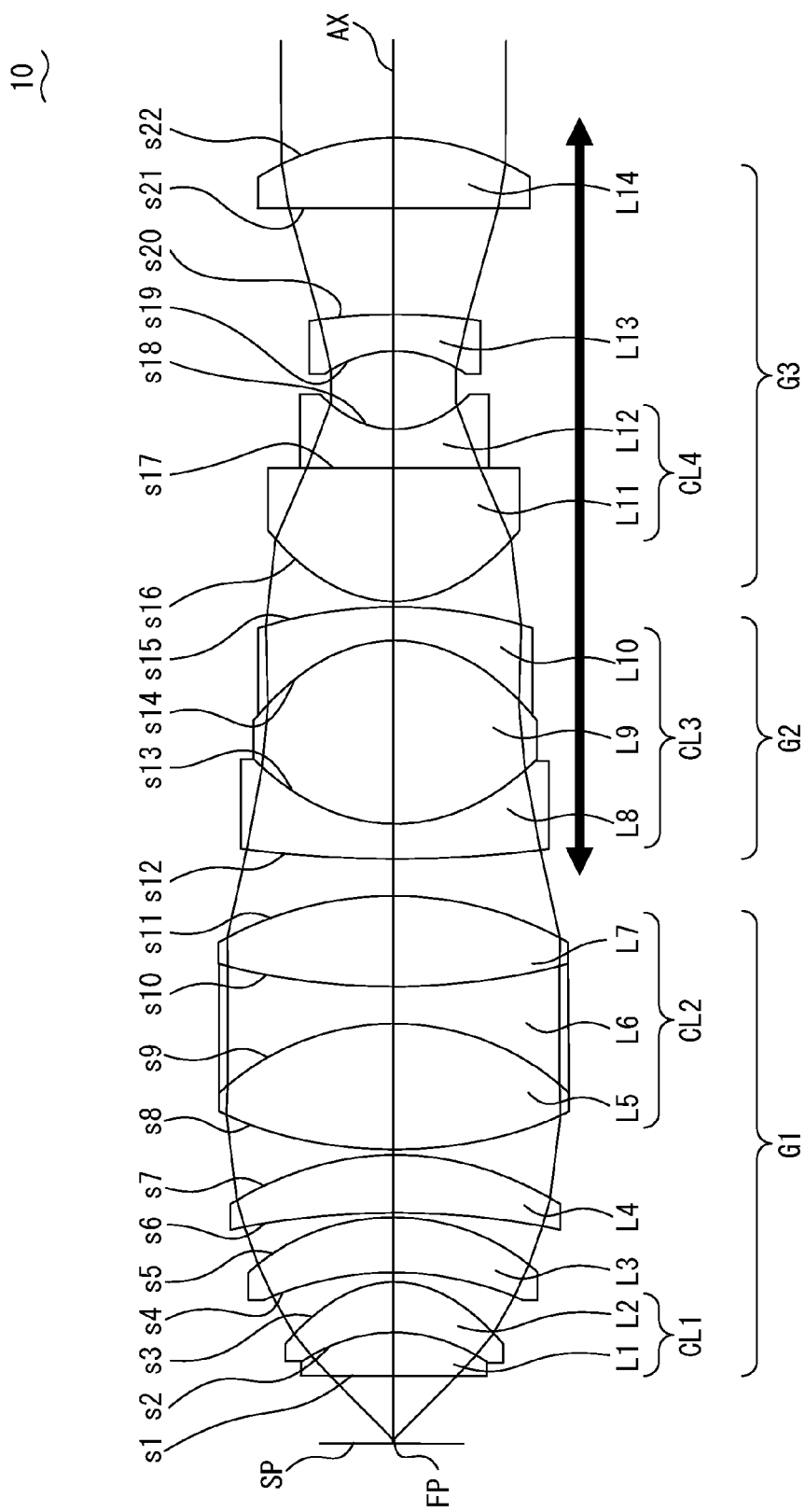
FIG. 21 is a sectional view of the immersion microscope objective according to the embodiment 10.

FIG. 21 is a sectional view of the immersion microscope objective according to the present embodiment. An objective 10 illustrated in FIG. 21 is an immersion microscope objective, and the lens configuration is the similar as that of the objective 7 according to the embodiment 7, but is different from the objective 7 according to the embodiment 7 in the configuration of the third lens group G3. Therefore, only the configuration of the third lens group G3 different from the objective 7 according to the embodiment 7 is described below.

The objective 10 according to the present embodiment is also different from the objective 7 according to the embodiment 7 in that the second lens group G2 and the third lens group G3 are configured to move relatively to the first lens group G1. That is, the movable group of the objective 10 is the second lens group G2 and the third lens group G3.

The third lens group G3 has negative refractive power on the whole and is configured by, in order from the object side, a forward lens group (lens L11, lens L12) having negative refractive power with the surface closest to the image (surface number s18) as a concave surface facing the image side, and a backward lens group (lens L13, lens L14) having negative refractive power with the surface closest to the object (surface number s19) as a concave surface facing the object side.

The forward lens group is configured by, in order from the object side, the cemented lens CL4 obtained by combining a planoconvex lens (lens L11) having its convex surface facing the object side and a planoconcave lens (lens L12) having its concave surface facing the image side.

The backward lens group is configured by, in order from the object side, a meniscus lens (lens L13) having its concave surface facing the object side and a double-convex lens (lens L14).

The space between the objective 10 and the sample plane SP is filled with the immersion not illustrated in the attached drawings. In the example in FIG. 21, the focal position FP of the objective 10 is located on the sample plane SP, and the sample plane SP is observed by the objective 10.

Described below are various types of data of the objective 10 according to the present embodiment.

In the objective 10, a magnification β in the second state, a numerical aperture NA on the object side, a focal length f, a total length L, a working distance d0, and a thickness d1 of a lens component closest to the object are described below.

β=−24.925, NA=1.0, f=7.223 mm, L=74.266 mm, d0=4.050 mm, d1=5.500 mm

In the objective 10, the focal length f1 and the magnification β1 of the first lens group, the focal length f2 and the magnification β2 of the second lens group, and the focal length f3 of the third lens group are described below.

f1=9.940 mm, β1=−6.349, f2=−1253.0219 mm, β2=1.135, f3=−45.88 mm

The lens data of the objective 10 is listed below.

| Objective 10 | | | | |
|---|---|---|---|---|
| s | r | d | nd | vd |
| 1 | INF | 2.5000 | 1.45852 | 67.83 |
| 2 | −10.3750 | 3.0000 | 1.88300 | 40.76 |
| 3 | −8.3477 | 0.5823 | | |
| 4 | −19.9155 | 3.5561 | 1.59522 | 67.74 |
| 5 | −12.7883 | 0.3252 | | |
| 6 | −71.6703 | 3.5000 | 1.59522 | 67.74 |
| 7 | −21.2213 | 0.2112 | | |
| 8 | 26.1543 | 7.6045 | 1.49700 | 81.54 |
| 9 | −16.5372 | 2.1000 | 1.61336 | 44.49 |
| 10 | 42.2746 | 5.4845 | 1.49700 | 81.54 |
| 11 | −23.7897 | da | | |
| 12 | 81.4545 | 2.0000 | 1.63775 | 42.41 |
| 13 | 11.6578 | 11.0848 | 1.43875 | 94.93 |
| 14 | −10.3619 | 2.0500 | 1.61340 | 44.27 |
| 15 | −26.5575 | 0.2000 | | |
| 16 | 9.3049 | 8.0416 | 1.49700 | 81.54 |
| 17 | INF | 2.2000 | 1.75500 | 52.32 |
| 18 | 5.6880 | 4.8000 | | |
| 19 | −7.6918 | 2.2000 | 1.67300 | 38.15 |
| 20 | −33.475 | 6.3477 | | |
| 21 | 1376.165 | 4.2146 | 1.67300 | 38.15 |
| 22 | −17.2589 | | | |

The relationship between the state of the medium between the objective 10 and the focal position FP and the variable da after the correction of the spherical aberration by the correction ring is expressed as follows.

| | First state | | Second state | | Third state | |
|---|---|---|---|---|---|---|
| | Thickness (mm) | average refractive index | Thickness (mm) | average refractive index | Thickness (mm) | average refractive index |
| S | 0 | 1.35103 | 0 | 1.37787 | 3.8558 | 1.37787 |
| CG | 0 | 1.51446 | 0 | 1.51446 | 0.23 | 1.51446 |
| IM | 4.05 | 1.32666 | 3.97667 | 1.37172 | 0 | 1.37172 |
| da | 2.26328 | — | 0.49976 | — | 3.000 | — |

The data above exemplifies the relationships, in order from left to right, in the case where the sample plane SP is observed through the immersion having the refractive index of 1.32666, and in the cases where the sample plane SP and inside of the sample (depth of 3.8558 mm) are observed through the immersion having the refractive index of 1.37172. S indicates a sample, CG indicates a cover glass, and IM indicates an immersion. The average refractive index refers to the average refractive index for the light of 900 nm.

The objective 10 according to the present embodiment satisfies the conditional expressions (1) through (9) as expressed by the following expressions (K1) through (K9).

The expressions (K1) through (K9) respectively correspond to the conditional expressions (1) through (9).

$$NA \times d0 = 4.050 \text{ mm} \tag{K1}$$

$$d0/d1 = 0.736 \tag{K2}$$

$$nd2 - nd1 = 0.431 \tag{K3}$$

$$R1/R2 = 1.243 \tag{K4}$$

$$R1/L = -0.140 \tag{K5}$$

$$\frac{\left[\text{Max}\left(\sum_{i=1}^{N}(W_i \times n_i)\right) - \text{Min}\left(\sum_{i=1}^{N}(W_i \times n_i)\right)\right]}{f} = 0.058 \tag{K6}$$

$$1/\beta1 = -0.157 \tag{K7}$$

$$|\beta2| = 1.135 \tag{K8}$$

$$f/f2 = -0.0057 \tag{K9}$$

With λ=900 nm, the wavefront aberration is 0.003λ (that is, 0.3% of the wavelength λ).

Figure 22C:
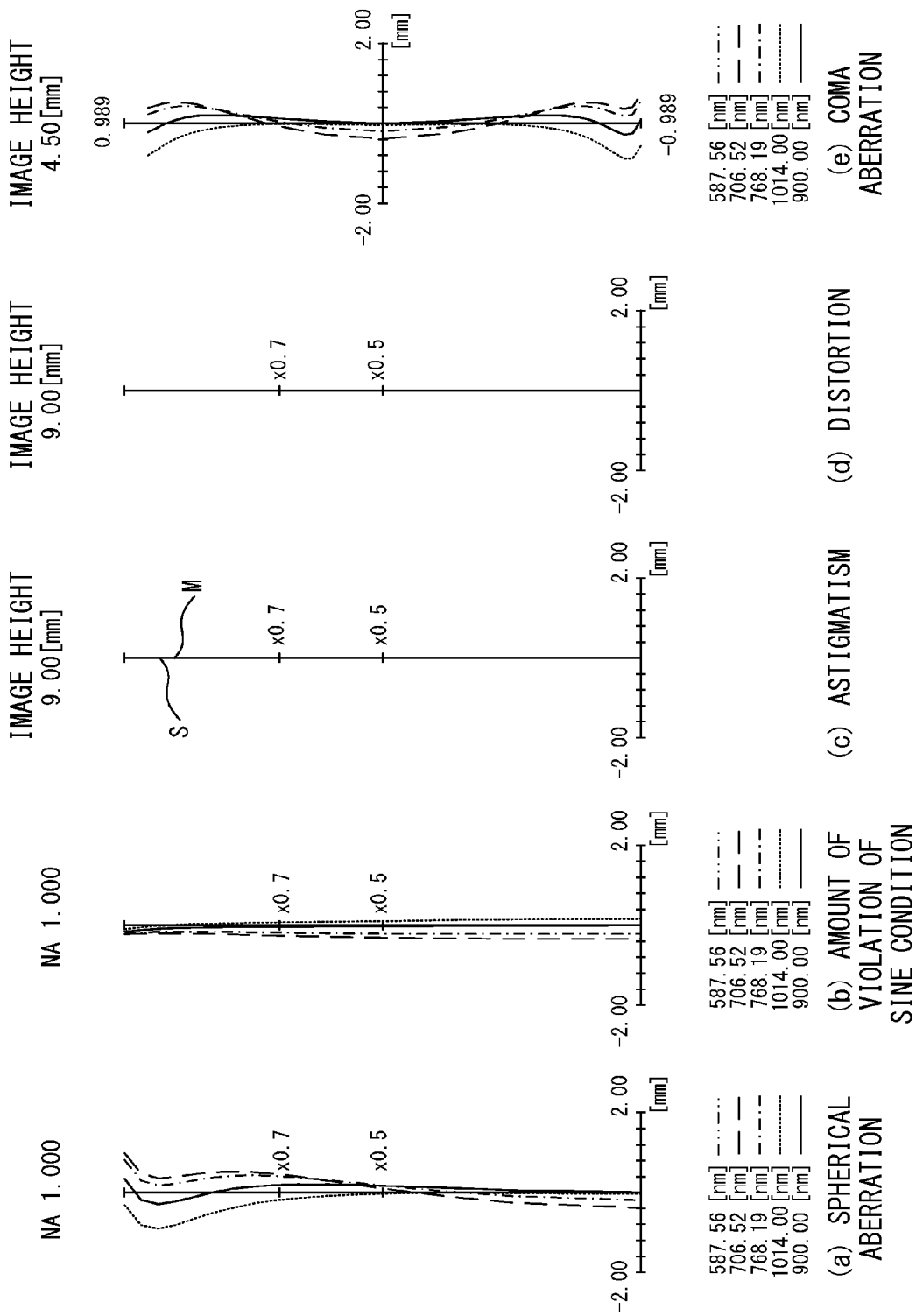
FIG. 22C is a further view illustrating the aberration when the immersion microscope objective exemplified in FIG. 21 and the tube lens exemplified in FIG. 3 are used in combination.

FIGS. 22A, 22B, and 22C illustrate the aberrations when the objective 10 according to the present embodiment and the tube lens 11 illustrated in FIG. 3 are used in combination, and illustrate the aberration on the imaging plane on the image side. Each of FIGS. 22A, 22B, and 22C respectively illustrates the aberration in the case where the sample plane SP is observed through the immersion having the refractive index of 1.32666, and in the cases where the sample plane SP and the inside of the sample (depth of 3.8558 mm) are observed through the immersion having the refractive index of 1.37172. Each of FIGS. 22A, 22B, and 22C illustrates, in order from left to right, (a) spherical aberration, (b) amount of violation against sine condition, (c) astigmatism, (d) distortion, and (e) coma aberration. Each view illustrates an appropriate correction. "M" and "S" in the view of the astigmatism respectively indicate a meridional component and a sagittal component. The interval between the objective 10 and the tube lens 11 is 85.648 mm.

It is preferable that the refractive index of the immersion to be used is 1.48 of less. The refractive index of the lens (lens L1) closest to the object included in the objective exemplified in the embodiments 1 through 10 is 1.45 or less. Thus, since the difference in refractive index between the refractive index of a living body sample and the refractive index of an immersion becomes small, the deep part of a living body sample can be easily observed by minimizing the occurrence of the spherical aberration by the difference in refractive index.

As exemplified in the embodiments 1 through 10, the objective according to each embodiment is an immersion microscope objective having the magnification of 35 or less and the refractive index of an immersion of 1.48 or less, and the aberration of which is corrected at least in the infrared area, and satisfying the conditional expression (1) above. Therefore, a sample can be observed brightly to the deep part with a wide field of view, and excellent optical performance can be realized. Especially, the present invention is specifically appropriate in using a multiphoton excitation microscope using the light in an infrared area as excitation light.

To be more practical, as illustrated in the view of the aberration in each embodiment, the aberration is corrected within the wavelength of at least 800 nm through 1000 nm, and the wavefront aberration can be suppressed within 5% of the wavelength with the wavelength of 900 nm.

What is claimed is:

1. An immersion microscope objective comprising in order from an object side:
   a first lens group having positive refractive power for converting luminous flux from an object into convergent luminous flux;
   a second lens group having refractive power that is lower than the refractive power of the first lens group; and
   a third lens group,
   wherein a following conditional expression is satisfied, in which NA indicates a numerical aperture on the object side, and d0 indicates a working distance:

3 mm<NA×d0<8 mm.

2. The objective according to claim 1, wherein:
   a magnification of the immersion microscope objective is 35 or less;
   the third lens group has negative refractive power; and
   a following conditional expression is satisfied, in which d1 indicates a thickness of a lens component closest to the object:

0.5<d0/d1<3.

3. The objective according to claim 2, wherein the first lens group includes a plurality of positive single lenses.

4. The objective according to claim 2, wherein:
   aberration is corrected with a wavelength of at least 800 nm through 1000 nm; and
   with a wavelength of 900 nm, a wavefront aberration is within 5% of the wavelength.

5. The objective according to claim 2, wherein a following conditional expression is satisfied, in which β1 is a magnification of the first lens group:

−0.5<1/β1<−0.1.

6. The objective according to claim 2, wherein:
   a lens component closest to the object is a cemented lens; and
   a following conditional expression is satisfied, in which nd1 indicates a refractive index of a lens facing the object side in the cemented lens, and nd2 indicates a refractive index of a lens facing an image side in the cemented lens:

0.3<nd2−nd1<1.

7. The objective according to claim 6, wherein a following conditional expression is satisfied, in which a curvature of a cemented surface of the cemented lens is R1, and a curvature of a surface facing the image side included in the cemented lens is R2:

1.03<R1/R2<1.4.

8. The objective according to claim 6, wherein a following conditional expression is satisfied, in which a curvature of a cemented surface of the cemented lens is R1, and a total length of the immersion microscope objective is L:

−0.19<R1/L<−0.11.

9. The objective according to claim 2, wherein the objective comprises a lens group that is movable along an optical axis, and
   wherein a following conditional expression is satisfied, in which Wi indicates a width in an optical axis direction of each medium between the immersion microscope objective and a focal position of the immersion microscope objective, ni indicates a refractive index of each medium, Σ(Wi*ni) indicates an optical path length between the immersion microscope objective and the focal position of the immersion microscope objective, f indicates a focal length of the immersion microscope objective, and N indicates a number of the medium:

$$0.023 < \frac{\left[\mathrm{Max}\left(\sum_{i=1}^{N}(W_i \times n_i)\right) - \mathrm{Min}\left(\sum_{i=1}^{N}(W_i \times n_i)\right)\right]}{f} < 0.2.$$

10. The objective according to claim 9, wherein the second lens group is the movable group, and the second lens group is movable along the optical axis between the first lens group and the third lens group.

11. The objective according to claim 9, wherein a following conditional expression is satisfied, in which β2 is a magnification of the second lens group:

0.2<|β2|<2.

12. The objective according to claim 9, wherein a following conditional expression is satisfied, in which f indicates a focal length of the immersion microscope objective, and f2 indicates a focal length of the second lens group:

−0.18<f/f2<0.1.

13. The objective according to claim 9, wherein the second lens group and the third lens group are movable relative to the first lens group.

* * * * *